United States Patent [19]

Pierce-Bjorklund

[11] Patent Number: 5,217,000
[45] Date of Patent: Jun. 8, 1993

[54] COMPOUND SOLAR COLLECTOR BUILDING CONSTRUCTION

[76] Inventor: Patricia Pierce-Bjorklund, P.O. Box 908/15 Spring St., Essex, Mass. 01929

[21] Appl. No.: 159,328
[22] Filed: Feb. 23, 1988
[51] Int. Cl.$^5$ .......................................... E04D 13/18
[52] U.S. Cl. .................................. 126/621; 52/206; 52/505; 52/302.4; 359/598
[58] Field of Search ................. 52/171, 172, 218, 219, 52/303, 306, 307, 308, 503, 504, 505, 607; 350/262, 265

[56] References Cited

U.S. PATENT DOCUMENTS

| | | | |
|---|---|---|---|
| 687,106 | 11/1901 | Anderson | 52/505 X |
| 818,551 | 4/1906 | Peterson | 52/505 |
| 836,017 | 11/1906 | Douglass | 52/505 X |
| 1,381,625 | 6/1921 | Finch | 52/607 X |
| 2,174,875 | 10/1939 | Freeman . | |
| 2,294,776 | 9/1942 | Freeman . | |
| 2,534,580 | 12/1950 | Edwards | 52/307 |
| 3,866,285 | 2/1975 | Clark . | |
| 3,995,434 | 12/1976 | Izato et al. | 52/607 X |
| 3,996,918 | 12/1976 | Quick . | |
| 4,051,832 | 10/1977 | Steizer . | |
| 4,069,809 | 1/1978 | Strand | 126/449 |
| 4,073,283 | 2/1978 | Lof . | |
| 4,074,704 | 2/1978 | Gellent | 126/440 |
| 4,076,013 | 2/1978 | Bette . | |
| 4,148,296 | 4/1979 | Parlato . | |
| 4,173,969 | 11/1979 | Scholl . | |
| 4,379,449 | 4/1983 | Wiggens et al. . | |

FOREIGN PATENT DOCUMENTS

| | | | |
|---|---|---|---|
| 850901 | 9/1970 | Canada | 52/505 |
| 2711442 | 9/1978 | Fed. Rep. of Germany . | |
| 2749347 | 5/1979 | Fed. Rep. of Germany . | |
| 49298 | 2/1939 | France | 52/607 |
| 905471 | 12/1945 | France . | |
| 933711 | 4/1948 | France | 52/607 |
| 971712 | 1/1951 | France | 52/607 |
| 1470375 | 1/1967 | France . | |
| 2468855 | 8/1981 | France . | |
| 534500 | of 1922 | Switzerland | 52/505 |
| 124292 | 2/1928 | Switzerland | 52/505 |
| 155356 | 6/1932 | Switzerland | 52/505 |
| 282801 | 4/1952 | Switzerland | 52/505 |
| 591662 | 9/1977 | Switzerland . | |
| 3613 | of 1913 | United Kingdom | 52/607 |

OTHER PUBLICATIONS

*The Engineering of Blast Furnace Stoves* An Analysis of Fundamentals and a Description of Freyn—Design Stoves, May 27, 1949.
The Hartford Courant, L. A. Chung, Title: Talcott Science Center Refines Trombe Wall, Aug. 23, 1981.
Pittsburg Corning Corporation Brochure No. GB-164 50M 9/81 Progressive Architecture Magazine Apr. 1983.

Primary Examiner—Noah P. Kamen

[57] ABSTRACT

A compound construction matrix harvests energy incident on all peripheries of a building by providing compound components having anterior and posterior portions with respect to radiation, the anterior portions being generally transparent and the posterior portions being selectively translucent, transparent or opaque, the compound components being arranged in communicating relation to form walls and roofs having multiple internal cavities and passages between cavities which permit light and air to flow freely within the matrix, allowing light incident form any angle to be reflected from cavity sidewalls toward posterior portions to form overlapping incidence on translucent conversion surfaces and to pass through tinted conversion means for direct gain, and allowing air in each cavity to expand freely in any direction from sunlit to shaded portions and through apertures toward shaded portions of adjacent cavities, to thereby form a dynamic airstream passing over translucent conversion surfaces and non-transparent conversion surfaces, seeking equilibrium surface temperatures throughout the matrix and removing energy developed in each cavity, the temperature of the air stream being modified by the thermal properties of the material of fabrication of the matrix and coatings and devices placed in matrix cavities, all cavities forming a single vessel, chambered manifold extending about the periphery of a building and performing all functions of a solar collector e.g. retention, conversion and distribution of incident energy while also providing the structural walls and light transmissive skin of the building.

25 Claims, 24 Drawing Sheets

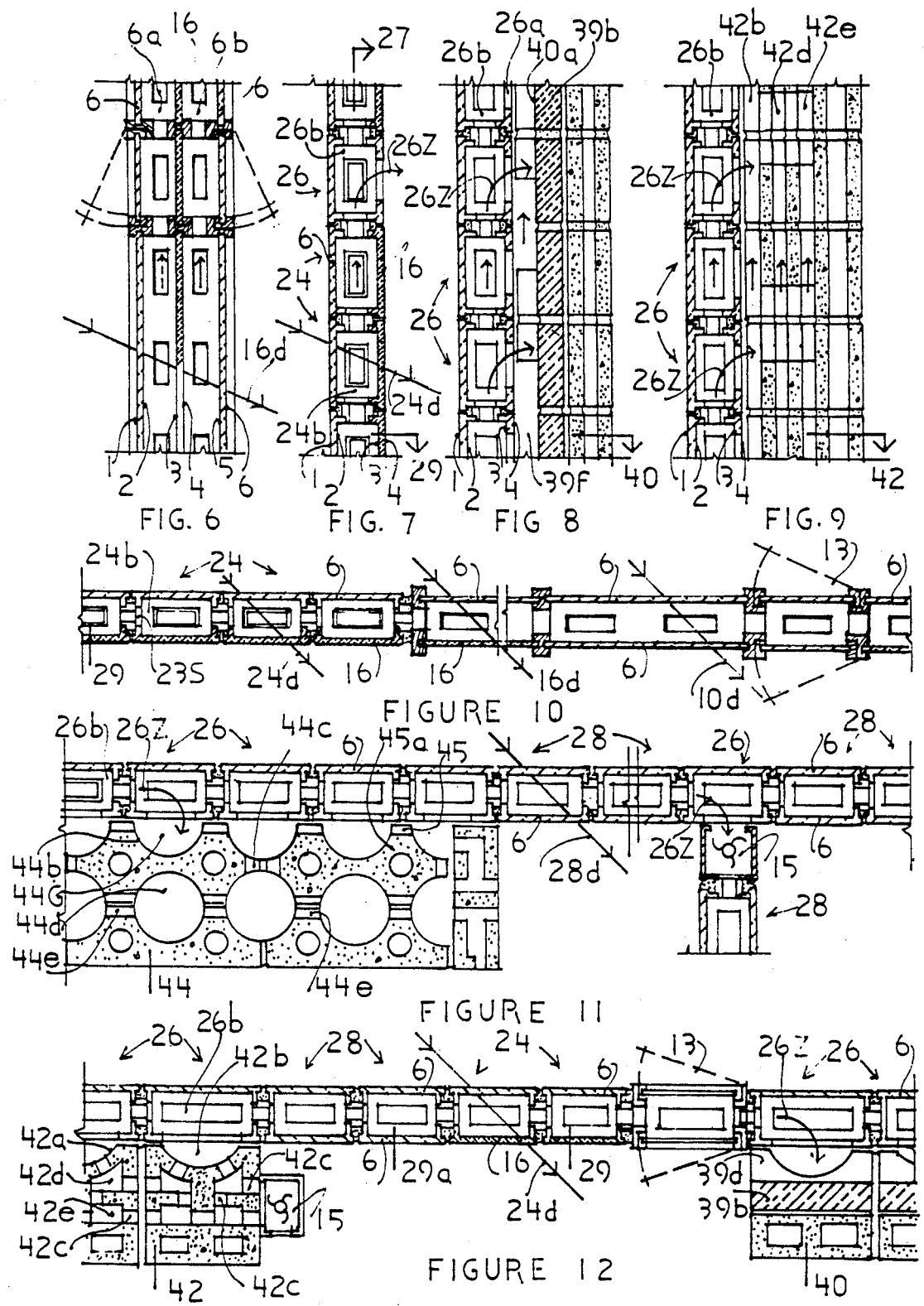

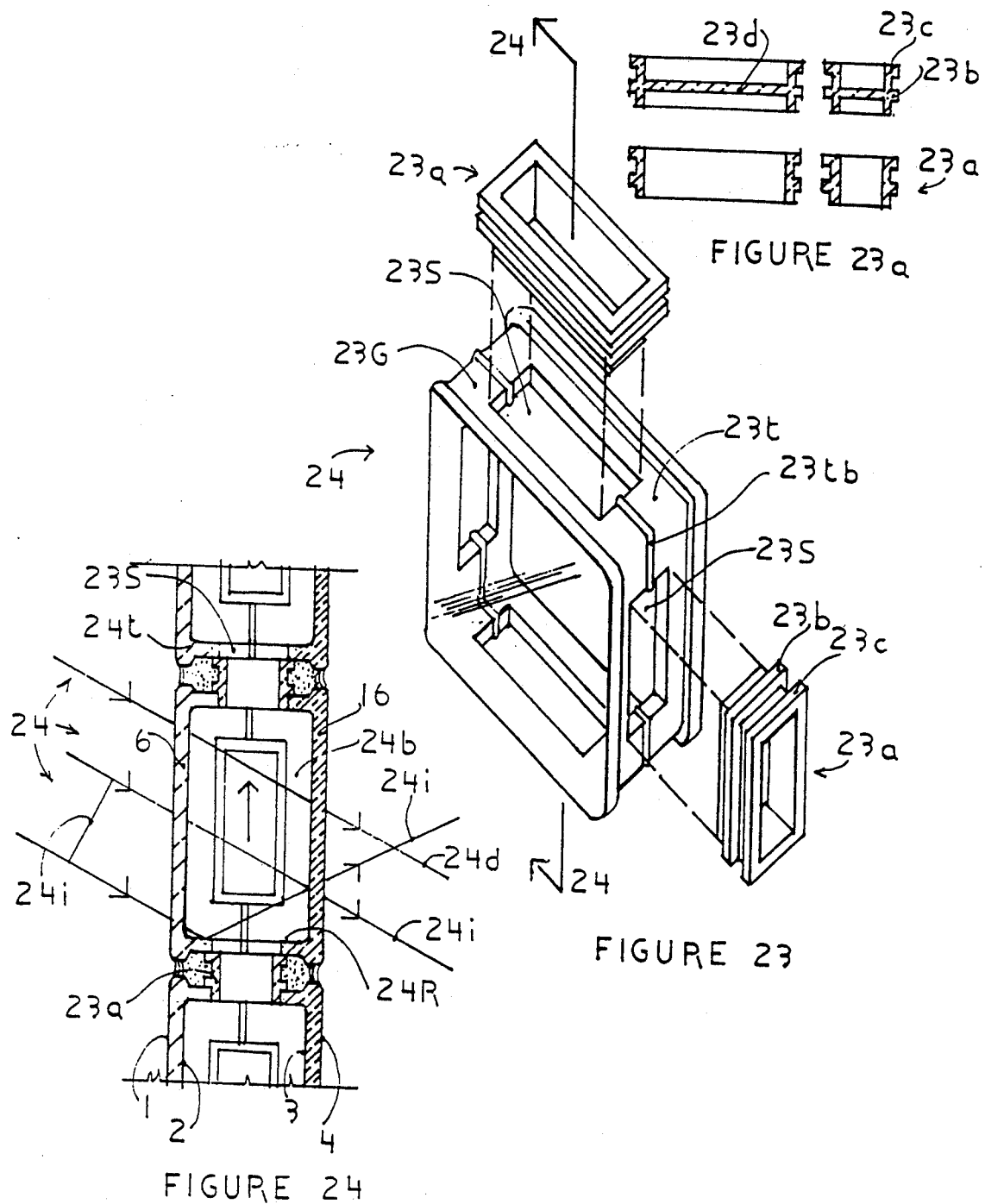

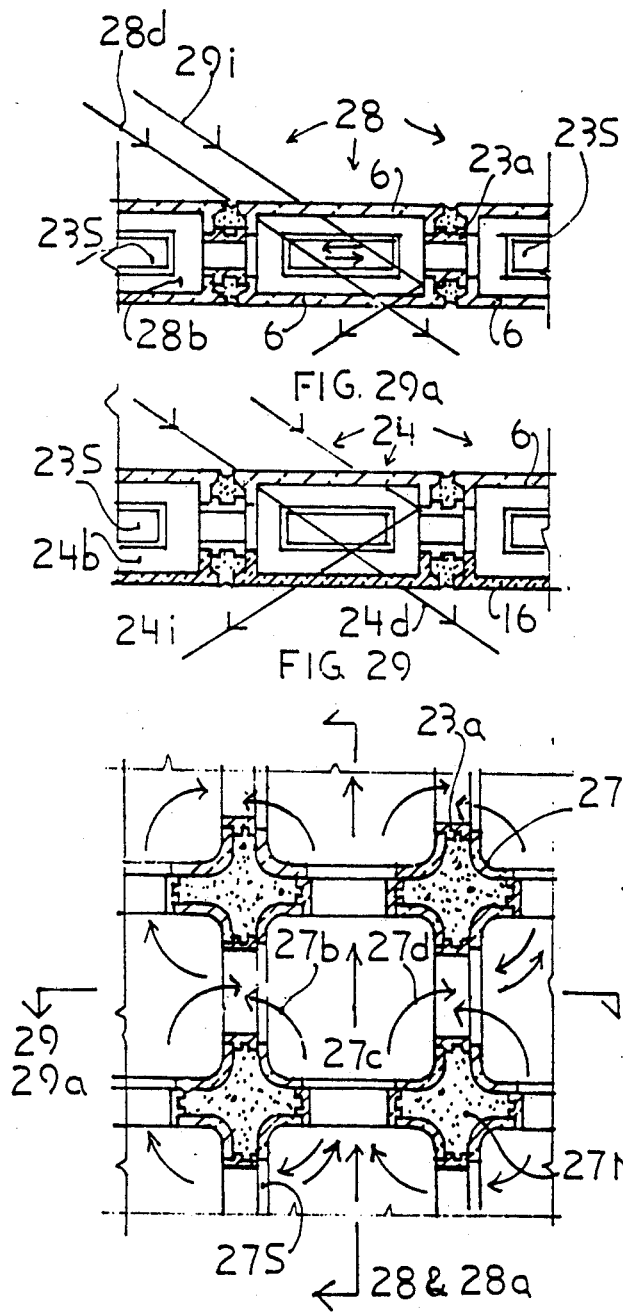
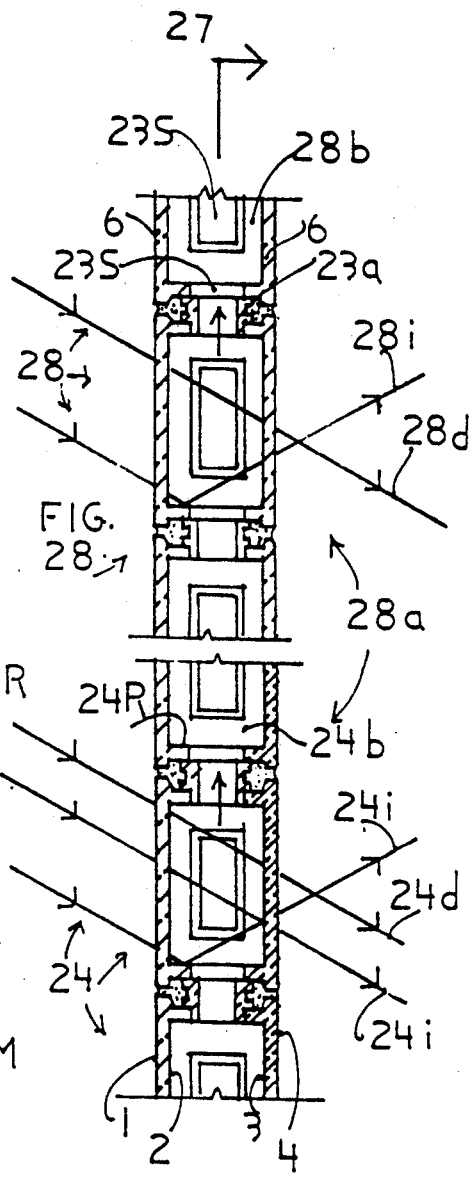
FIGURE 27
FIGURES 28 & 28a

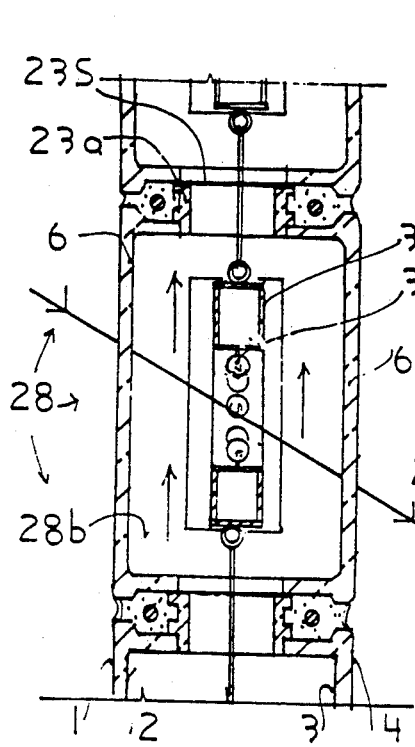
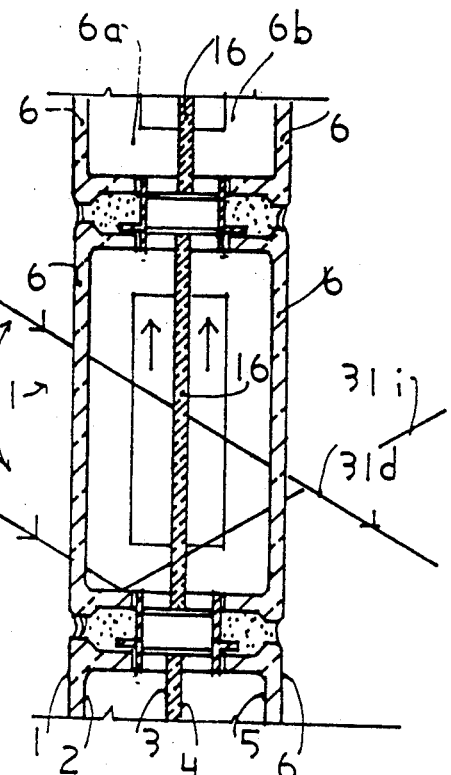
FIGURE 30
FIGURE 31
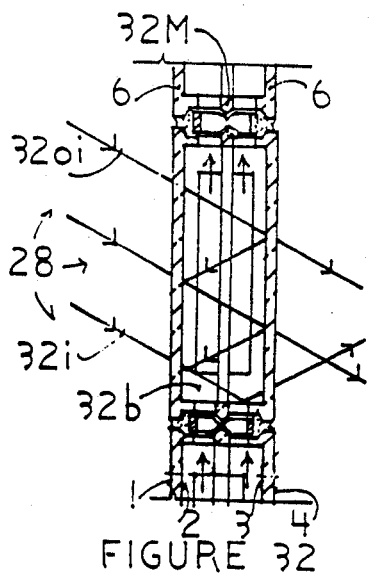
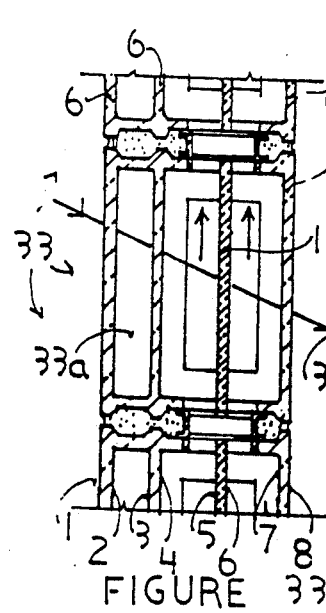
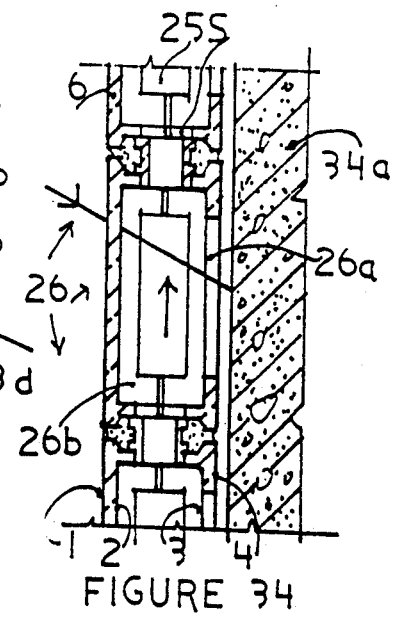
FIGURE 32
FIGURE 33
FIGURE 34

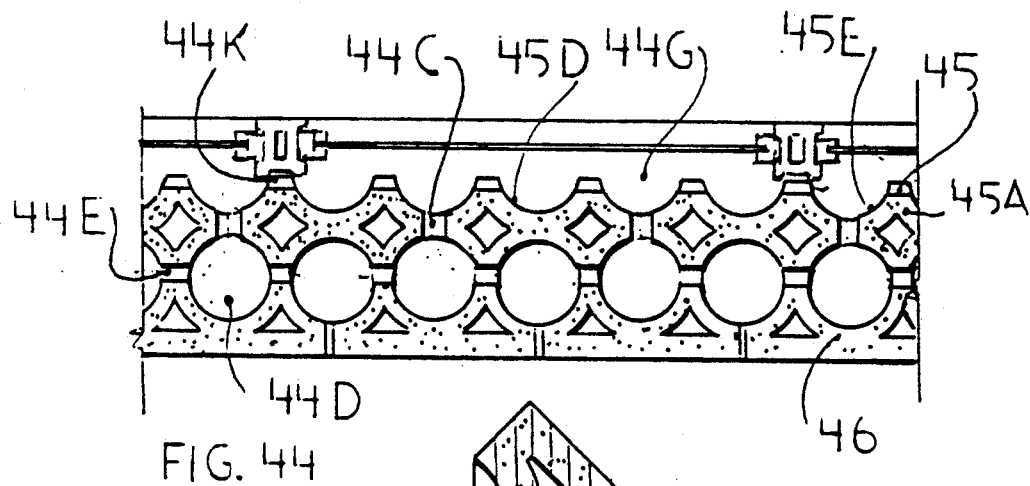
FIG. 44
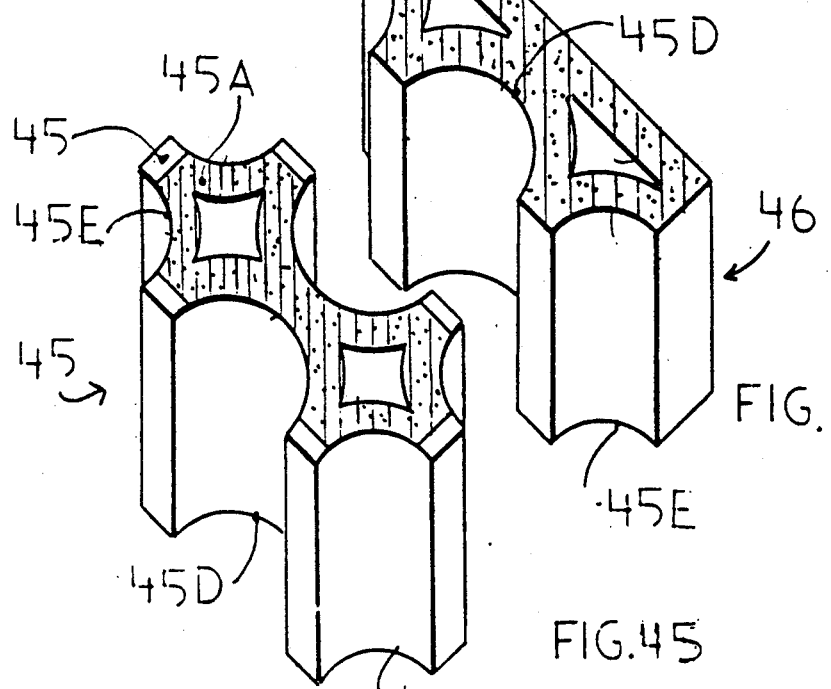
FIG. 45
FIG. 46
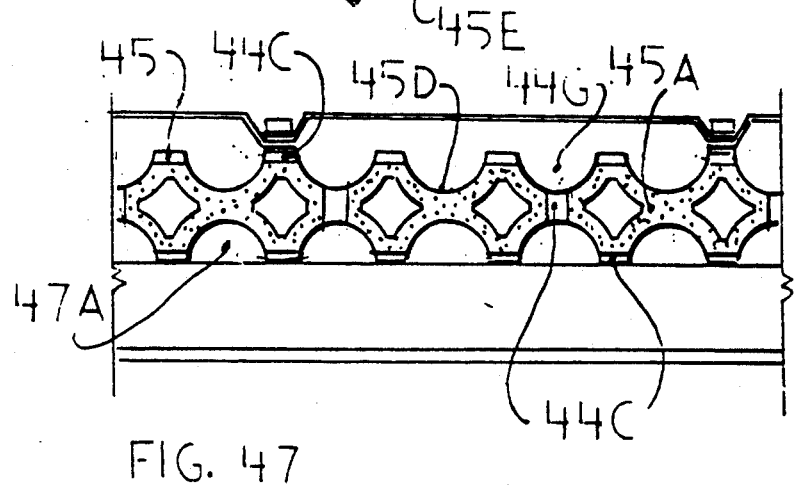
FIG. 47

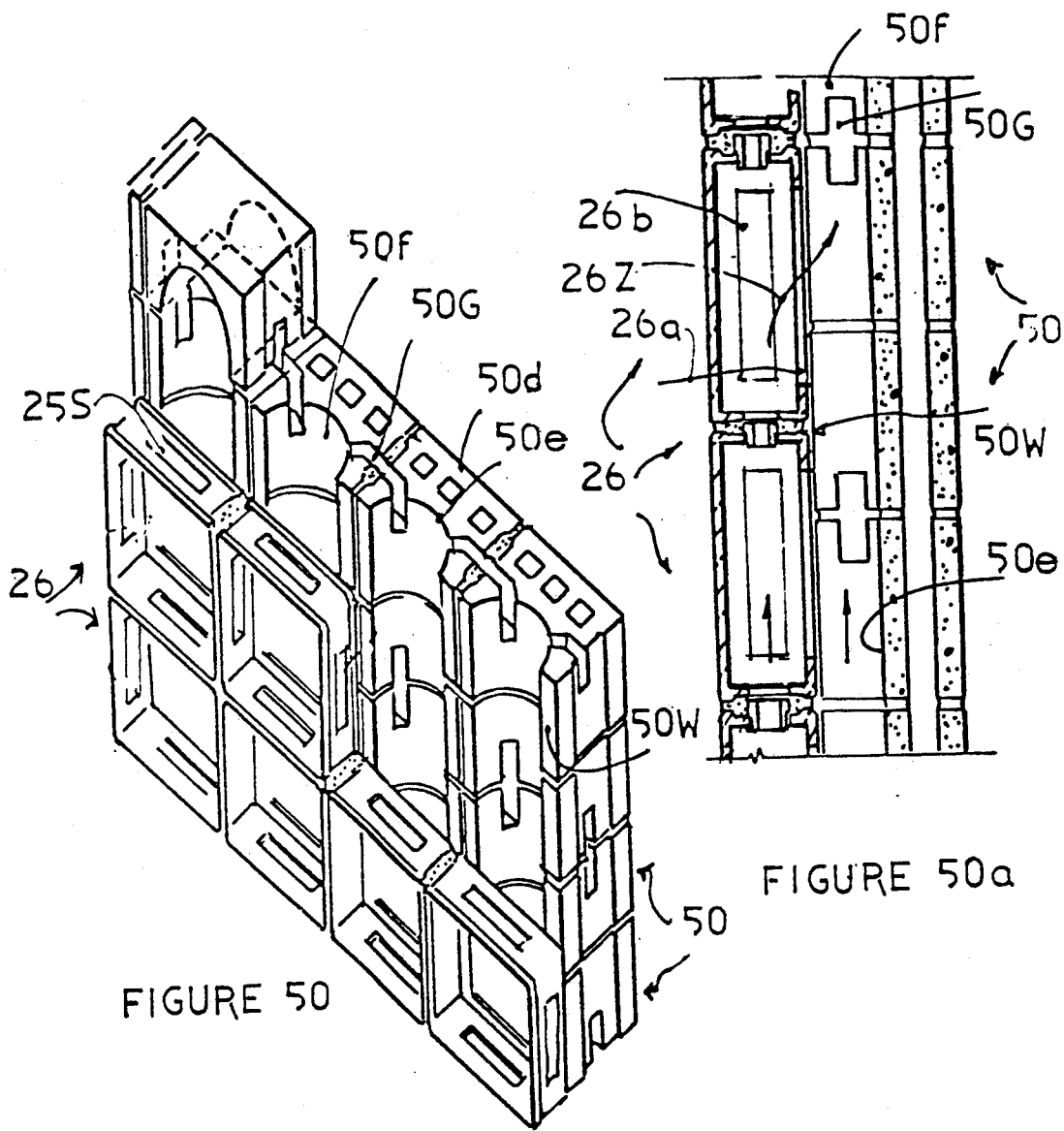
FIGURE 50
FIGURE 50a
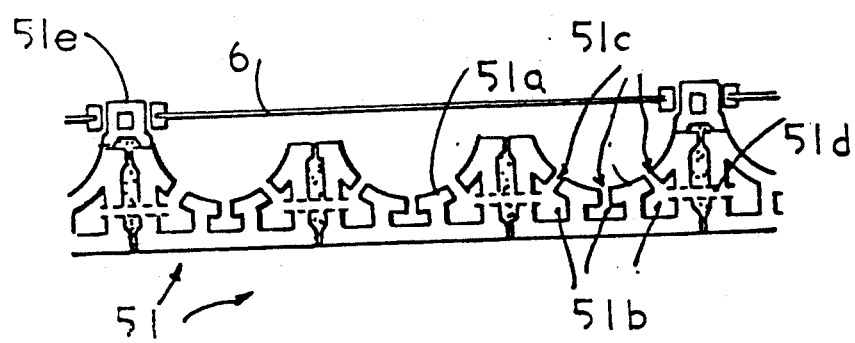
FIGURE 51

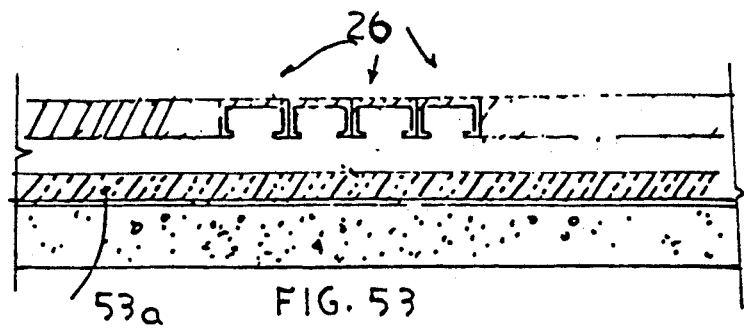
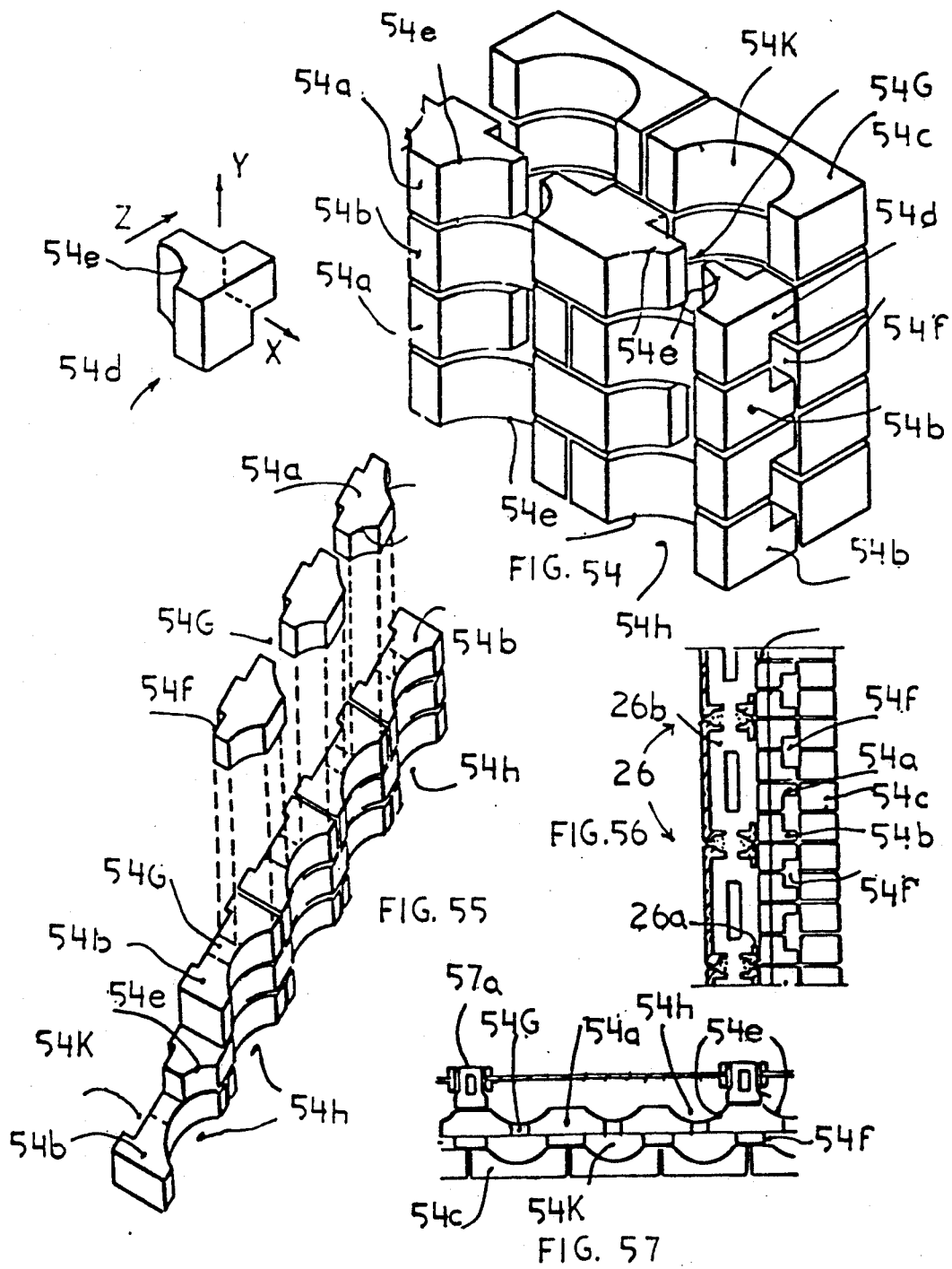

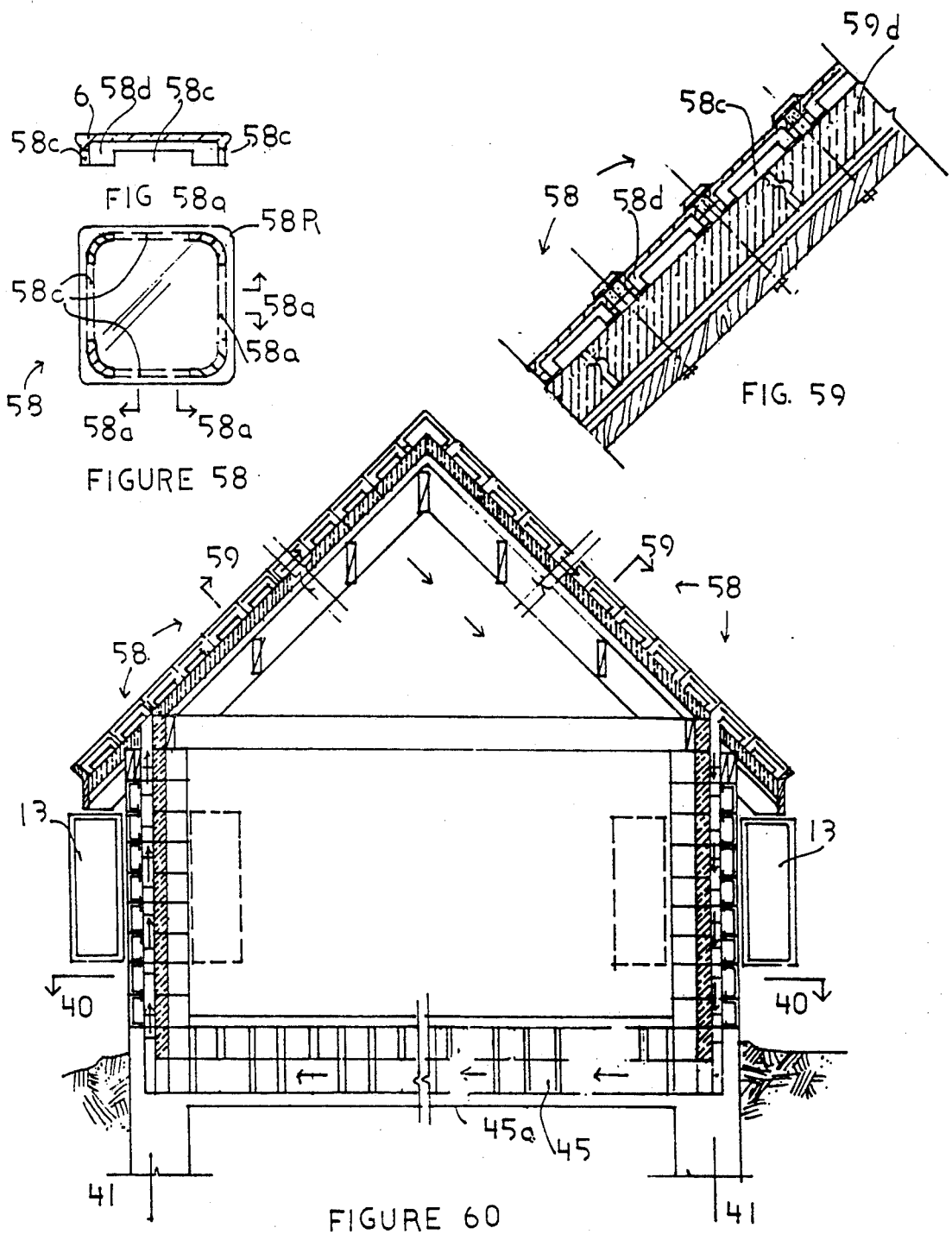

COMPOUND SOLAR COLLECTOR BUILDING CONSTRUCTION

CROSS-REFERENCE AND INCORPORATION

This application is a companion to U.S. application Ser. No. 554, 047, filed Nov. 23, 1981 on even date herewith in the name of PATRICIA PIERCE-BJORKLUND and entitled AIR FLOW SOLAR COLLECTOR SYSTEM AND BLOCKS COMPRISING THE SAME. The specification of that application is incorporated hereinto by reference thereto. That application No. 554,047 is now abandoned.

BACKGROUND OF THE INVENTION

Conservation of energy and the use of renewable energy sources have become increasingly urgent goals worldwide. Thus much research is being devoted to studying the means whereby naturally available solar radiation may be converted to thermal wavelengths at temperatures appropriate for direct use or storage. The conversion of light to heat, notably direct sunlight at wavelengths of 0.3 to 0.8 microns converted to infrared wavelengths of 0.8 microns to 3000 microns, has been accomplished in many endeavors.

Of these efforts, roof or wall-mounted collector panel systems, though highly successful in conversion by attaining high absorber temperatures, suffer from excessive loss to the exterior ambient as the temperature differential ($\Delta t$) between opaque absorber surfaces and outdoor temperature increases. These panel systems also require extensive manifolds, insulation and structural support against windloads.

Thus it has been considered desirable to integrate collector systems into the external walls of a building. This was first accomplished by the Trombe-Michel wall in Odeillo, France, 1967, wherein an exterior sheet of flat glass in frames, formed the outer transparent boundary of a planar air manifold in which the interior boundary of the manifold was provided by a monolithic 12" concrete mass. The concrete, by virtue of its natural absorptive and emissive characteristics, converts incident sunlight into thermal energy, part of which is transferred to the convective air current moving over the masonry surface and part moves thru the concrete mass in a heat wave with an 8 hour time lag for radiation benefits to the interior. The convective warming airstream expands naturally through the planar manifold and pushes its way out of the manifold at the top of the rise through exit vents into the interior living space, where it loses its heat and drops to the floor. The cool air layer at the floor drops into the entry vents of the Trombe manifold where the hot air thermosiphon repeats its natural collection cycle at a relatively slow air velocity.

The advantages of the Trombe lie in the natural expansion of the air in x and y directions through the planar manifold and its natural exit and entry in the z direction, thereby integrating the collector flow directly with the thermal loops of the interior ambient. The interior air volume to be heated exchanges directly through the Trombe manifold which is also the southern wall of the building thus integrating collection with the building skin and structure and thereby obviating the need for secondary manifolds.

However, the disadvantages of the Trombe are cited here for the purpose of introducing the present invention. First, the heat wave moving through the opaque mass of concrete has an 8 hour time lag before it reaches the interior surface. Thus the interior living/work space behind the Trombe is dark and the wall is relatively cool to touch during collection cycle. Further, the Trombe itself is opaque, and although windows may be located in the absorber mass for direct gain, it is not possible to see through the Trombe. Also, extensive framing is required to sustain the exterior glass panes. The entire wall configuration, to date, has been built by on-site assembly of flat glass placed over standard masonry units or poured in place masonry. Further, the surface area of the flat masonry wall available for absorption, limits the surface area available for convective transfer to air flowing over its surface. The thermal gradient between the warm concrete surface and the outdoor temperature is subject to the same loss to exterior ambient as are the typical metal collector panel systems.

To date Trombe walls have not been considered suitable for multi-story collection due to extensive structural framing required to support the exterior glass. Also, multi-story collection implies excessive overheating of the air flow and overheating of the absorber surfaces due to cumulative incidence over an extended rise or flow path. This overheated condition and consequent loss to exterior, is caused by conversion of incident energy and transfer from an absorber surface that is opaque or which has insulation between the absorber and the interior ambient.

Further, when heat mirror coatings are placed on surface 2 or 3 of the outer double pane glass, the temperature is increased in the multi-story airstream, thereby exacerbating the ($\Delta t$) temperature differential between the absorber masonry or other opaque conversion surface and the exterior ambient. Thus, because of opacity of the absorber surface, an excessive temperature build-up occurs in the collector air space which is not made available to the interior ambient or modulated by other means and thus loss occurs to the exterior due to high ($\Delta t$).

Therefore, the present invention proposes to provide a convective multi-story collector wall and roof system, with expanded Trombe-Michel flow patterns, that is easily assembled by combining a plurality of communicating building components and which has a low ($\Delta t$) loss by conductance to the exterior due to provision of transparent and semi-transparent interior boundaries for the planar manifold flow.

Thus an entirely transparent collector warm airstream bounded by alternating conversion and transparent planar manifolds is envisioned, made possible by multi-story cumulative incidence and the rise of the airstream through interspersed, adjacent, communicating absorber cavities and transparent cavities.

The planar manifold is comprised of building block components, transparent and opaque, which fit together to form multiple hollow flow cavities which communicate in x, y, z directions. The airstream thus passes over both primary absorber conversion surfaces and secondary convective transfer surfaces provided by internal cavities, or through multiple planes of flow separated by transparent boundaries.

All components of the proposed building system being modified to retain their load bearing or self-sustaining capacity while providing both the exterior transparent boundary for Trombe flow and also the interior absorber conversion boundary, which may be transparent for temperature control, semi-transparent for conversion, or opaque for conversion when loadbearing.

OBJECTS OF THE INVENTION

Accordingly, it is a primary object of this invention to provide a novel solar collector array, comprised of a generic compound building construction system, whose basic flow pattern expands that of the Trombe to multi-story planar manifold thermal loops which integrate with secondary interior thermal loops; and whose individual components of glass block, flat glass, foam glass and masonry, may also each form multi-story planar manifold independent collector systems. The thermal performance and conversion means of each independent system will vary according to the thermal properties of the subject compressive strength materials. Both the generic compound building system and the component sub-systems, provide the following object functions by virtue of the novel modification to each material as noted:

1) A means of conversion of light wavelengths to heat wavelengths by:
   a) Body-tinted glass serves as a novel conversion means, in which metallic oxides such as nickel, cobalt or zinc are infused in the glass melt at high temperatures. Thereby creating a posterior absorber material which is not opaque, but which is semi-transparent, and thus permits a portion of the incident energy to pass through its mass for direct gain to the interior, while that portion of energy which is converted to heat by the metallic oxides, is transferred by convection to the airstream for cumulative flow thru the multi-story planar manifold. The tinted glass absorber pane is able to withstand high temperature and abrasion without giving off gases or degrading. Thus a $\frac{1}{4}$" pane of tinted glass replaces the 12" solid concrete mass of the Trombe, providing direct gain thru the semi-transparent absorber during the collection cycle.
   b) Rigid foam glass, naturally dark in color, serves as absorber conversion means and as insulator for load bearing masonry walls, thus offering a zero loss-net gain wall. The foam glass (300 psi) is cut into blocks of masonry dimension for compressive strength purposes and its outer face contoured for x, y, z flow. A glass block of similar dimension and modified for x, y, z flow is placed over the outer exterior face of the foam glass thereby forming at least 2 vertical and lateral planar ducts with x, y, z manifold flow interconnecting all ducts.
   c) Loadbearing masonry blocks are contoured and notched for planar flow in multiple x, y, z directions. The absorptivity of the dark pigmented masonry serves as the conversion means and the x, y, z flow draws the heat wave rapidly thru the mass through intercommunicating internal and external cavities toward the interior ambient, thereby attaining optimal low temperatures on primary conversion surfaces which are in direct sunlight.
   d) Metallic water storage walls with copper pipe sandwiched in foam glass between metal outer and inner surfaces, whose conductive flanges engage the water conduits, serve as primary conversion surfaces while removing excess temperatures from the multi-story airstream. This conversion system acts behind glass block modified for flow or behind flat glass in open frames, to provide both hot air and hot water for direct use or storage.
   e) Ceramic frits of ground glass and metallic oxide pigments may be applied to glass surfaces at 1200° F. thereby creating a dark integral opaque ceramic coating able to absorb and convert energy and withstand high temperatures without giving off gases or degrading.

2) A distribution system:
   a) Structural opaque wall In which the planar manifold of the Trombe is provided by a novel structural masonry flow block and glass flow block, compound wall. The planar manifold is enlarged for multi-story high velocity, chimney flow, and is expanded beyond the Trombe by increasing the volume of air available for convective flow both over the surface and through the mass of the masonry wall whose outer cavities directly communicate with adjacent inner chambers, each of which intercommunicate with all others in a total vessel. At least a one cubic foot volume of air is available within the masonry cavities adjacent to the outer conversion surface for exchange with that surface at any time. Thus x, y, z flow of that air volume thru interconnected internal and external cavities of the contoured concrete flow block array provides both a structural wall and a cooling device to prevent overheating of the airstream. The x, y, z flow contours permit triple the volume of air to come into contact with triple the heat transfer surface relative to the Trombe. Thus increasing the size of the total vessel through which the air moves rapidly and naturally to fill the farthest boundary of the container in which it finds itself. Thus the multi-story air-stream moving thru masonry bearing walls, thus contoured, can attain optimal low operating temperatures when desired because the secondary convective transfer surfaces move the heat wave rapidly thru the wall toward the interior. The primary, opaque structural conversion surfaces, e.g. those in direct sunlight, cannot therefore attain excessive temperatures and consequent loss to the exterior.
   b) Self-sustaining wall and distribution manifold: Transparent and semi-transparent components of glass block or flat glass continue the planar manifold flow in x and y directions. Transparent flow blocks prevent over heating of the airstream by allowing direct gain to the interior and provide boundaries for the planar flow between conversion portions of the rise. Multi-layer parallel flow through parallel planar manifolds is desirable during high temperature collection with direct gain to interior through the transparent hot airstream bounded by clear tempered glass. The high temperature manifold is possible only due to multi-story cumulative flow and distribution. The conductivity of the wall under these conditions increases. However, the hot airstream will lose its energy both to the exterior and interior ambient thereby providing a thermal hot air blanket between interior and exterior ambients.

3) A retention system:
   a) Is provided by reducing absorber surface temperatures thereby attaining a minimum ($\Delta t$) by means of partial energy transmission through the semi-transparent tinted absorber panes.

b) Is provided by avoiding excessive absorber masonry surface temperatures by drawing the heat wave quickly toward the interior ambient through provision of communicating secondary masonry cavity surfaces which increase the area available for convective heat transfer, thus moderating the temperature of the multi-story airstream by drawing the thermal gradient toward the interior ambient.

c) Is provided by direct gain to the interior thru a transparent high temperature airstream between tempered clear panes in open flow frames, attainable only in multi-story flow.

d) When high temperature air flow between tempered glass panes is used to advantage in multi-story collection, the high temperature air acts as a thermal blanket and insulator between interior and exterior ambient. Thereby permitting direct gain thru the transparent hot airstream to the interior with minimal distortion of vision thru the airstream. Heat loss by the hot airstream will flow in two opposing directions. One loss to the exterior and another to the interior at a rate proportional to the ($\Delta t$) between the airstream temperature and the interior and exterior temperatures both being cooler than the hot airstream. Caution must be taken to prevent physical contact with high temperature surfaces or failure of glass due to thermal shock at temperatures over 200° F. Multi-layer tempered flat glass with convective flow through the median 2 panes portion of 4 panes with a still air cavity on either side is desirable. Air flow must stop when air temperature reaches excessively low temperatures or high temperatures, as conductance of the wall is increased due to flow.

e) All component systems, with the exception of the rigid foam glass absorber/insulator block, function efficiently without insulation behind the absorber. Thus loss from the interior ambient is a gain to the collector airstream. At night the airstream does not flow and the insulating value of still air applies. If required by 24 hour occupancy needs, heat mirror coatings may be applied to surfaces 2 or 3 of glass components for nighttime insulation.

4) A glowing, light transmitting wall, warm to touch and radiant both thermally and visually, is provided, so that direct gain to the interior occurs during the collection cycle through the transparent warm airstream and body heat is not lost to the glazed walls which form the light transmissive portions of the building construction collector system.

5) The selection of optimal low-operating temperature systems at 90° F. or high temperature collection at 200° to 300° F. is possible when transparent components are tempered to withstand thermal shock.

6) A transparent warm airstream, enclosed by transparent boundaries, forms a collector wall which permits vision through the transparent active collector. The warm airstream is attained by interspersing clear flow components adjacent to and communicating with, opaque or semi-transparent conversion components as boundaries for the airstream.

7) Multi-story cumulative conversion and flow make possible an entirely transparent, active collector wall, with vision through the warming airstream and direct gain to the interior.

Accordingly, it is a further object of the present invention to provide a novel solar collector array comprised of hollow translucent, transparent and/or semi-transparent blocks, which efficiently converts solar radiation to heat and transfers thermal energy to air passing through the array for effective distribution to living spaces bounded by the array.

To provide a building construction system which offers 1) a means of conversion from light to heat wavelengths.
2) a distribution system.
3) a retention system.
4) a glowing, light-transmitting wall, warm to touch so that direct gain occurs during the collection cycle and body heat is not lost to the glazed block wall.

It is a more specific object of the invention to provide such a novel building block array which permits and induces the substantially unimpeded multi-directional multi-story flow and expansion of heated air therethrough and therewithin, and in which there is a minimal need for unnatural movement and directional changes, thereby avoiding stagnation of the air and frictional and kinetic energy losses, and maximizing airflow rates through the multi-story thermal loop for direct air change with spaces to be heated.

A primary object of the invention is to provide an array of the foregoing nature in which overheating is minimized by permitting direct gain through the absorber into the interior ambient by 40% transmission of light wavelengths into interior ambient through glass tinted with nickel and cobalt and ferrous oxides placed in the melt which serves as the conversion means, so as to maximize the retention and conversion of solar radiation impinging on exterior walls comprising the array.

Another object of the invention is to provide such an array which integrates heat absorption, and airstream collection, distribution and return functions into a single vessel, the planar duct, as attained by a multiplicity of hollow cavities which interconnect for cumulative collection from cell to cell, vertically, laterally, transversely and horizontally, and which is suitable for a variety of applications, including the provision of wall and ceiling structures for either external or internal use, structural and nonstructural, and which permits entrance and exit of air at any point or multiple points in the multi-story thermal loop.

A further object of the invention is to provide a novel glass building block which is easily handled and of relatively simple and inexpensive construction, and which can be utilized with great versatility to produce self-sustaining structures of virtually any practical dimension (with reinforcing at 100 block intervals), which are not only highly efficient in the collection of solar radiation and distribution of thermal energy, but are decorative and operate at optimal low temperature of 90° F.

A further object is to provide a building block which can be applied as a renovation veneer, a retrofit system, converting existing masonry, metal or rigid foam glass block insulation surfaced walls into active collector walls.

A further object is to provide a system which has natural summer shading provided by 8" mortar intervals.

A further object is to reflect light energy incident at shallow oblique angles (e.g. early winter morning) toward rear absorber and conversion surfaces by means of the specular reflectance afforded by glass inner cavity sidewalls, thus obtaining overlapping incidence on the absorber surface.

A further object is to provide a versatile building block which may serve as a collector in one instance, or as a temperature control device (when transparent) or as a storage block when used in planar array for interior ceilings and partitions.

A further object is to provide a building system which offers direct gain during the collection cycle by interspersing transparent panes bounding the plane of flow of the multi-story airstream, which would overheat if the transparent panes were not introduced.

A further object is a multi-story collection array offering conversion of solar energy into usable hot water and hot air by use of veneer glass block array over multi-story metal conversion surface with hot water pipes embedded in foam glass insulation, again using the posterior surfaces to cool a super-heated airstream.

A further object is to provide a zero loss wall by use of glass veneer block over black foam glass rigid insulation/absorber surface. Again clear flow blocks or clear flat glass flow may be added to the plane of flow, to control overheating.

A further object is to provide a composite building system in which all blocks whether transparent, opaque, self-sustaining or structural, permit the same planar flow pattern with the material of the supplementary opaque block providing the conversion means and contoured to provide the planar flow and increased air volume, while retaining its section modulus suitable for loadbearing purposes.

SUMMARY OF THE INVENTION

It has now been found that certain of the foregoing and related objects of the invention are readily attained in a solar collector array comprised of the following components which form a generic building construction collector system and which also form independent collector sub-systems. Each wall component, transparent or opaque, is modified to attain Trombe flow in x, y, and z directions when assembled in array:

1) A hollow transparent glass block with a body-tinted partially transparent absorber posterior pane and a transparent receptor anterior pane, with openings in 4 or more side walls to attain planar manifold flow with adjacent blocks, serves as a conversion block and forms a conversion block array which may communicate by planar flow with adjacent block arrays of different thermal properties.

2) A hollow glass block, entirely transparent, and with openings in each side wall for planar manifold flow and no openings in the transparent anterior and posterior panes, serves as a airstream during optimal low temperature 90° F. collection and also permits direct gain to the interior ambient thru the airstream during collection cycle. This transparent glass block array may have accessory conversion devices placed within each cavity such as photovoltaic or photothermal cells for airstream warm-up or concentric copper rings suspended within it for conversion purposes.

3) A hollow transparent coverplate glass block with a clear anterior pane and with openings in each side for planar manifold flow and the posterior pane open for z direction flow, serves as:
   a) the exit and entry block from the array.
   b) the renovation or retrofit block to convert existing walls to Trombe flow.
   c) the cover plate block for structural masonry block or foamglass block, both of the latter modified for manifold flow in x, y, and z directions.

4) Masonry concrete block and brick:
   a) A single masonry concrete block component is contoured on its receptor face to form a vertical and lateral duct and is notched or dimensioned in the same face to attain intercommunicating convective flow passages linking internal cavities of the block with the external conversion cavities. Thereby attaining interconnecting x, y, z flow through all parallel, vertical, lateral and z direction passages through all blocks when placed in array. The x, y, z, ducts thus permit the natural expansion of a warming gas to rise in all directions allowing unrestrained molecular rotation in x, y, z axes and lessens loss due to friction. These masonry blocks retain their section modulus and loadbearing capacity while providing multiple internal and external intercommunicating cavities for secondary convective heat transfer. The secondary surfaces serve to cool the multi-story airstream by tripling the volume of air in the vessel per square foot of exposed collector surface and tripling the surface area available for convective heat transfer, thereby rapidly spreading the heat wave through the mass of the wall toward the interior ambient. The increase in volume of the warming gas is thus matched by the physical boundaries of the masonry container which is the total sum of all masonry cavities which provide one topological boundary of continuous surface confining one air volume, in motion, through multiple cavities under conditions of varying temperature and pressure. The primary conversion surface cavities, those in direct sunlight, experience greater increase in temperature and concomitant increase in air volume, pushing the warmed air toward the interior containers where vertical and lateral high velocity ducts move the warm air over multiple secondary transfer surfaces. Thus by varying flow rates through the mass of the bearing wall which is now comprised of multiple cavities with intercommunicating primary and secondary surfaces, the desired low operating temperatures can be obtained at high velocity.
   b) Multiple concrete masonry or brick units which in two or three shapes combine to form the planar x, y, z flow offer additional structural loadbearing capacity and increased air volume capability and storage capacity. Both concrete and brick flow blocks use either a glass block flow coverplate or flat glass to form exterior boundary for airstream. Both glass block and flat glass may be supported by masonry frame blocks cantilevered from the bearing wall or by wood or steel channel frames open for flow.

5) Rigid foam glass of 300 psi compressive strength is cut into building block dimensions and contoured to permit x, y, flow over its surface while retaining its insulation capacity in the loadbearing planes. This block, when backed by masonry and combined with the coverplate glass block or clear flat glass, serves as absorber, converting sunlight to heat for convective transport and also provides an insulating barrier between the interior ambient and the exterior. This compound wall of glass block and foam glass block will provide a zero loss wall and a net gain wall.

6) Tempered flat glass manifolds:
   a) Flat glass, in open wood frames for low 90° F. temperature collection, may be tinted, for conversion or clear for temperature control and direct gain. The exterior pane forming the outer boundary of flow is clear, while the inner pane bounding the air flow may be clear or tinted, depending on the temperature sought at that interval in the rise of the airstream.
   b) Flat glass, tempered, may be tinted for conversion, or clear for direct gain to provide transparent multi-cavity flow enclosures for a high temperature airstream flowing through the multi-story manifold.
   c) Flat glass tinted or clear is used in sliding doors or windows mounted in operable sash whose frames are opened for manifold flow. Thus double operable windows or sliding doors may serve as exit or entry access to airstream and as conversion or cooling devices. Linear fans are used to control the rate of flow. Open wood frames are appropriate for low 90° temperature collection. Steel frames open for flow are used for high temperature collection.

7) A transparent roof tile comprised of one half a glass block, with a clear anterior pane and with flow openings on 4 sides is placed over rigid foam glass on an inclined roof plane, thereby permitting continuation of the vertical planar manifolds by extension of flow over the roof to accomplish envelope flow. The collector roof tile may form its own independent roof collector by inlet and outlet connections to attic manifolds.

8) A further component of the invention is provided by early morning or cloudy day warm-up photovoltaic devices, placed in each glass cavity, which are activated by diffuse light or waxing/waning light typical of a cloudy day. These photo electric cells with mini-lights activated by the incident diffuse light serve to warm the convective airstream. Such a cloudy day device is comprised of a single photovoltaic cell of about 3" in diameter shaped in this instance so that the conversion silicon forms a flat ring surrounding miniature light bulbs. The fragile portion of the cell is encased in glass while the light bulbs, protected by the ring enclosure, are exposed to the air stream for convective exchange. Incident diffuse light activates the single 3" cells which creates a typical current of 2 amps which is sufficient to light the small array of bulbs which in turn heat the airstream. The aesthetic effect is also desirable as on a cloudy day the glass block with photovoltaic single cells in each cavity would appear to be quite bright and provide a useful thermal warm air blanket in the collector space even when the airstream does not attain operating temperature and therefore is replaced by a no-flow status.

SUMMARY OF THE GENERIC COMPOUND SYSTEM

The generic compound construction system proposed by the invention and shown in FIG. 1, modifies all components, transparent or opaque, structural or self-sustaining, to form a single topologically continuous multiple surface planar manifold with x, y, z flow through all intercommunicating cavities, which form a single vessel, whose boundaries permit thermal losses to the interior by transparency of the conversion panes, and whose multiple interconnecting masonry surfaces draw the heat wave quickly toward the interior surfaces thus lessening the between primary absorber surfaces and the outdoor ambient. The multi-story airstream thus may operate efficiently at optimal low temperatures or in the upper portions of the rise, it may effectively attain high temperature flow moving between clear tempered panes. In which case, the conductance of the wall is transmitted in two opposing directions, one loss to the interior ambient and a second loss to the exterior. Thus an entirely transparent warm/hot airstream collector is provided. This is attained by interspersing absorber panes for conversion at sufficient intervals in the total rise of the airstream to attain basic collection temperatures, which increase due to multiple cumulative incidence over the extended rise, thus providing a hot air thermal blanket between interior and exterior ambient and simultaneously direct gain to the interior through the transparent warm airstream. The multi-story airstream collector attained by the compound system provides direct warm air exchange with interior thermal loops which integrate at each story through exit and entry vents with the multi-story collector manifold airstream.

SUMMARY OF FLAT GLASS SYSTEMS

The tempered flat glass multi-story wall and transparent airstream collector system proposed by the invention and shown in FIGS. 6, 16–21 may act entirely independently as a system, or may act in concert with all other components of the generic compound systems to form a multi-story Trombe manifold. The outer transparent panes form one boundary of the flow chambers for the continuous airstream, while a body tinted flat glass pane formed by infusion of the melt at high temperatures with metallic oxides such as cobalt, nickel or zinc forms the inner boundary of the planar manifold. This multi-story flat glass Trombe manifold with multi-chamber flow passages through median panes or adjacent to interior panes is supported by punched structural steel or opened wood frames, or opened concrete lintel frames, depending on the intended operating temperatures.

The metallic oxides in the posterior tinted panes convert incident light to heat for convective transfer to the moving airstream. Because of the cumulative incidence of energy over the total rise, the airstream would reach excessive high temperatures if entirely clear posterior inner panes were not introduced to bound the planar flow. Thus by interspersing entirely clear flat glass boundaries for the airstream, direct gain is possible through the airstream and a warm air thermal blanket separates the interior from the exterior ambient.

Appropriate exits and entries are provided at various intervals in the rise to introduce cool air when necessary or exit hot air for storage or direct use by integrating airstream thermosiphons with interior thermal loops. A choice of operating temperatures is provided by the tempered flat glass collector system due to the multi-story dimensions of the flow path and accumulation of converted energy available for convection.

Optimal low temperature and low velocity operation at 90° F. is possible with exits and entry at each story, while high temperature and high velocity operation is possible at upper story intervals (see FIG. 17 and 18). As the airstream approaches 200°–400° F., the thermal gradient loss from the interior ambient to the exterior is interrupted by the high temperature airstream. Loss by conduction will then occur in two opposing directions. One loss to the interior ambient will occur by virtue of the ($\Delta t$) between the airstream and the interior temperature. The second loss will occur between the airstream (whose temperature is always higher than that of surrounding ambients) and the exterior ambient, again according to the t difference in temperatures The rate of loss or conductance of such an airstream wall will be higher than for still air but the direction of loss through the semi-transparent absorber pane is a direct gain to the interior. Since glass block cannot be tempered only the tempered flat glass systems may attain this transparent hot airstream collection through transparent and semi-transparent boundaries.

SUMMARY OF THE GLASS BLOCK COLLECTOR SYSTEMS

The glass block collector systems shown n FIGS. 7-12, 21-37, 40-43, 48-50 may act independently or integrate with other components to form a multi-story Trombe manifold and transmissive wall.

The glass block as modified by this invention provides a simple means of attaining Trombe manifold flow by providing openings in each of the side walls of the hollow transparent glass block, which when mortared in place, then communicates through those openings with all adjacent blocks. The clear outer pane of the glass block provides the transparent boundary for flow and the inner pane when body-tinted with metallic oxides provides the conversion surface with direct gain to the interior through its semi-transparent surface. Thus in one modular unit all functions of the Trombe are provided and the mason has only to mortar the blocks in place in array to attain the necessary congregate flow, as one block cannot perform alone. Similarly the array of a specific glass block configuration will exhibit the thermal capacity of the unit block. Blocks of varying thermal performance may be mixed to advantage.

For example, the glass block when modified for flow and formed by entirely clear glass, may be interspersed in large quantity between conversion blocks to modulate the temperature of the airstream to provide direct gain to the interior through the warming airstream.

The same clear glass block modified with flow openings on four sides and with its posterior or interior face partially removed by forming an opening of 5" diameter, provides a versatile block which may be used as the exit or entry block permitting air to enter the airstream (with appropriate blockage of flow directly below the entrance) or permitting air to exit the airstream by blocking openings above the exit site.

The same exit/entry block (26) provides a coverplate block which may be used over existing masonry or metal walls to convert them to energy producing surfaces.

The same coverplate block (26) provides the outer transparent boundary and vertical, lateral and z direction flow when used in compound systems such as with masonry units which may or may not be contoured for flow. The same block serves as a perfect cover plate over rigid foam glass block (40) which in turn perform as absorber and insulator providing a net gain — zero loss wall. The foam glass may or may not be contoured for flow.

A roof tile glass block (58) is comprised of a half block with flow openings four sides and provides the outer transparent boundary for flow when placed in array over rigid foam glass absorber insulation on inclined roof planes.

This exit/entry block (26) by permitting passage of the air from the planar airstream to the interior thus integrates the airstream with the thermal loops of the interior space bounded by the glass block walls. Similarly warm air exiting from the collector array may enter a glass block partition or ceiling which is comprised of flow blocks thereby distributing the collector air through partitions or floors for remote use.

The glass block array (21-37) has all the necessary attributes to form an independent collector system and an exterior multi-story wall. It cannot however form a structural system nor a high temperature system. The generic building system (FIG. 1-15) proposed by this invention, combines the independent glass block collector array (21-37) with the structural collector array (40-57) by means of the coverplate glass block which continues the planar flow from adjacent structural block walls through 14 open framed — flat glass manifolds or glass block manifolds 28a which link masonry bearing wall portions of the total array. The generic building system thus may have a portion of its collector surface composed of the glass block array at intermittent intervals over its surface.

SUMMARY OF THE GLASS BLOCK/RIGID FOAMGLASS BLOCK COLLECTOR SYSTEM

The invention proposes a unique multi-story airstream collector wall array (FIG. 39-41) comprised of glass block opened for flow (26) mortared in place in front of a foam glass block array (300 psi) which is contoured for x, y flow. A traditional backup of concrete block provides the structural stability for both anterior blocks and is tied to them by re-enforcing meshes. The rigid foam glass is cut in masonry block dimensions to match the concrete mortar intervals and laid in running bond to provide a thermal discontinuity for the vertical mortar joints. The foam glass block (39a, 39b) is naturally charcoal in color and is a perfect absorber which also has an insulating value of R3. When cut in compressive masonry proportions, e.g. h less than width or length, the foam may be contoured for x,y air flow over its surface without lowering the R value of the thickest portion. In combination with the glass block coverplate the foam glass acts as an absorber converting light to heat for convective transfer to the multi-story airstream, which moves freely through adjacent clear portions of the rise when combined with glass block 28 in vertical array (28a) or flat glass flow portions. The foamglass also acts as an insulator thus providing a net gain — zero loss wall highly energy efficient and easy to construct.

SUMMARY OF MASONRY/GLASS BLOCK/FLAT GLASS SYSTEMS

The invention proposes a multi-story airstream masonry wall collector system, load-bearing or self-sustaining, which may act entirely independently as a collector without the presence of the other component systems. The blocks are contoured so that x, y, z ducts are formed when the array is mortared in place. A transparent outer anterior boundary for flow is formed by an array of clear glass block opened for flow in x, y, z directions (FIG. 26) or by clear flat plate glass supported by masonry cantilever (52) frames or internal frames projected from masonry piers. The absorptive conversion surface is afforded by the brick or concrete, both being pressed into contoured compressive strength shapes which retain load-bearing section modulus but are increased in surface area and in void or negative area for air flow. A curved outer face forms a vertical duct which communicates by notching or by contour with adjacent blocks both laterally and in the z direction. Thus triple the area of surface is made available for convective heat transfer and triple the air volume is available for heat transport. Primary conversion surfaces in direct sunlight cannot overheat as the rapid airstream removes excess temperature toward the inner secondary conversion surface cavities where 2 to 4 parallel vertical and x, y, z ducts transport warmed air for remote or direct use.

This masonry wall collector (FIG. 43-57) serves as an ideal multi-story structural wall operating at optimal low temperatures and high velocity.

SUMMARY OF PHOTOVOLTAIC SINGLE-CELL AIR WARMING SYSTEM

The invention proposes (FIG. 38) an array of single photovoltaic cells placed in the cavities of transparent glass flow blocks or suspended at intervals in clear airstream flat glass flow manifolds. These cells are circular with the conversion silicon protected by a metal outer concentric ring with an inner concentric ring forming an open air space (donut hole). The entire surface of the outer silicon ring comprised of 16 minicells is sufficient to produce 2 amps maximum from direct sunlight or lesser amperage from diffuse light. The current generated is used to light 8 miniature lightbulbs which protrude into the air space of the innermost ring each forming an extension of an adjacent cell. The lightbulbs operate during the day to maintain a warm air blanket between interior and exterior ambient, an insulating barrier in which the conductive loss is sustained by the photovoltaic system rather than interior room air. Thus a transparent double-glassed wall with convective flow between panes has single photovoltaic cells at intervals, whose small lights are bright for aesthetic relief on gray days and whose warmth maintains a temperature barrier between interior and outdoor ambients. A battery system may be devised for sunny days which turns the lights off during daytime and on for nighttime thermal barrier. The single cells would not be expected to generate enough heat to attain collection temperatures, but would provide sufficient thermal energy to raise the temperate of the still air cavity, thereby lessening loss from the interior.

BRIEF DESCRIPTION OF THE DRAWINGS

FIGS. 24, 26, 27, 28 and 28a show vertical sections of blocks for airflow in various embodiments.

FIGS. 23 and 25 show isometric views of conversion blocks in various embodiments.

FIG. 23a shows a ring for connecting blocks.

FIGS. 29 and 29a show paths of light through conversion blocks.

FIG. 32 shows a block with reflective internal surfaces.

FIGS. 39a, 39b and 39c show elements of FIG. 39.

FIG. 44 shows a three block compound masonry structural wall.

FIGS. 45 and 46 show orthogonal views of blocks in FIG. 44.

FIGS. 47, 48, 51, 52 and 57 show horizontal plan section of masonry/glass walls in various embodiments.

FIG. 50 shows an axonometric view of a block collector array using coverplate glass blocks.

FIG. 50a is a side view of FIG. 50.

FIGS. 52a, and 52b show elements of FIG. 52.

FIG. 53 shows a plan view using brick as an exterior surface.

FIG. 54 shows an axonometric view of a block array.

FIG. 54 a shows an element of FIG. 54.

FIG. 55 shows an orthographic projection of veneer brick components.

FIG. 56 shows a vertical section of FIG. 57

FIG. 58 shows a glass block roof tile.

FIG. 59 shows a roof section.

FIG. 60 shows a barn with a roof shown in FIG. 59.

DETAILED DESCRIPTION OF FIGURES

Figure 1:
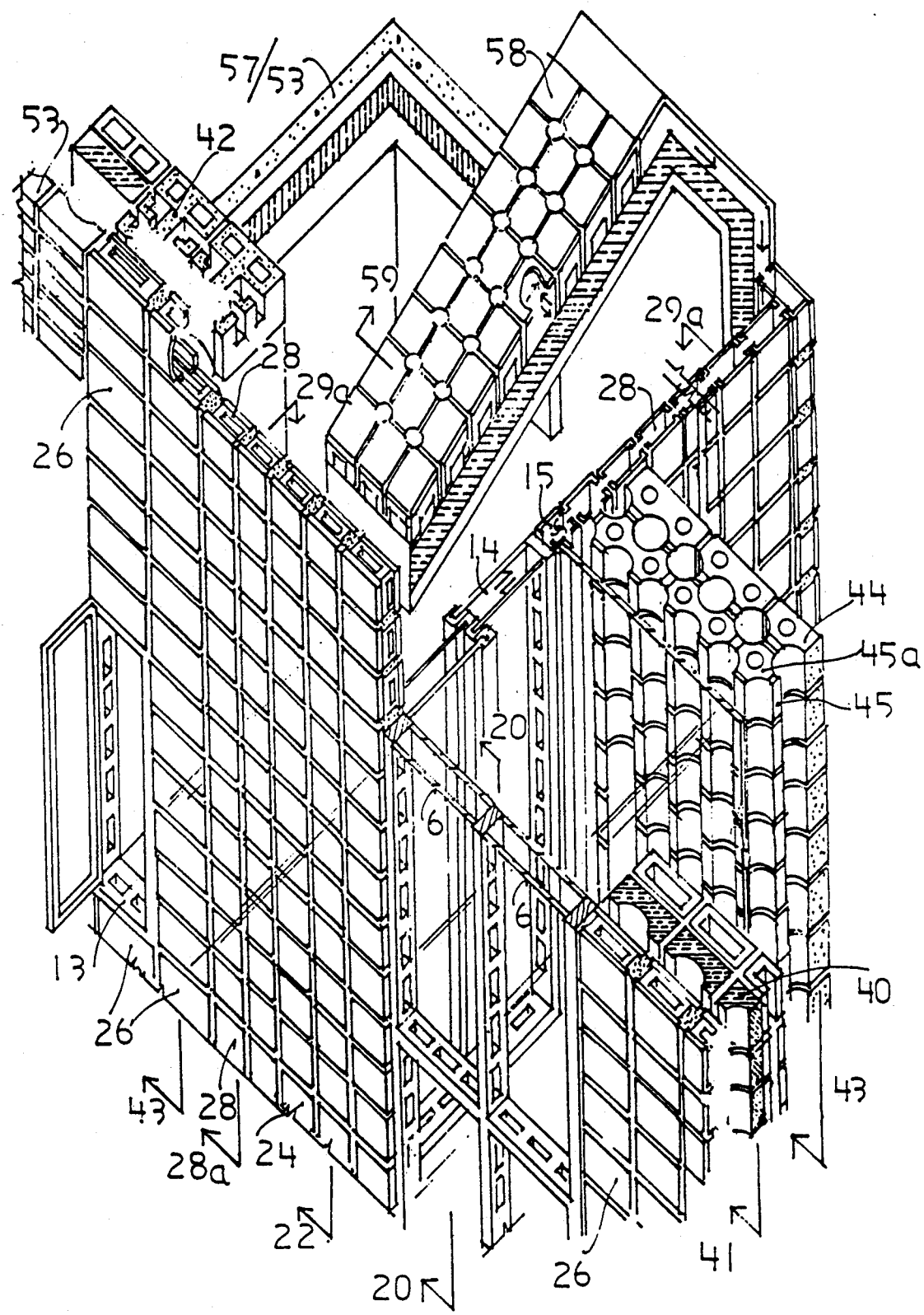
FIG. 1 shows an axonometric view of the generic compound multi-story building construction system.

FIG. 1: Shows an axonometric view of the generic compound multi-story building construction system. The anterior outer transparent boundary for airstream flow is provided by flat glass 6 or glass block outer panes 22, 28, 29a, 24, 26. A transparent inner boundary for airstream flow is shown at 28a, 29a, 13, 14. Tinted conversion panes comprised of flat glass or glass block serve as the interior absorber boundary for flow and are shown at 20 and 24, (and FIGS. 17, 19, 20, 21, 22, 24, 28, and 29). A transparent roof tile half-block 58 opened for flow on four sides and attached to an inclined roof plane of rigid foam glass with structural back-up is shown at 59. Masonry structural walls 40, 42, 44, (shown in FIGS. 48, 52 and columns 49), with glass block cover plate 26 or flat glass coverplate 6, show outer conversion flow cavities connected to inner convective transfer cavities by x, y, z flow through lateral and transverse openings which connect all major vertical ducts formed by conjoining adjacent blocks. Double operable windows 13 with open frame sash and sliding doors 14, permit airstream to enter interior or vent to exterior.

Linear fan 15 creates negative or positive pressure to hasten air in natural thermosiphon loops and through interior flow portions 29a. Glass block coverplate 26 over rigid foam glass blocks 40, contoured for flow and cut into masonry dimensions for compressive strength are backed by typical concrete structural block. The foam glass serves as absorber converting light to heat for transfer to convective airstream and as insulator preventing loss from interior. A convective conversion cavity wall 53 shows a brick exterior boundary interspersed with glass block coverplate 26 permitting sunlight to fall on the foam glass absorber/insulation which lines the cavity flow space backed by masonry structural interior boundary. Thus continuous convective envelope flow on all exposures is attained by use of building block flow components, wherein both opaque and transparent elements may form both inner and outer boundaries of the multi-story airstream.

Figure 2:
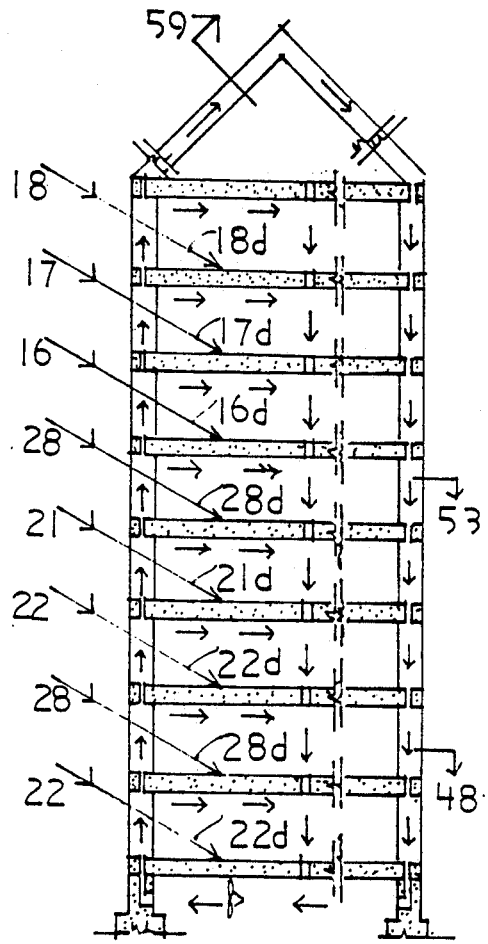
FIGS. 2-4 show vertical multi-story walls.

FIG. 2: Shows a vertical section through the light transmissive portion of the multi-story Trombe flow pattern with continuous flow over the total rise integrated with secondary thermal loops at each floor. A continuous full height cool air return drop must be available in the building or in the external north walls to complete the full height thermosiphon. This transmissive wall may be entirely composed of alternate tinted and clear flat glass (19), or it may be a composite of transparent flow materials such as posterior tinted glass flow block manifold (22) at the first story at 90° F. At the second story an array of clear flow glass block (28a) comprised of block 28 will continue the planar airstream at 90° to 120° F. At the third story an enlargement of the vessel accommodates increased volume of the expanding warm airstream by using clear coverplate flow block 26 over flat tinted conversion glass (21), the temperatures at this third story range from 90° to 150° F. at 1 f.p.s. flow and 0.05 Btu./sec./s.f. incidence. At the fourth story clear flow block 28 in array (28a) may be used to continue the airstream to lessen excessive temperature increase of 90° to 180° F. The glass flow block should not be used for temperatures expected to reach over 200° F. Thus, at the fifth stories a tempered flat glass flow manifold is introduced (16) for conversion at temperatures over 150°, with directgain to the interior ambient through the absorber panes having occurred at each story 22d, 28d, 21d, 16d, 17d, 18d. At the sixth story tempered flat glass with both inner and outer boundaries transparent 18 may be introduced or a conversion story using tinted parallel double flow chambers (17). By the seventh story no conversion should be necessary and clear boundaries may surround the airstream (18). The airstream may continue through the planar manifold afforded by a half-glass block roof tile (58, 59) and attain envelope flow down the north wall through cavity walls 53 whose internal cavity boundaries are lined with rigid foam glass insulation but with insulation on the exterior side of the flow cavity. The airstream having entered the building through linear fans at upper inlets each story (15) and exited the buildings airspace to rejoin the collector airstream at lower inlets (15a), will thus complete a collection cycle at least one to 20 times each hour depending on the ratio between total collector airspace, the volume of building air to be heated and the rate of flow.

Figure 3:
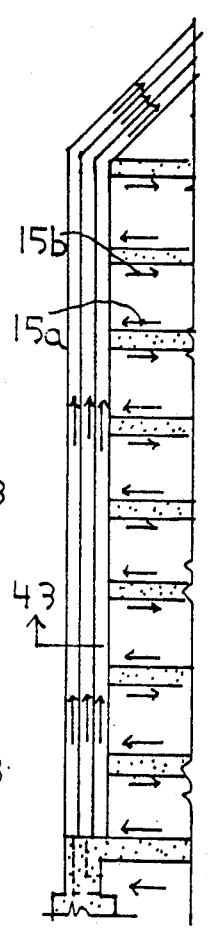

FIG. 3: Shows a vertical section (43) through the structural loadbearing collector wall which may be comprised of any of the loadbearing collector masonry flow blocks proposed by the invention such as, FIGS. (42) (44) (48) (40) (57) (53) (52). Double windows set in open frames (13) or sliding doors (14) may be located in bearing or non-bearing portions of the collector wall roof systems. The airstream moves freely upward in x, y, and z directions in four parallel ducts communicating with all adjacent ducts vertical, lateral, and horizontal.

Figure 4:
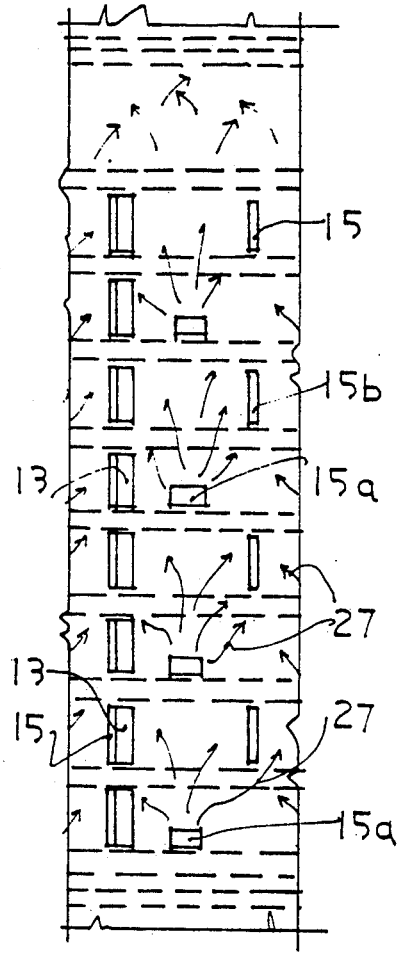

FIG. 4: Shows an elevation of the collector wall through the plane of flow (27) with fan vent exits (15) and damper inlets (15a) at each story. Windows (13) and doors (14) may be located in this elevation adjacent to fan vents or independently. Thus the air entering at any point in the rise is free to seek its own path moving on rotational axes x, y, and z, freely over any portion of the total rise. Since air moves naturally to fill the largest dimension of any vessel in which it finds itself, a natural rapid chimney airstream will form over the entire surface of all interconnected cavities. The range of pressures, temperatures and densities will be widely varied over the total rise. Thus making maximum advantage of the cumulative incident light energy on absorber surfaces by direct conversion and distribution of heat through adjacent totally transparent portions of the airstream boundaries as the airstream will move freely through both transparent and opaque conversion flow boundaries.

Figure 5:
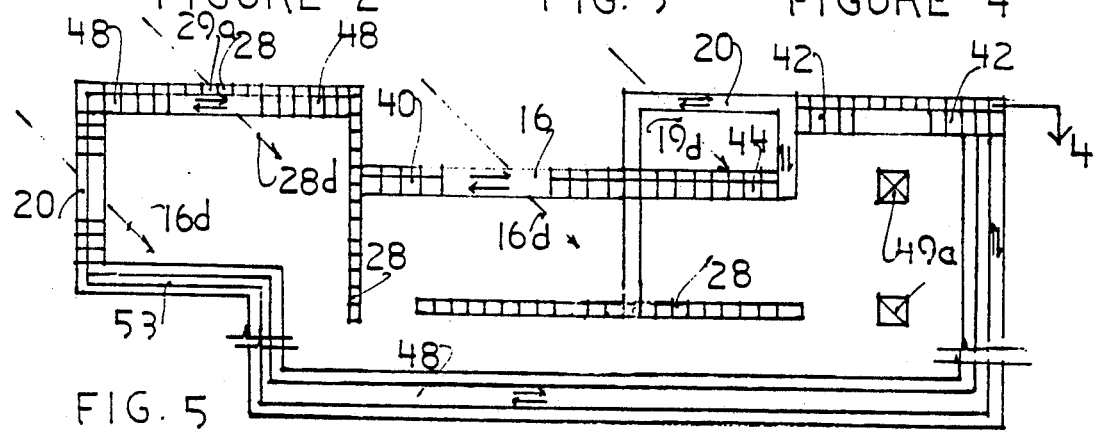
FIG. 5 shows a plan section of a compound construction system.

FIG. 5: Shows a plan section of a typical building employing the compound construction system. The planar manifold flow thus forms loops in the lateral as well as vertical directions as shown by the interconnected flow paths (20) (16) (14) (44). The flow sequence 48, 29a, 48, shows structural masonry collector walls 48 linked by clear flow glass block manifolds 29a. Also interior flow partition comprised of glass flow block 28 in lateral array and fan 15. Columns 49a serve as vertical ducts and load-bearing members.

Figures 6, 7:
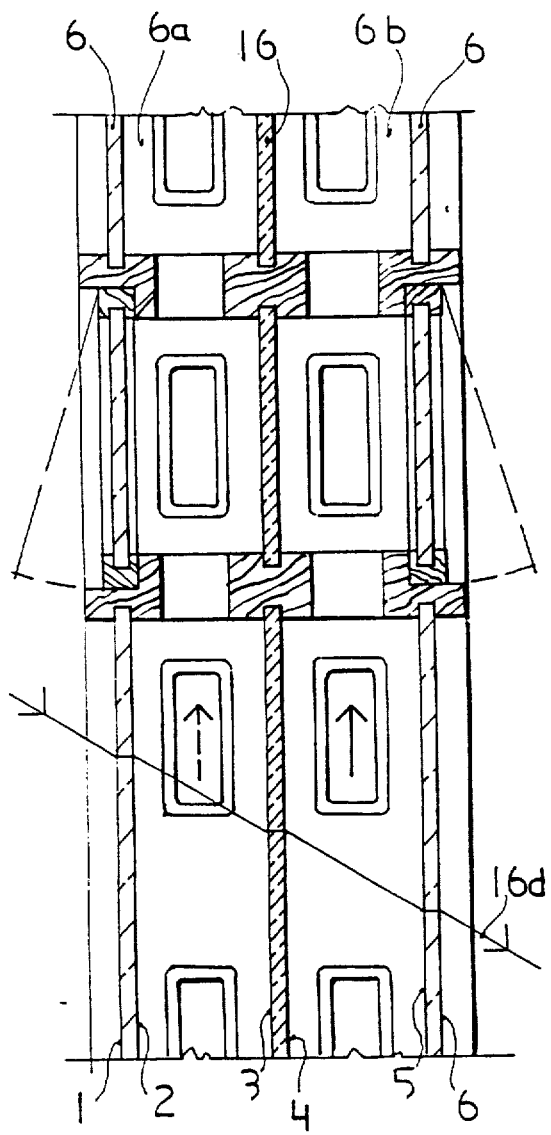

FIG. 6: Shows a vertical section through planar manifold flow with outer tempered flat plate (6) panes transparent and separated by a flow path 6a of 4" from a conversion (16) tinted tempered flat glass pane, in which the metallic oxides cobalt, nickel, zinc, serve to convert a portion of the incident light to heat for convective transfer to the airstream. The remaining portion of incident energy is transmitted directly to the (16d) interior space by radiation and light transmission (about 40% transmitted and 60% absorbed). The innermost clear pane 6 forms chamber 6b for passage of the winter collector airstream behind the absorber pane, with still air in the outer cavity 6a. In the summer, the airstream flows through chamber 6a only for cooling purposes and exits to the exterior, with still air in chamber 6b.

FIG. 7: Shows a vertical section through the independent collector glass block array 24 opened for flow on four sides as shown in FIGS. (23) (27) and with the posterior pane tinted for conversion (16). This conversion block array permits the same planar manifold flow and allows light to enter the collector space through the clear outer pane (6). Energy striking the posterior tinted pane (16) is converted to heat for convective transfer by the airstream for remote use and part of the heat is radiated directly to the interior while a portion of light is also transmitted through the semi-transparent pane 24d. The mortar intervals provide a lattice of summer shading and the reflective specular side walls of the glass bloc provide overlapping incidence on the absorber pane (24i). Entry and exit block 26 continues planar flow from chambers 24b through chamber 26b for exit at 26z.

Figure 8:
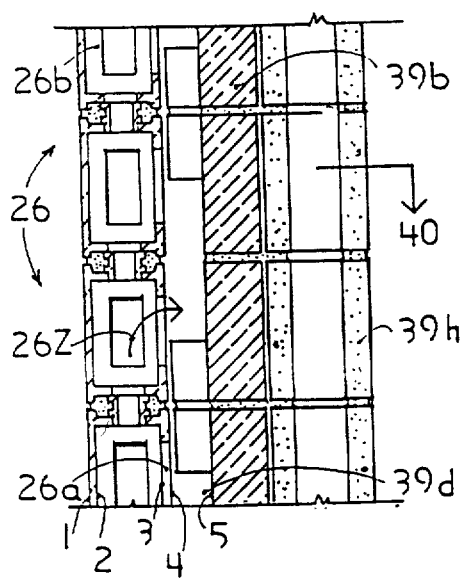

FIG. 8: Shows a vertical section through the airstream flowing through the planar manifold with the outer transparent boundary formed by coverplate glass block (26) and the inner opaque boundary of flow provided by a rigid foam glass block 39b cut into masonry dimensions for stacking and mortaring and contoured to permit vertical and lateral flow plus z direction flow from the glass block airstream 26b to mix with the secondary airstream 39f provided by curvature 40a of the foam glass block (40) (39) (39a) (39b). The foam glass acts as absorber converting light to heat and as insulator preventing loss from interior. A typical concrete block acts as structural member.

Figure 9:
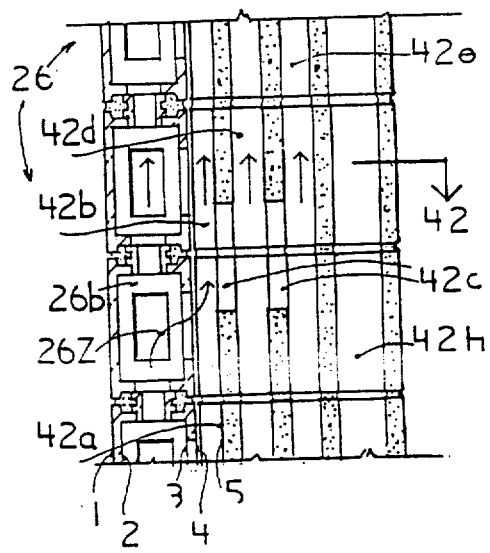

FIG. 9: Shows a vertical section through the airstream as it passes in 4 parallel vertical ducts which all communicate with each adjacent duct for vertical, lateral and z direction flow. The concrete blocks are contoured by a curving face plane which forms the primary conversion surface (42a) (48a) (45d) (52d) and the primary duct 42b which communicates with all internal ducts 42d and 42e by notches 42c laterally and z direction. These notches are formed by contouring the molds which form voids during the pressing procedure of the wet mix. The blocks may be notched on the upper plane only by the press, thus to create a larger opening for air motion, the blocks are inverted every second course to align matching notches. Glass block coverplate 26 provides the outer transparent boundary for flow and also provides summer shading by mortar joints. This structural collector wall is ideal for multi-story flow as the thermal gradient is drawn quickly to the interior by the parallel interconnecting airstreams moving through cavities (26b) (42b) (42d) (42e).

Figure 10:
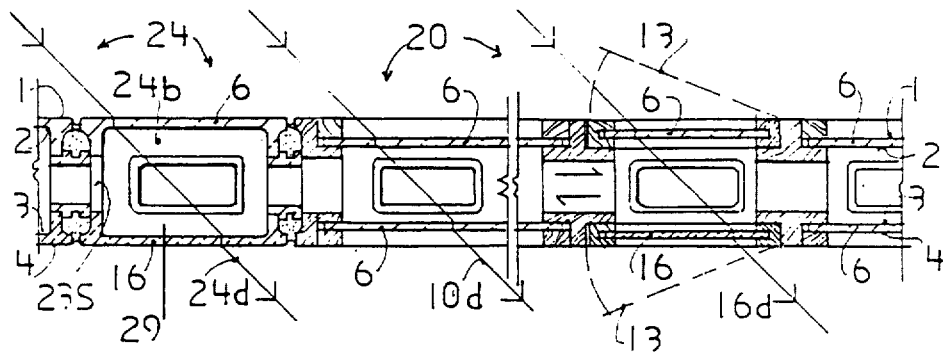

FIG. 10: Shows a horizontal section through a transparent and semi-transparent portion of the non-structural skin provided by the building system. The planar manifold flow continues through all elements of conversion by tinted glass block 24 in array for lateral flow (29) and tinted flat glass (16), as well as continuous warm airstream flow through clear glass inner and outer boundaries (6—6) with all outer boundaries of flow formed by clear flat glass or clear panes of glass block (6). The operable double window (13) has an open frame permitting air to flow freely between its inner and outer panes, which may be opened manually to admit warm winter air with outer pane closed, or both panes open for summer exhaust. The juxtaposition of tinted conversion blocks communicating with clear flow blocks or clear flow flat glass manifolds provides a transparent airstream collector modulating the temperature of the adjacent absorber surfaces and permitting direct gain to the interior 10d through the warming airstream. The mix of components is also aesthically desirable.

Figure 11:
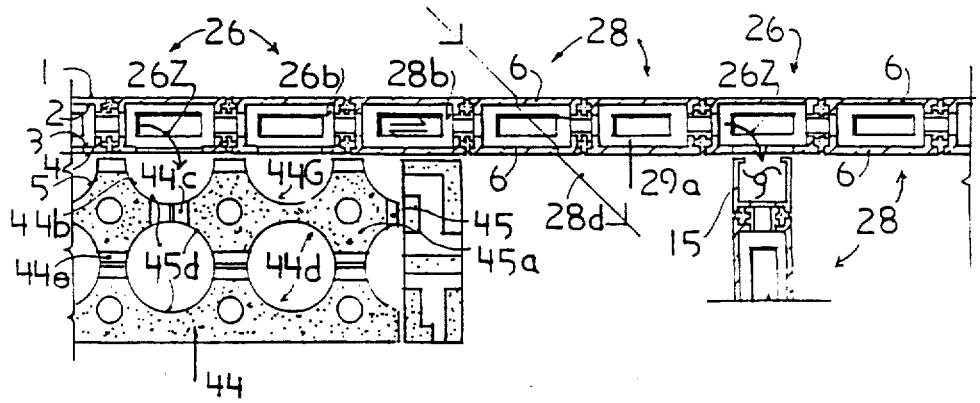

FIG. 11: Shows a plan section of a structural load-bearing wall composed of masonry blocks (44) and coverplate glass flow blocks (26) linked by clear glass flow blocks 28 in lateral array 29a to interior partition flow blocks 29a by a linear exit fan (15). The masonry blocks are a composite 3 block system in which the posterior block is curved 45d to form a partial vertical duct and the anterior foreground blocks are curved front and back 45d to complete the circular back duct (44d) and form a compound semicircular foreground duct 44g in conjunction with the glass coverplate flow block 26 or flat glass 44a. Alternate courses of the front masonry flow block have a lesser dimension on the extreme portions of the block. These shortened portions of the block 45a become x, y, z flow paths connecting inner and outer ducts 44d and 44g, while simultaneously retaining the full section modulus needed for load bearing. The amount of surface area available for secondary convective heat transfer is tripled relative to the Trombe and the volume of air available for multi-story airstream convective transfer is tripled. Thus an ideal temperature can be maintained on the primary conversion surfaces 44b with a concomitant reduction of loss to the exterior ambient and a quicker gain to the interior by radiation and convection. The clear glass flow block (29a) continue the warm airstream leading it to the linear fan exit 15 and thence to interior storage flow partitions 29a. Direct gain 28d through the clear flow blocks 28 and through the transparent warming airstream is thus attained.

Figure 12:
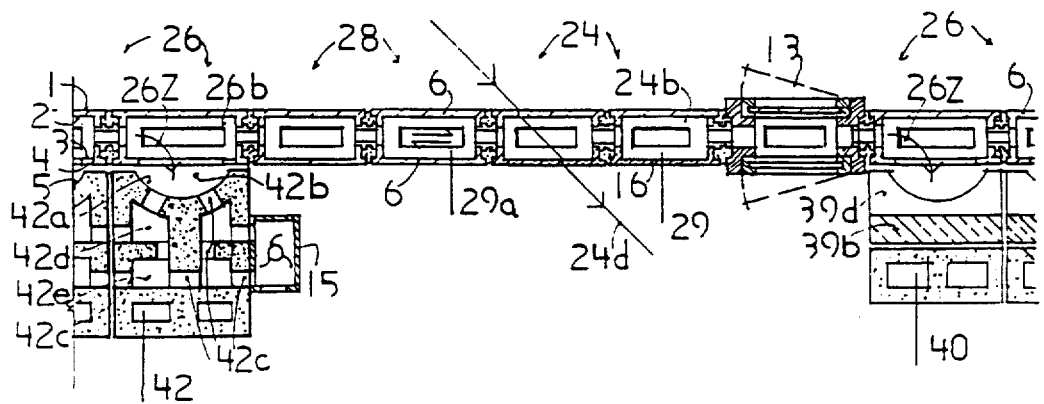
Figure 13:
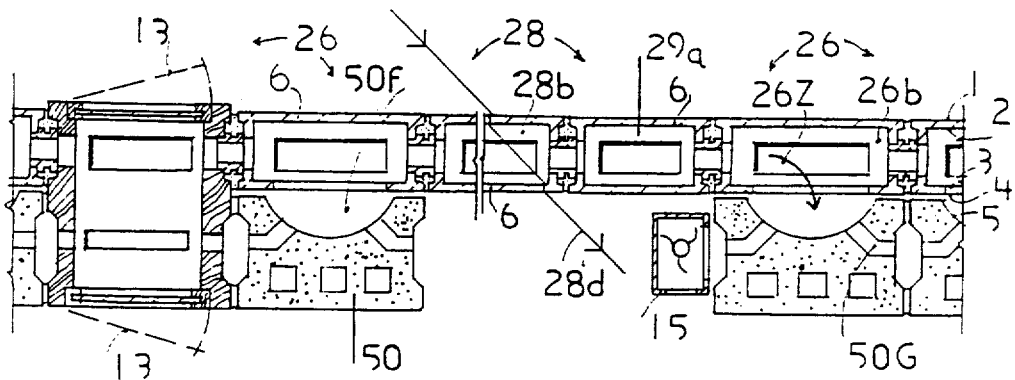
Figure 14:
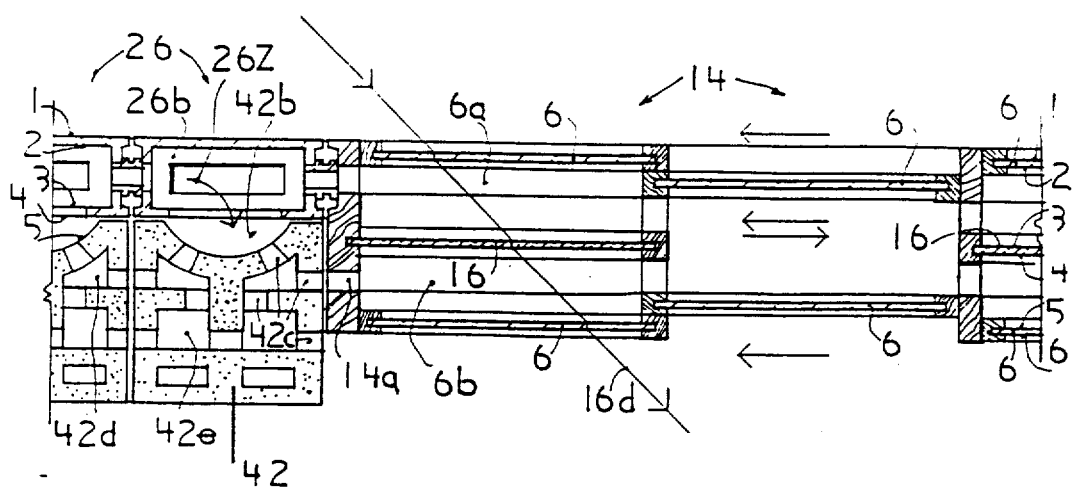
Figure 15:
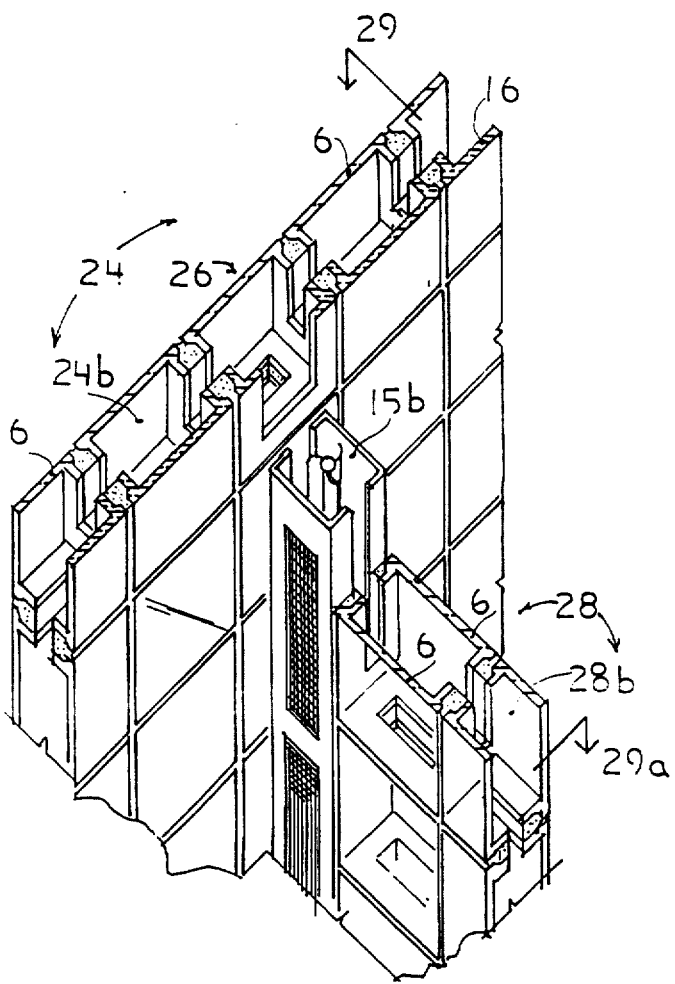
Figure 16:
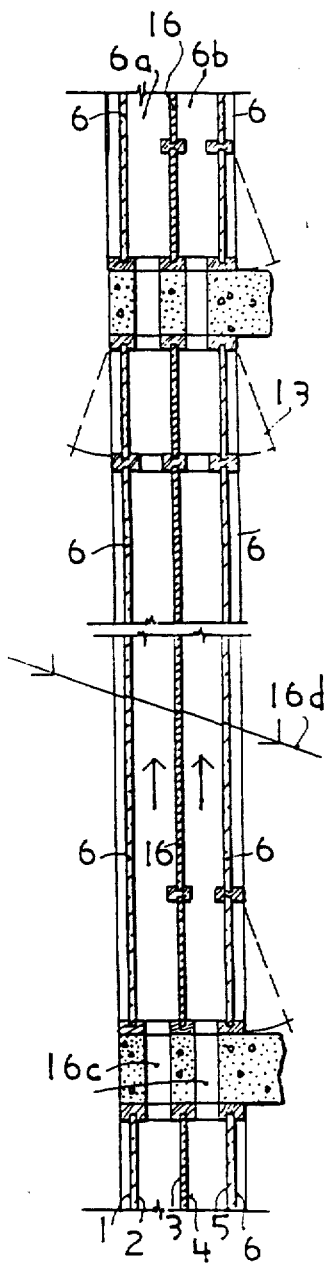
Figure 18:
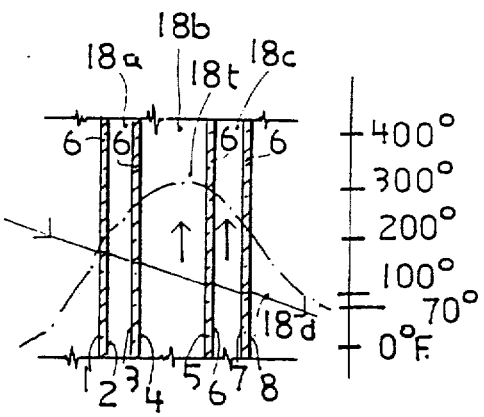
Figure 17:
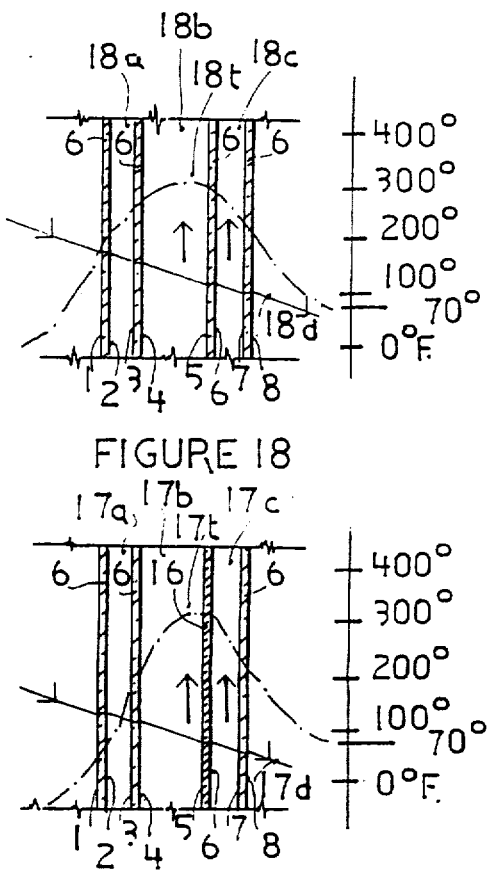
Figure 19:
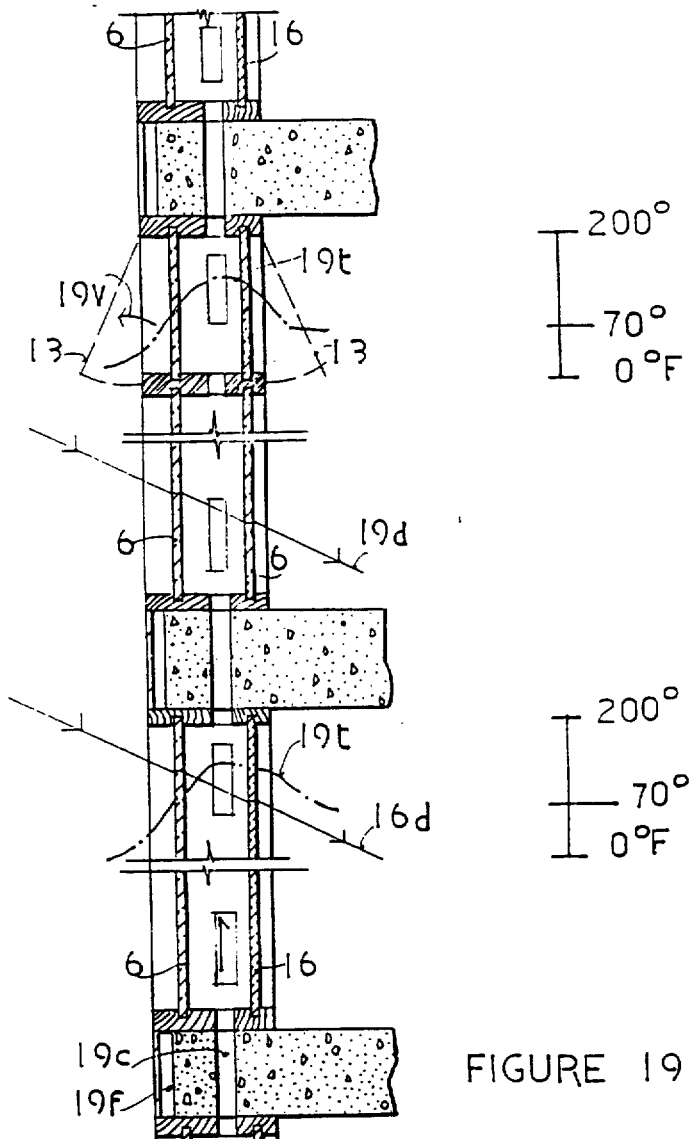
Figure 20:
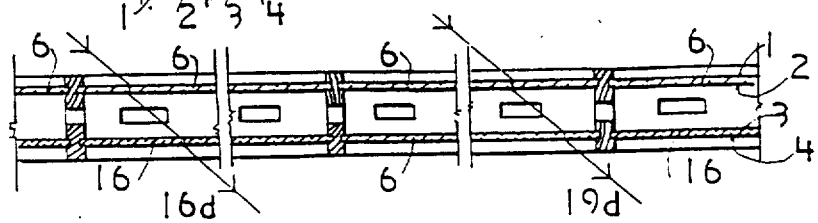
Figure 22:
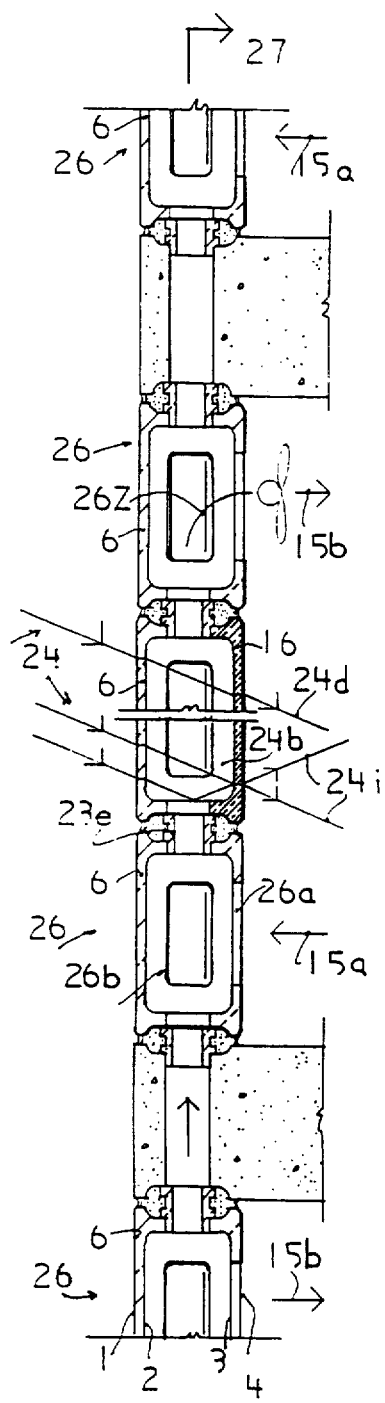
Figure 21:
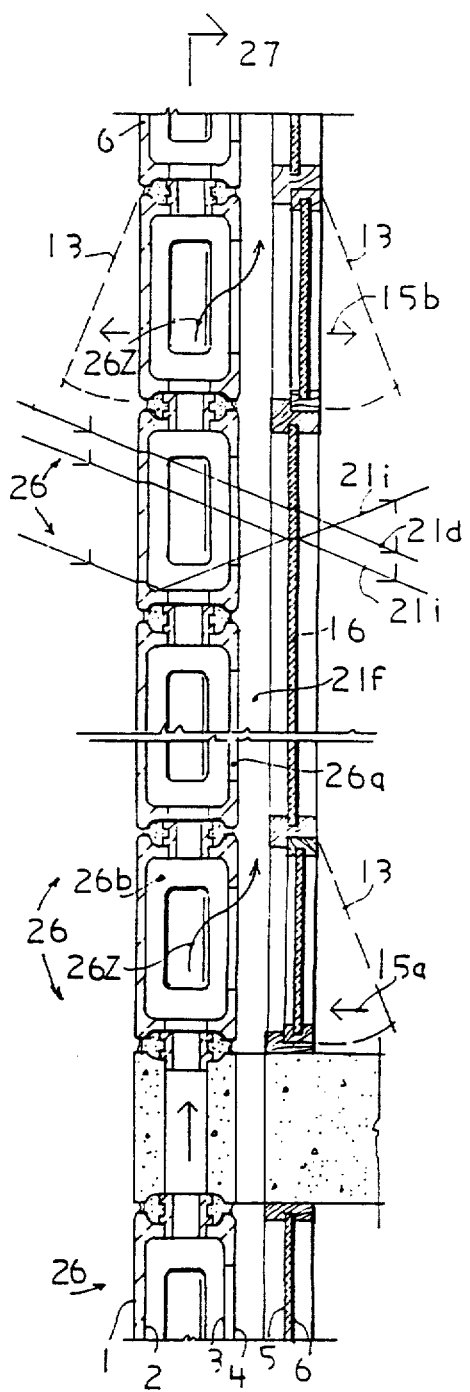

FIG. 12: Shows a plan section through two different types of masonry bearing walls which are connected by both clear flow glass block components (29a), conversion flow glass block components (29)(24) and double operable 13 window set in the planar manifold flow. The masonry bearing wall (42) is comprised of a single block, stack bonded, whose outer curvature (42a) forms a vertical air duct and the primary conversion/absorber surface. Notches (42c) connect the outer duct to inner cavities 42d,42e whose walls are notched for intercommunicating x, y, z flow. Thus attaining 4 parallel vertical flow paths in x, y, z directions through the rise of the multi-story airstream. A linear fan (15) draws air from the warming stream, while clear flow blocks 28 in lateral array (29a) provide a connecting flow link to conversion glass flow blocks 24 in lateral array (29) which connect through openings in the window 13 frame to the air space bounded by the two operable panes. This operable pane, exit/entry communicates directly with warm air from the adjacent conversion surface (40) of rigid foam glass 39b with glass block coverplate (26). Foam glass block 39b is both an insulator and an absorber.

Figure 13:
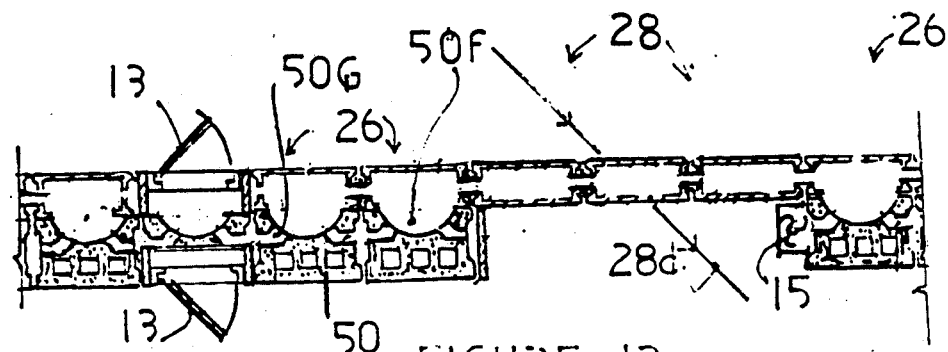
FIGS. 10-14, 20 and 37 show horizontal sections in various embodiments.

FIG. 13: Shows a plan section of a self-sustaining masonry collector walls with glass bock coverplate (26) comprised of single duct 50f with x, y, flow notches 50g, connected by clear flow blocks 28 in lateral array (29a) to adjacent masonry collector walls modified for x, y, z manifold flow. Operable double windows 13 set in the masonry, allow flow between inner and outer panes. Direct gain 28d through the airstream occurs through the clear flow blocks 28 in array 29a which link masonry collector walls.

Figure 14:
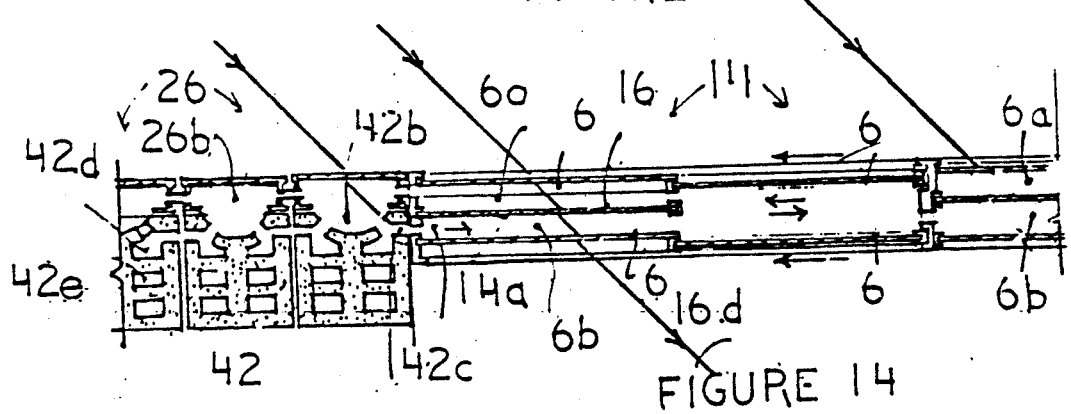
Figure 15:
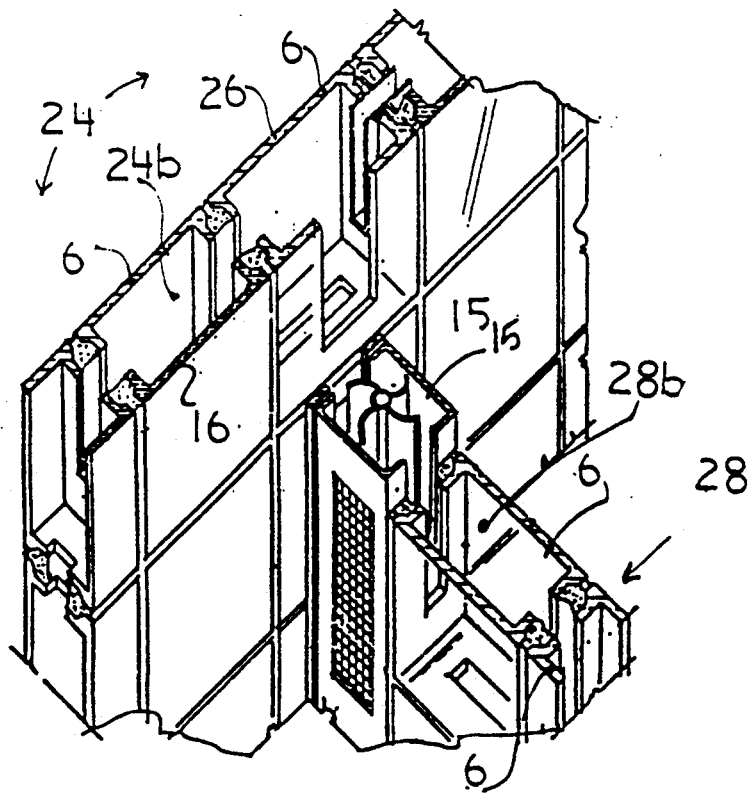
FIG. 15 shows an axonometric view of linear fan vents.

FIG. 14: Shows a plan view of the masonry single structural collector block (42) with coverplate 26, with manifold flow in x, y, z directions for conversion and distribution, connected by open frames 14a to planar manifold flow through flat glass manifolds formed by sliding door units interspersed with fixed conversion flat glass 16. The airstream moves freely from masonry collector piers through the manifold formed between median tinted panes 16 and inner boundaries of transparent tempered glass panes 6. Tinted flat glass tempered conversion panes 16 are located at alternate intervals for absorption of light and emission of infrared to the passing airstream.

FIG. 14: Shows an axonometric view of the linear fan vents 15b comprised of an extended fan about 8' length which rotates about an extended polar shaft with openings in the fan casing on 4 sides (covered with screening or open) so that the unit may be used vertically or horizontally in all component systems to remove air from the collector airstream conversion manifold FIG. 19 for either direct use or for distribution through interior partitions of glass block 28 in lateral array FIG. 29a which form integral planar distribution ducts which also serve as wall partitions or ceilings.

Figure 16:
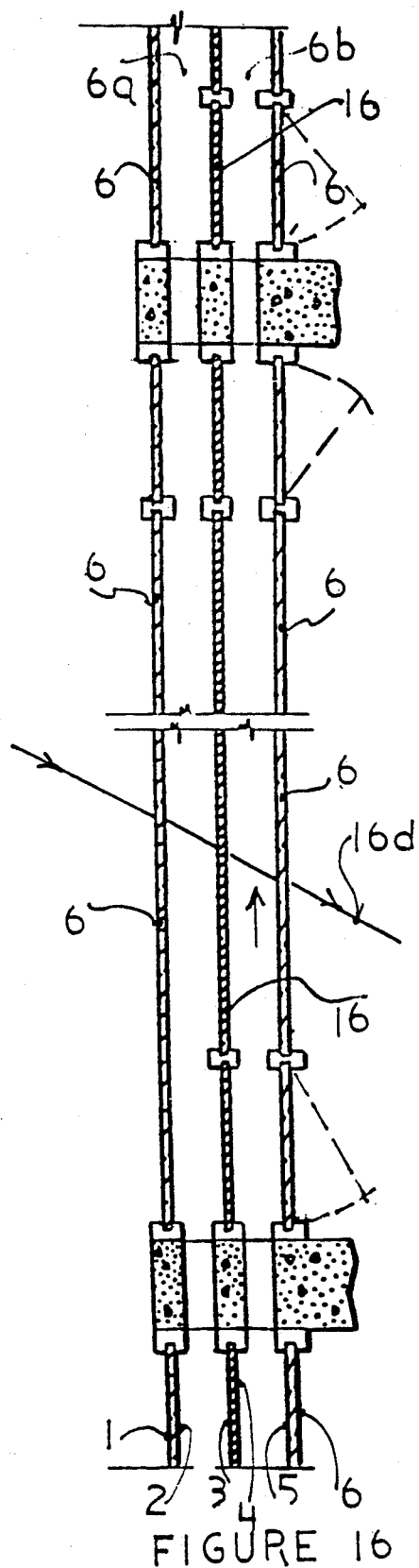
FIGS. 6-9, 16-19, 21, 22, 33, 34, 35 and 36 show vertical sections of manifolds in various embodiments.

FIG. 16: Shows a vertical section through the tempered flat (FIG. 6) glass collector manifold in multi-story array allowing the airstream to rise from story to story through passages 16c in the floor slab or through open frames attached to the exterior face of the slab. The outer transparent tempered pane 6 admits light flow into the airstream chambers 6a and 6b. The median body tinted pane 16 absorbs a portion of that energy converting it to heat for convective transport by the airstream to the upper stories where inner boundaries of flow may be transparent 18. A portion of incident light is transmitted directly through the 60% tinted conversion pane for direct gain 16d both by radiation of infrared and transmission of light wavelengths. Innermost clear pane 6 forms flow chamber 6b. The winter collector airstream passes behind tinted absorber pane 16 through chamber 6b with still air in chamber 6a. The summer cooling airstream passes through chamber 6a with still air in 6b. Thus these walls are warm to touch and visually radiant. Excessive temperatures attained in upper portions of the rise require precautionary measures against failure due to thermal shock or burns. The excessive temperature is used to advantage by attaining a high temperature thermal barrier between inner and outer ambients.

Figure 17:
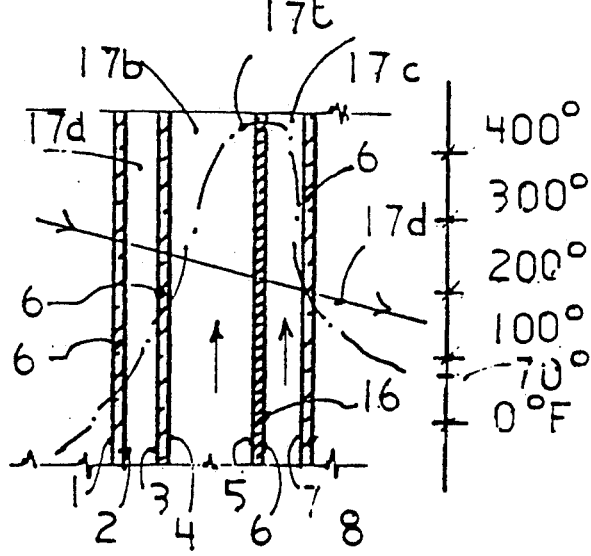

FIG. 17: Shows a continuation of vertical flow in the stories above FIG. 16 with tempered outer panes 6—6 forming a still air barrier 17a and front and back flow 17b, 17c over either face of a tinted conversion pane 16 with cobalt, nickel, lead infused in the pane itself acting to convert light to heat. The innermost pane of clear tempered glass 6 forms a protective boundary for airstream flow either for that story alone or it may continue the full height airstream. High temperature 17t attained after multi-story collection and rise of the airstream may exceed 300° F. thereby creating a thermal gain to the interior while sustaining loss to the exterior. Storage at intervals of 4 stories is recommended for high temperature collection. Direct gain through the high temperature airstream is shown at 17d.

Figure 18:
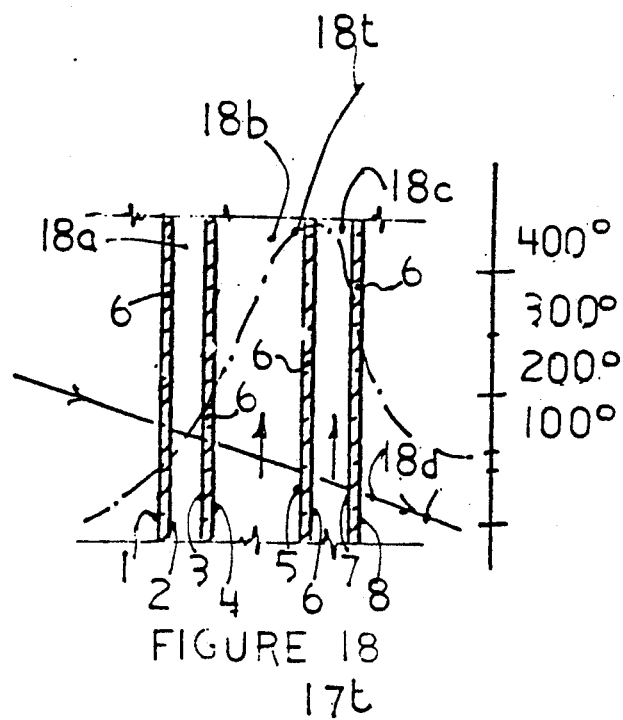

FIG. 18: Shows a vertical section through entirely transparent high temperature flow 18t of the airstream between transparent boundaries. The outer two clear panes 6 and 6 form a still air insulation cavity 18c, while air flow chambers 18a and 18b provide double layer flow with two temperatures of flow, lowering the temperature of flow through 18b by varying the rate of flow. Alternate intervals of conversion stories with clear flow story manifolds make this high temperature airstream possible. It may be used in a variety of ways for direct gain to interior 18d, as a thermal hot air 18t blanket of insulation or for storage by juxtaposition with systems shown in FIG. 37 where hot water pipes draw excess heat from the airstream.

Figure 19:
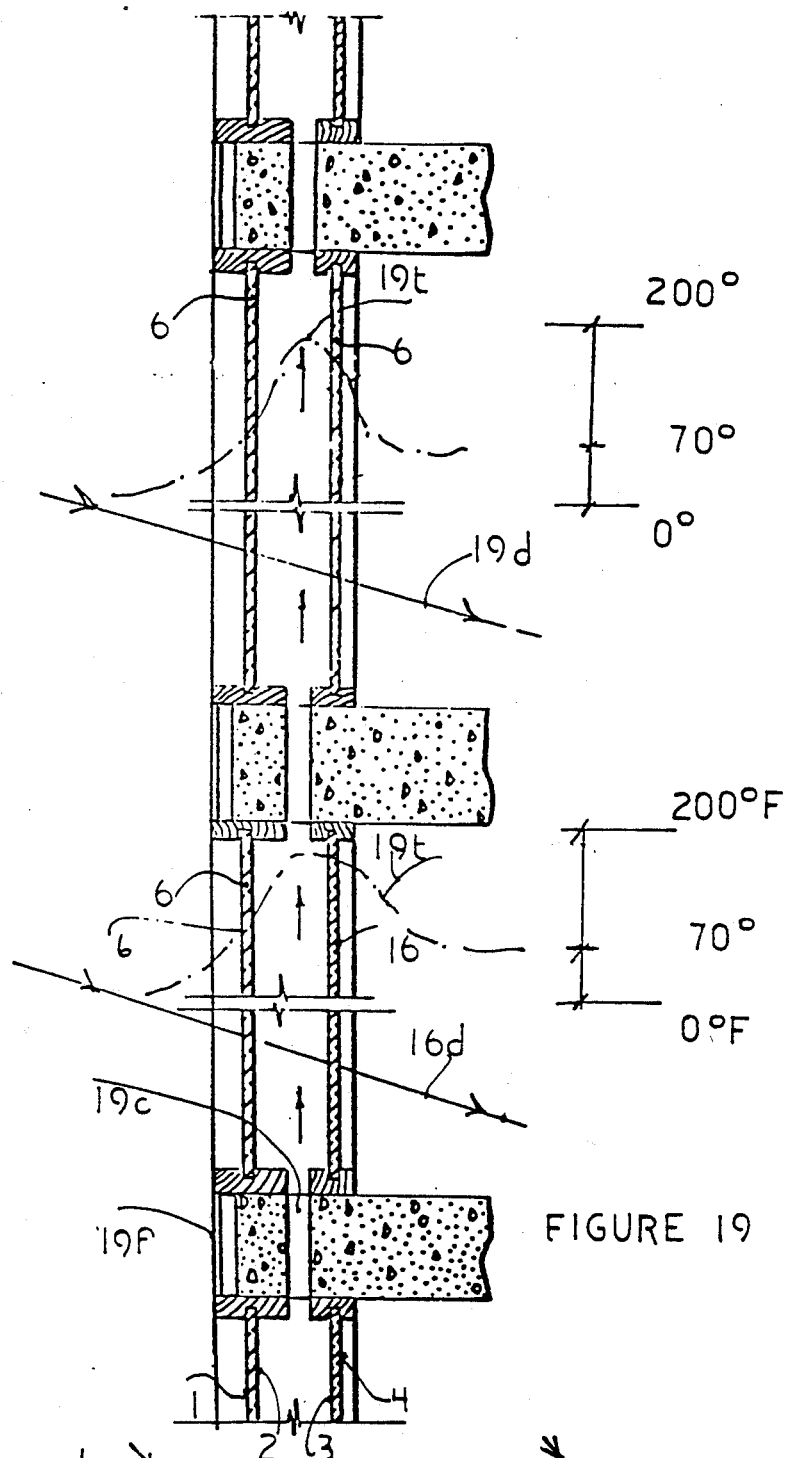
Figure 20:
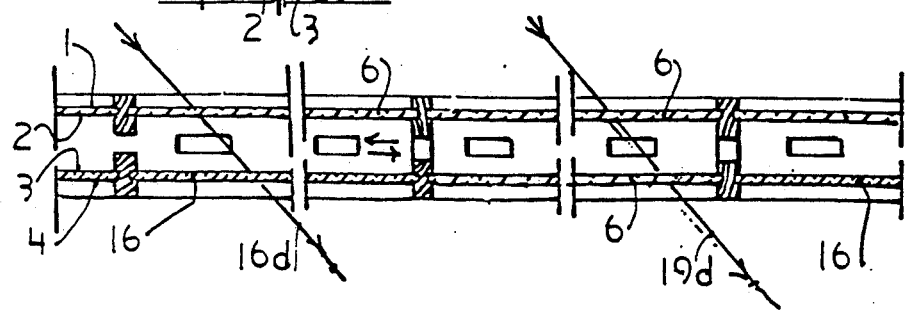

FIG. 19: Shows a vertical section through the collector multi-story manifold with alternate tinted conversion inner boundaries of flow 6-16 interspersed with entirely transparent inner boundaries of flow 6—6. This FIG. 19 and 20 show an entirely independent collector flat glass system that functions entirely efficiently by itself and may form the entire perimeter of a building with direct gain through the absorber 16d and direct gain through transparent inner panes 19d. Summer temperatures may be modulated by a no flow status for the airstream or by reverse venting to the exterior 19v. Passages 19c in the slab permit the continuation of flow from story to story. A still-air cavity with glass fascia 19f prevents loss from the slab to exterior. A heat mirror coating on surface 2 of the outer pane 6 improves the performance and insulation value.

FIG. 20: Shows a plan view of the independent tempered flat glass system with alternate tinted and clear inner boundaries of flow. Inlets and outlets are provided by fans 15 or vents see FIG. 16 or windows 13 or doors 14. Opened wood frames permit planar flow in multiple directions for low temperature collection. For high temperature collection steel frames covered with concrete or concrete extruded opened frames are necessary. Direct gain 19d through clear glass through the transparent airstream is attained throughout the entire multi-story rise of the airstream. Direct gain 16d through the tinted absorber panes 16 allows a semi-gain by radiation to interior and some light transmission. The airstream enters the interior for direct use at each story and building air rejoins the airstream to complete the multi-story Trombe FIG. 2, 3, 4 and 5.

Figures 21, 22:
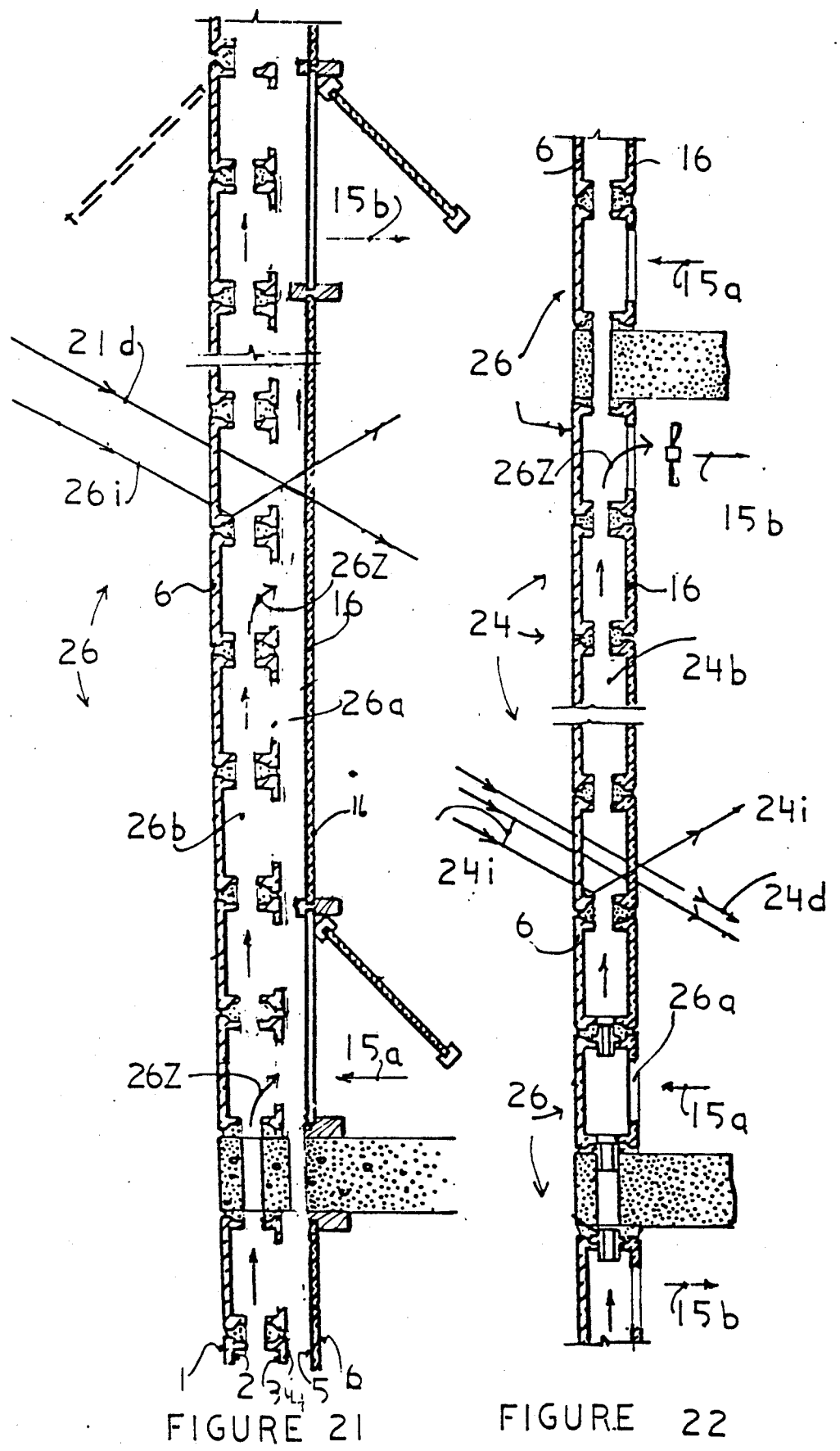

FIG. 21: Shows a vertical section through a planar manifold bounding a multi-story airstream in which the outer boundary for the airstream is comprised of coverplate glass block 26 and the inner boundary of flow is comprised of flat, tempered tinted conversion glass with operable vents for inlets and outlets each story. The glass block and flat glass rest on the slab and are in separate frames to provide thermal break. The flat tempered tinted glass (16) by virtue of its spaced distance from the coverplate block 26, forms a larger vessel of containment for the passing airstream thus allowing space for the expanding warm air to remain nearer the interior ambient. Airstream passing through chambers 26b exit in z direction through 26z opening to enter vertical duct 21f.

FIG. 22: Shows a vertical section through an array of tinted posterior half glass block (24) each opened on four sides for planar manifold flow (27). The anterior panes of the block are transparent and may have an optional heat mirror coating on surface 2. The posterior tinted panes (16) absorb and convert incident light to heat wavelengths for convective transport by the airstream. That portion of incident energy which is not converted to heat passes through the absorber for direct gain to the interior (24d) forming a glowing warm wall which bounds both the warm airstream and the room itself. This system is an independent collector system operable without other components.

Figures 23, 23E, 24:
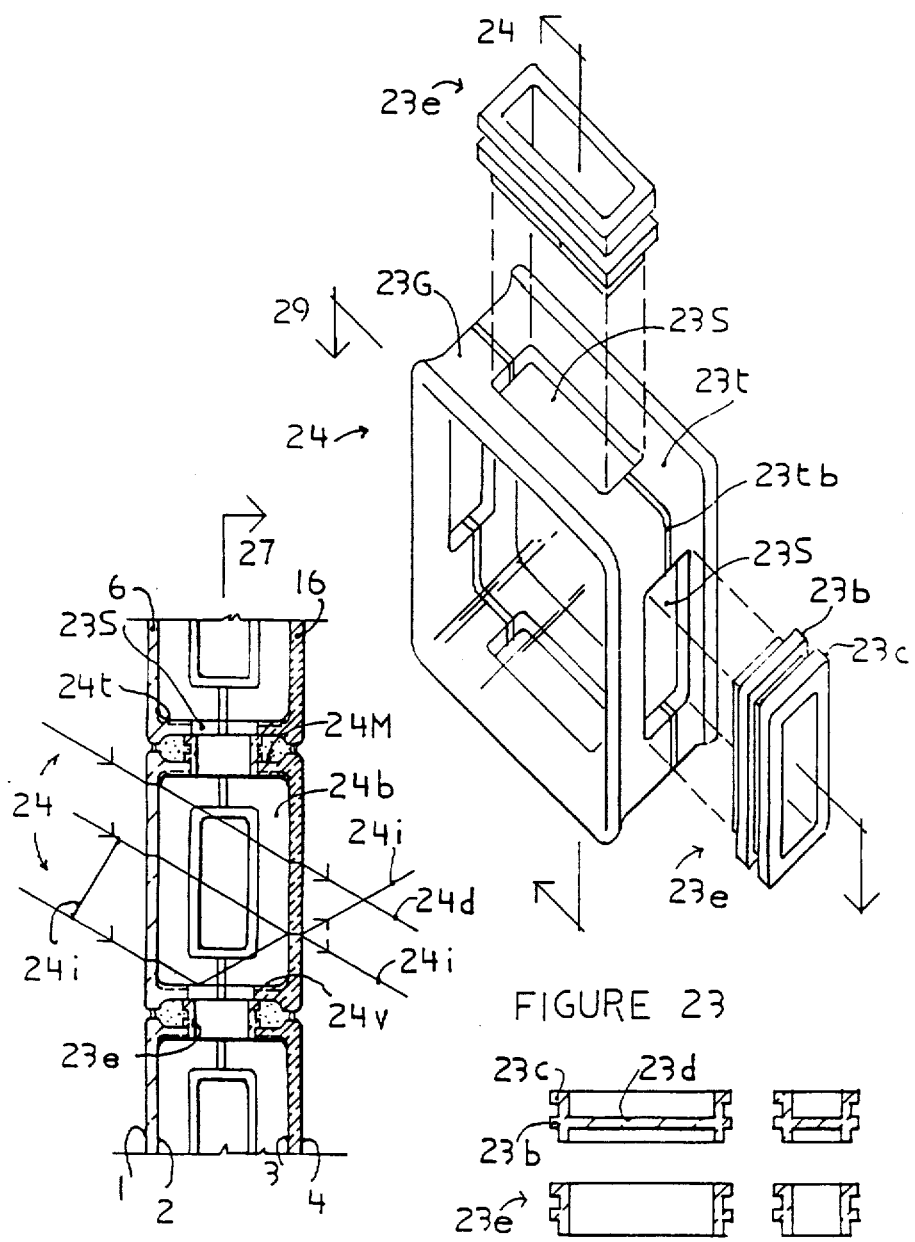
Figures 25, 26:
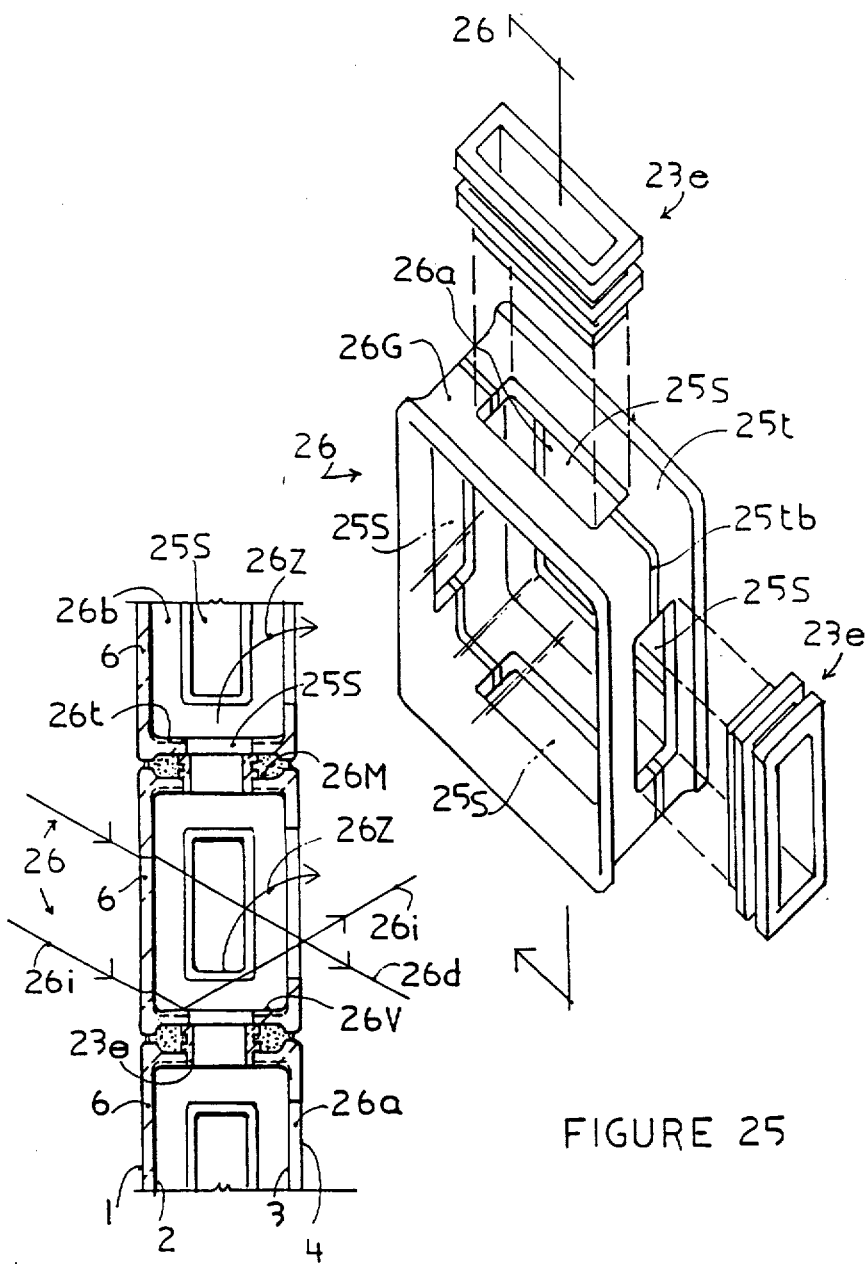

FIG. 23: Shows an isometric view of the conversion glass block 24 with its posterior half body 23t tinted by infusion of nickel, cobalt, or zinc in the melt prior to pressing. The anterior clear portion of the block 23g is bonded at high temperature to the tinted posterior half forming a structurally stable building block whose openings on four sides permit manifold flow when placed in array. Glass rings 23e, with projections 23b that restrain the ring from dropping through the opening 23s and an upper projection 23c that restrains the ring from entering the adjacent upper or lateral blocks, provide a device for restricting mortar from the air passage openings. Two are provided each block for left to right mortaring. The openings each side 23s comprise no greater than 25% of the mortar bed for stability. When the mortar restricting rings have a solid membrane closing the inner opening 23d, the rings become plugs which are used to stop the flow at blocks adjacent to entries or exits from the airstream. The raised edge rims which surround the front and rear faces of the block are thickened to strengthen the structural compressive strength of the block.

FIG. 24: A vertical section through an array of block 24 shows an increased thickness of glass (24t) around flow openings to compensate for loss of strength due to introduction of flow openings. The tinted posterior pane (16) permits passage of 40% light to interior and 60% absorption and conversion for convective transfer. The anterior clear pane may have a heat mirror coating option at surface 2. The reflective glass sidewalls 24v of inner flow cavity 24b flow cavity 24b provide specular surfaces which reflect light incident at low angles (early winter AM) toward the absorber surfaces for overlapping incidence on the absorber 24i. The mortar restraining devices (23e. form the interconnecting passages for air flow through all adjacent blocks thus attaining airstream flow through planar manifold comprised of glass flow blocks with direct gain through the absorber 24d. Matrix surfaces are numbered in sequence with respect to radiation. Surfaces 1 and 2 being the first and second surfaces of the first pane, surfaces 3 and 4 being the first and second surfaces of the second pane, which is standard nomenclature in double pane window and collector construction. Pane 16 in this notation is always a tinted pane. Pane 6 is always a transparent pane not be confused with surface 6 which occurs only in compound blocks.

Figures 25, 26:
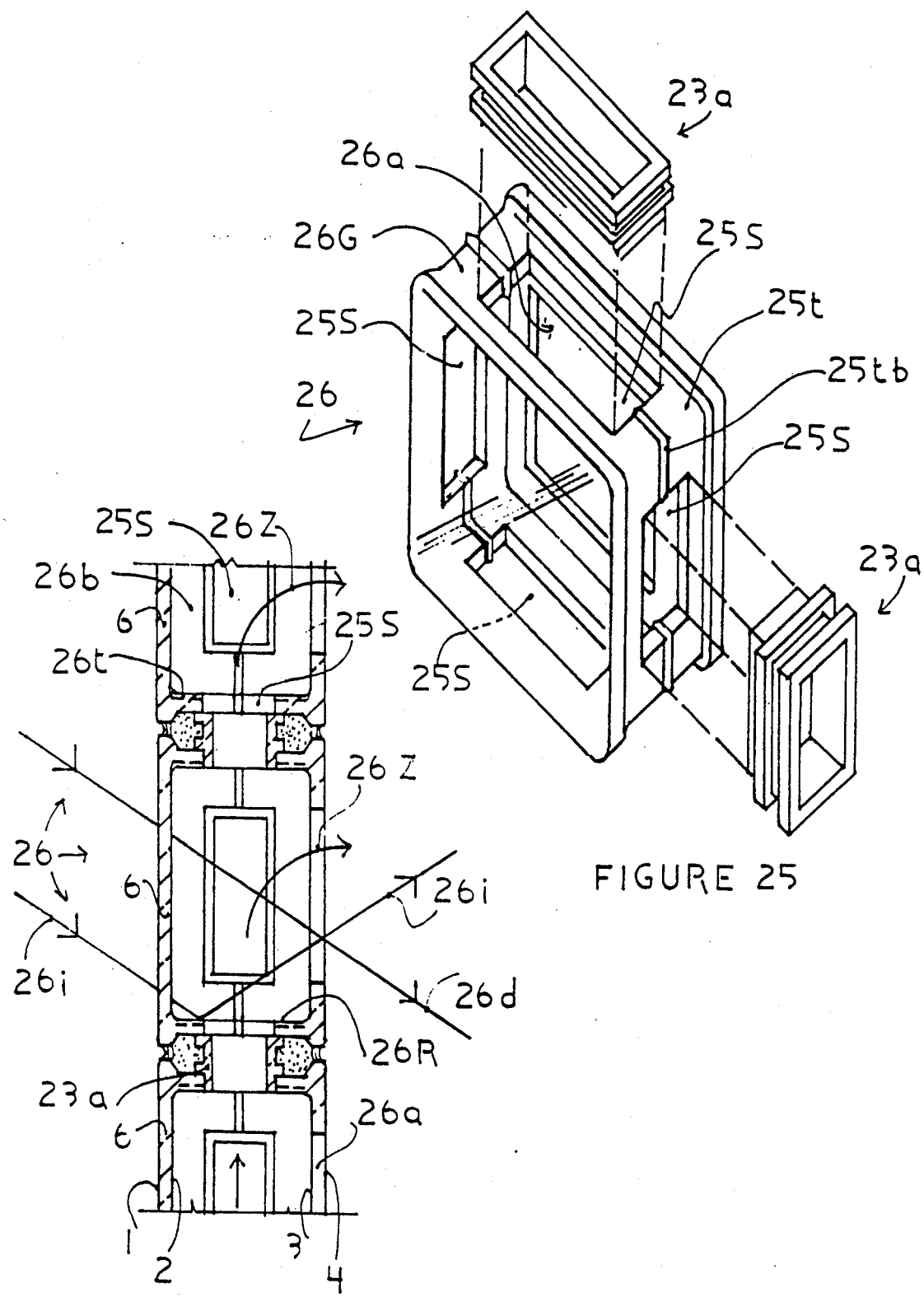

FIG. 25: Shows an axonometric view of a transparent coverplate glass block 26 with flow openings 25s centered on each of four sides and a fifth opening 26a in the posterior face with a circular diameter no greater than ⅜ to 7/10 the largest face area of the block. The edge rims of the block are thickened 26t around all openings to re-inforce the structural stability of the block. This block permits x, y, z flow for exit/entry and acts as a coverplate block for compound systems. Four possible paths exist for air entering the lower opening 25s comprised of 27d, 27c, 27b, 26z the z path.

FIG. 26: Shows a vertical section through FIG. 25 block 26 with entirely transparent boundaries or conversely all boundaries can be tinted for solar interior courtyard uses. The flow openings on each side 25s permit vertical, lateral flow and the back opening 26a permits z 26z flow for passage of light and air from chamber 26b to interior masonry or other conversion surfaces. This coverplate block may be used over existing masonry walls (34) to convert them to collector walls or over flat rigid foam glass insulation to attain collector wall or roof manifold flow. This block in vertical or horizontal array provides a large area for entry or exit of air from the airstream. The same mortar restraint devices (23e) serve to form air passages as in block 24. Specular reflection 26i from inner cavity side walls 26v re-directs low angle incident light toward absorber masonry or foam glass.

FIG. 27: Shows a vertical section through an array showing the planar flow in its lateral mix through horizontal and vertical connecting passages. The flow pattern permitted allows air to enter the base opening of each block 27s, and move in 3 directions of dispersal toward openings 27b, 27c and 27d. This three path choice for the airstream permits it to seek a dynamic path equalizing low and high pressure areas caused by cool surfaces from mortar shadow and warm surface from direct sunlight on varying portions of the inner cavity surfaces 28v. Thus air will move freely from adjacent cavities actually passing in mutually opposite directions through the same openings depending on the prevailing direction of incidence of sunlight and the adjacent location of warm and cool juxtaposed surfaces. This free flow of a rising warming gas through the multi-directional paths afforded by the block openings encourages the natural thermosiphon velocity and decreases stagnation potential. As the total height of rise increases (FIG. 4) for the total array a chimney effect is added to the natural flow path, virtually assuring a rapid collective and distributive airstream of high efficiency. Mortar restricting devices 23e comprised of glass or material of similar thermal expansion coefficients provide air passages. Internal cavity sidewalls are shown at 24v, 26v and 28v. External cavity sidewalls are shown at 24m, 26m, 28m.

FIG. 28: Shows a vertical section through an array of glass block 24 modified for flow and in which the lower portion of collective flow are bounded by clear anterior panes 6 and the inner boundaries formed by tinted conversion panes 16 which provide a high temperature airstream, which rises to pass through array 28a the entirely untinted clear flow blocks 28 of the upper portions of the collective airstream rise. Thus a transparent warming airstream is induced through entirely transparent glass block modified for flow, attaining a warm air thermal blanket passing through the transparent manifold and attaining direct gain to the interior 28d during the collection cycle while simultaneously forming the exterior wall of the building and providing warm air for remote use. Opaque mortar intervals provide total summer shading.

FIG. 28a: Shows the entirely transparent flow block 28 continuing the planar manifold vertical flow from lower adjacent conversion blocks 24, thus attaining direct gain 28d through a warming airstream flowing through clear manifold chambers 28b.

FIG. 29: A plan view of 27 showing clear anterior pane 6 of glass block 24 and the tinted conversion posterior pane 16. Lateral flow openings with mortar restraint 23e connects openings left to right. Low angle incidence is reflected toward absorber 29i.

FIG. 29a: Shows a plan view of the clear flow block 28 connecting the planar manifold in horizontal flow directions, with direct gain 28d to interior through the airstream moving through chamber 28b.

Figures 30, 31:
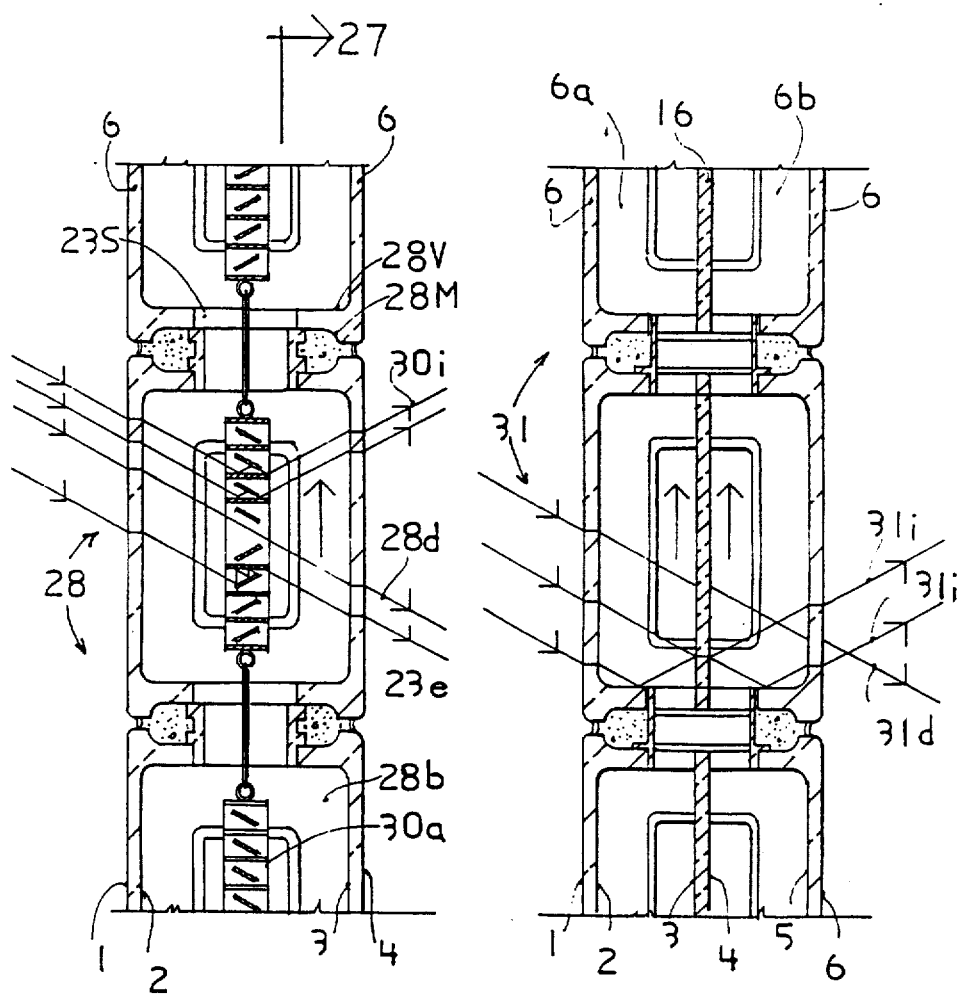
FIG. 30 shows a block with photo voltaics.
FIG. 31 shows a block with an internal conversion pane.

FIG. 30: Shows a vertical section through the clear glass flow block 28, but with the addition of optional conversion mechanisms such as photovoltaic cells 38 or as shown in 30 concentric copper rings 30a suspended for conversion purposes with air flow removing high temperatures of copper surfaces by convective airstream flow.

FIG. 31: Shows a vertical section through a glass block 31 modified for planar flow with transparent outer and inner panes (6 and 6) and with a tinted conversion pane (16) structurally bonded at high temperatures between the two clear glass half blocks. Air flow passes through chambers 6a and 6b over the front and back of the tinted conversion pane or over the back side only depending on the total height of the airstream rise and desired temperature for winter collection or summer cooling.

FIG. 32: Shows a vertical section through opposed interacting reflecting surfaces forming the boundaries for airstream flow. A clear glass block 28a is modified for planar flow, in which light reflective one-way coatings cover all inner surfaces of the glass cavity 32b. When heat mirror coatings are used on surface 2 and 3 the planar duct traps heat in the flow chamber for convective transport. When "light mirror" coatings, e.g. one way mirror coating, cover all inner surfaces of the block cavity, random light entering the flow chamber at intervals equal to twice the tangent of the angle of incidence will re-inforce the reflective path through the coated block at intervals 1 and 3, 2 and 4, 1 and 3 and 5. This overlapping reinforced co-incidence of light energy, 32oi, 32 i, ricocheting through the block will effectively heat the airstream passing through the flow chamber as the wavelength and frequencies of light are converted to those of infrared range. This block can also be entirely body tinted, front and back for conversion in secondary uses e.g. solar atriums. Flat glass manifolds may also be formed using this conversion device of opposed interacting reflecting surfaces. A material providing a thermal break is bonded at the midline seam 32m to lessen conductance.

Figure 33:
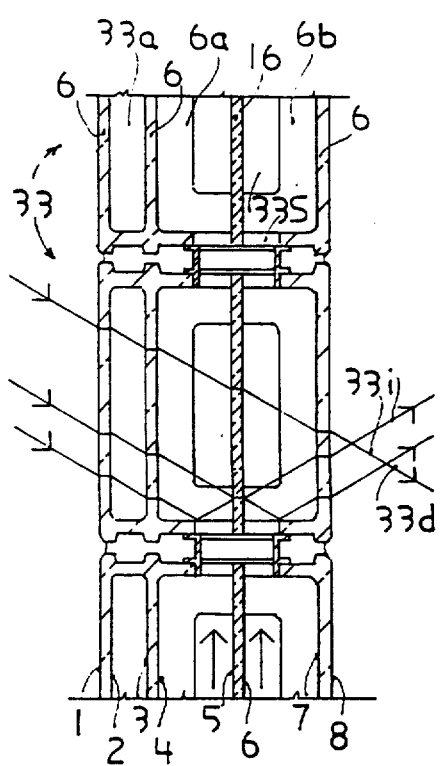
Figure 36:
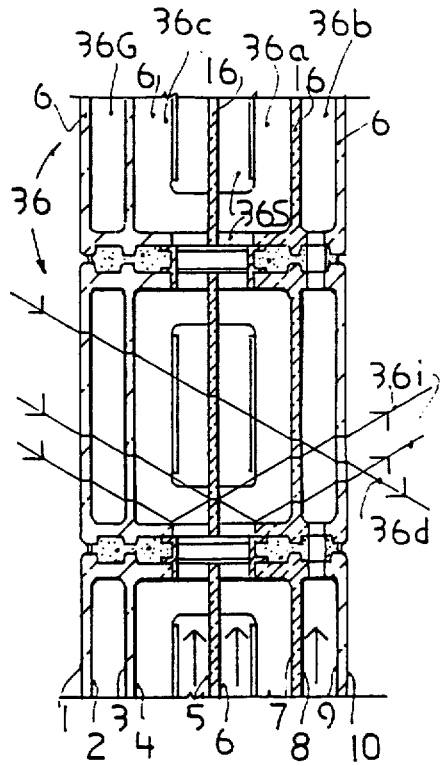

FIG. 33: Shows a vertical section through 31 with an additional still air cavity (33a) on the anterior face of the collector flow block. Due to increased mortar area relative to opening dimension, this block is more stable and loss to the exterior is diminished. Front and back flow of the airstream occur on either side of the tinted absorber pane 16 which is integrally bonded at high temperature in the block cavity. This block requires no heat mirror coatings and is a preferred configuration except that it is difficult to manufacture.

Figure 34:
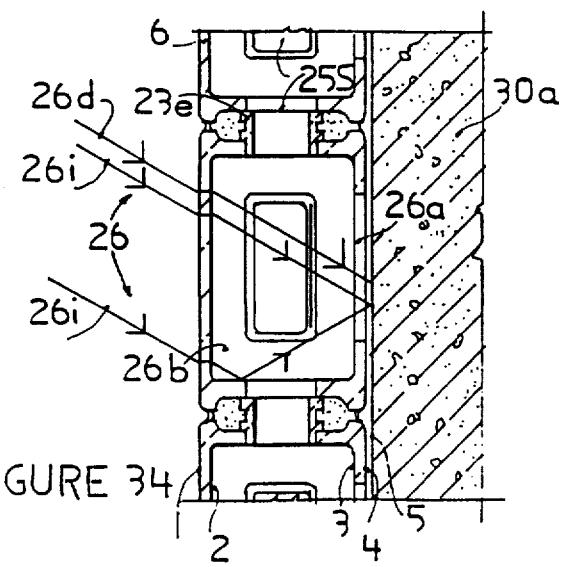
Figures 38, 38A:
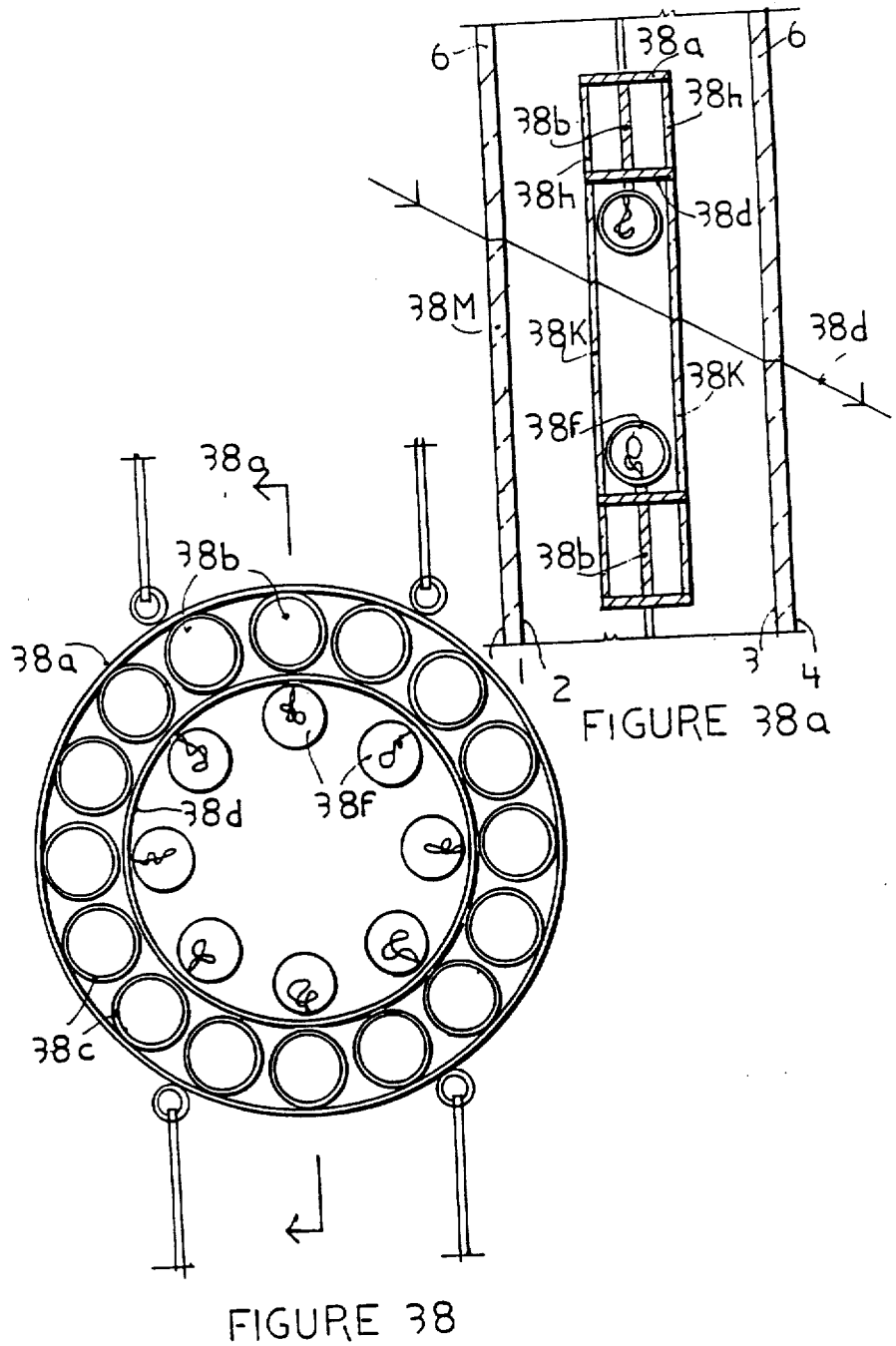
Figure 41:
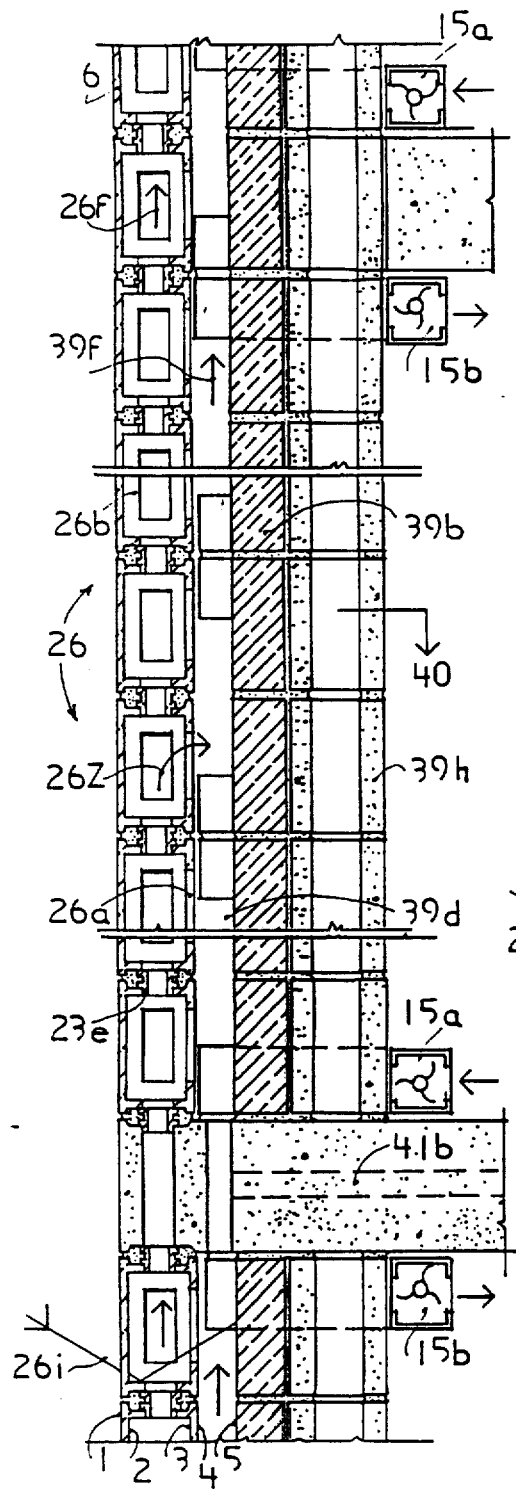
Figure 43:
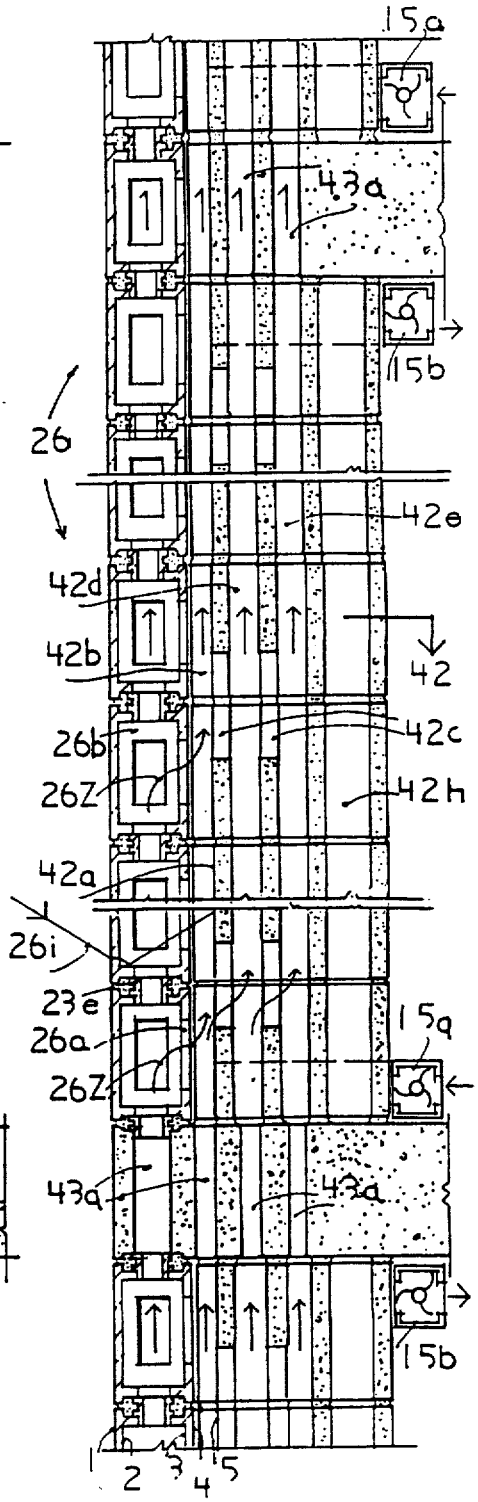
Figure 41:
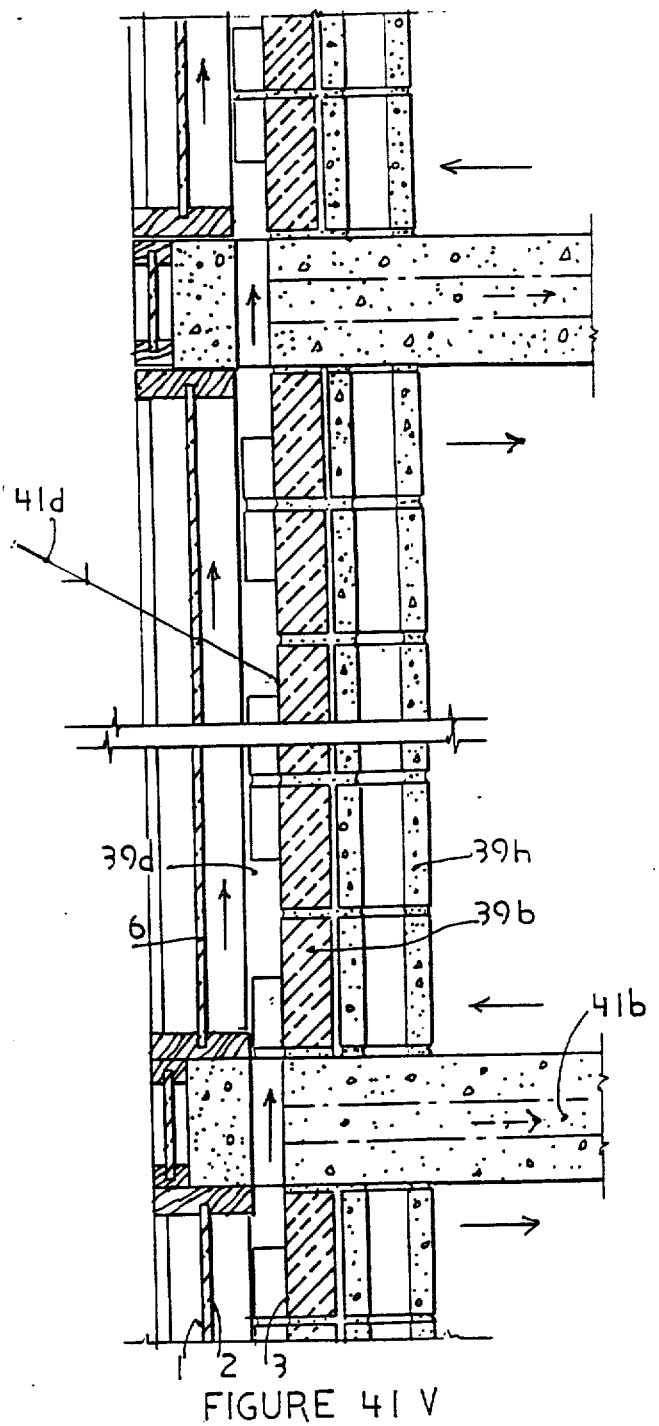
Figure 42:
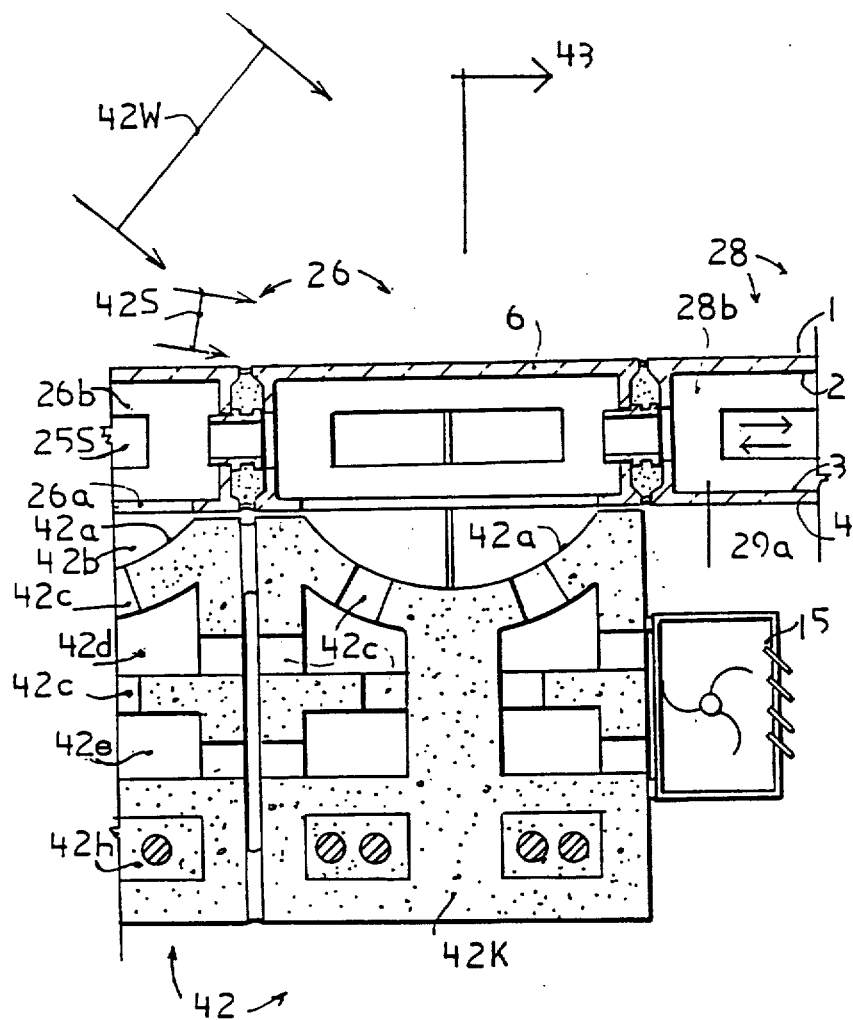
Figure 48:
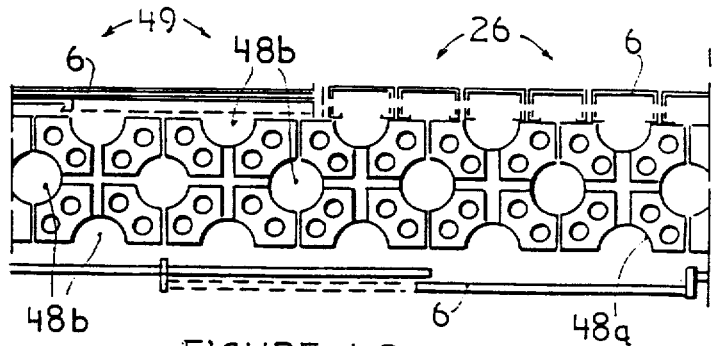
Figure 49:
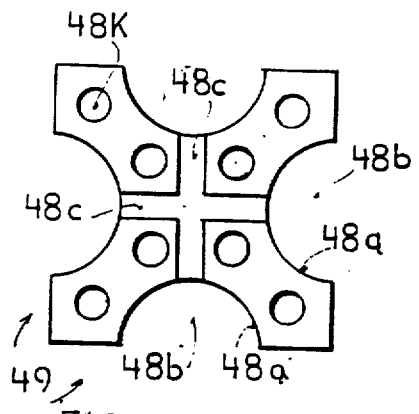
Figure 49A:
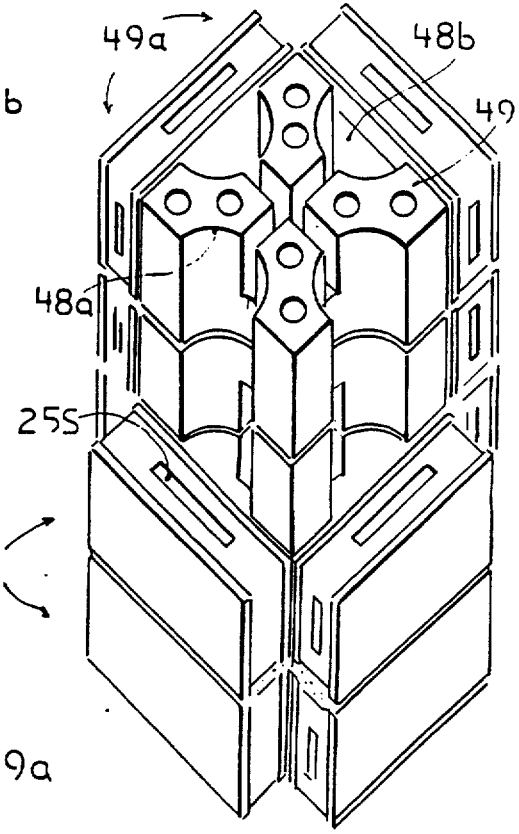
Figure 52:
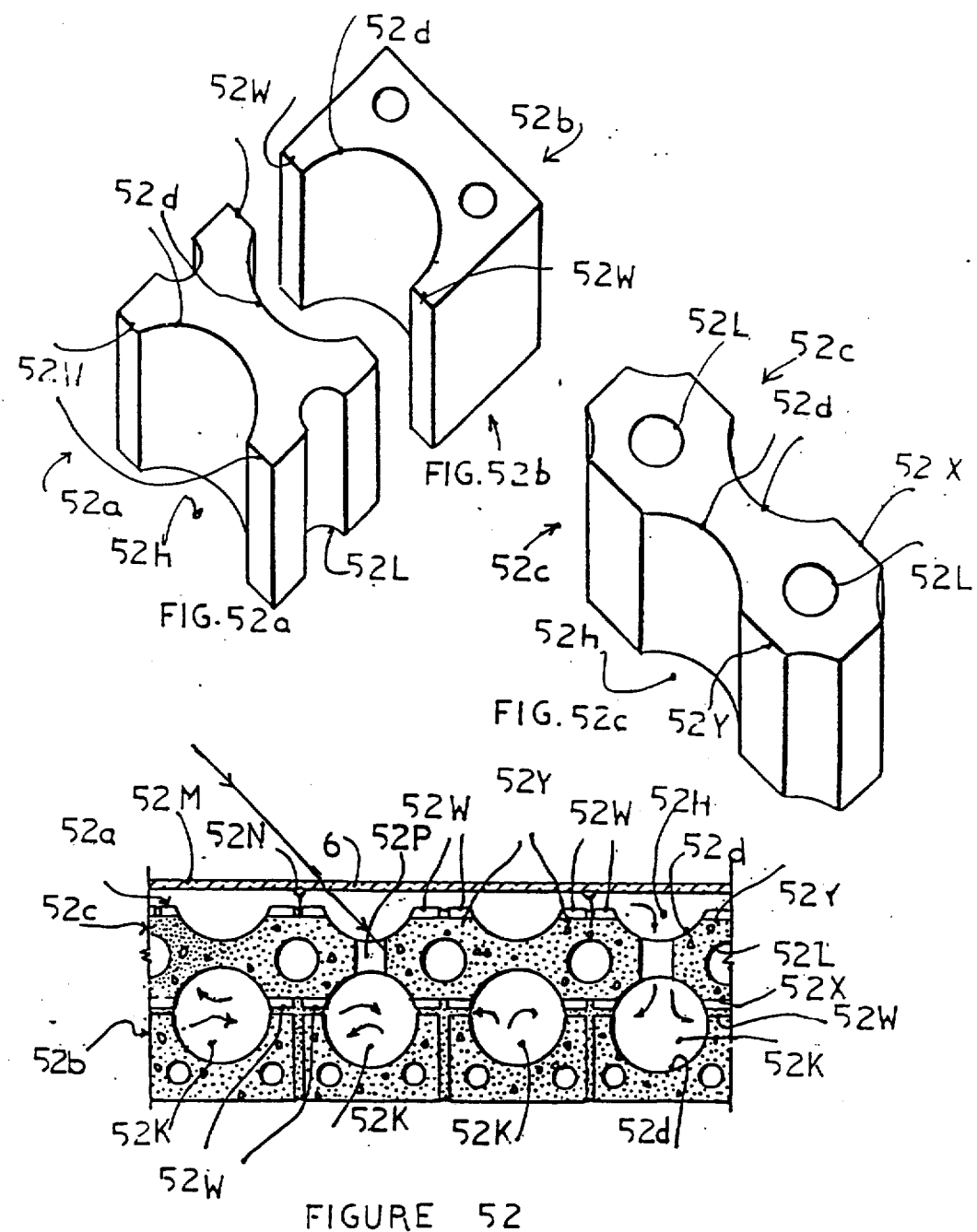

FIG. 34: Shows a vertical section through coverplate glass block 26 placed over existing masonry or rigid foam insulation covered surfaces. The masonry (34a) serves as absorber converting light to heat for convective transport by the airstream. Rigid foam glass insulation may replace the concrete or brick as absorber, in which case the foam glass acts as both absorber and insulator. This coverplate glass block may be used over any absorptive surface, metal, glass masonry or other to convert that surface into a convective planar manifold.

Figure 35:
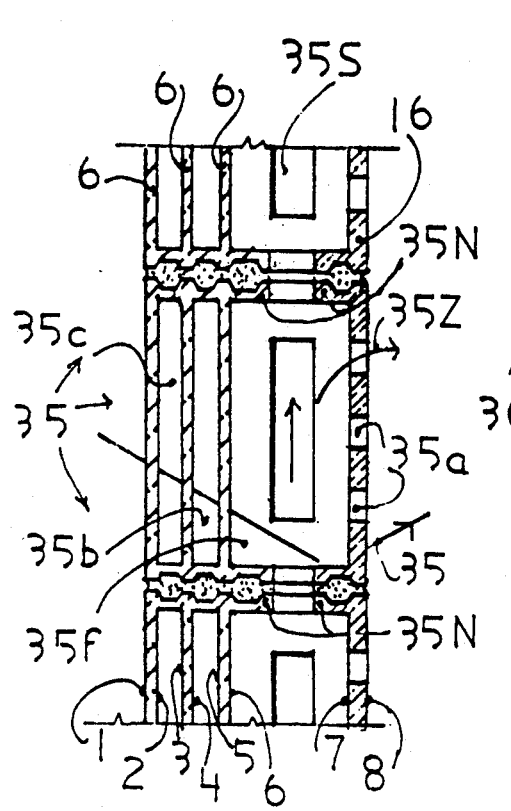

FIG. 35: A vertical section through a compound collector glass block in which two still air cavities 35b and 35c bounded by clear glass are bonded integrally with the hollow single flow chamber block 35f to form the outer transparent boundary for planar manifold flow. The inner boundary of flow is formed by tinted 16, perforated glass 35a which permits x, y, z flow and conversion along the innermost interior pane. This block in array, forms a highly decorative direct use block which will cool itself to optimal temperatures in multi-story flow by direct loss to the interior both by radiation of thermal wavelengths and by semi-transmission of light through the perforations of the partially transparent absorber pane (35d). Raised edges 35h around flow openings restrain mortar.

Figure 36:
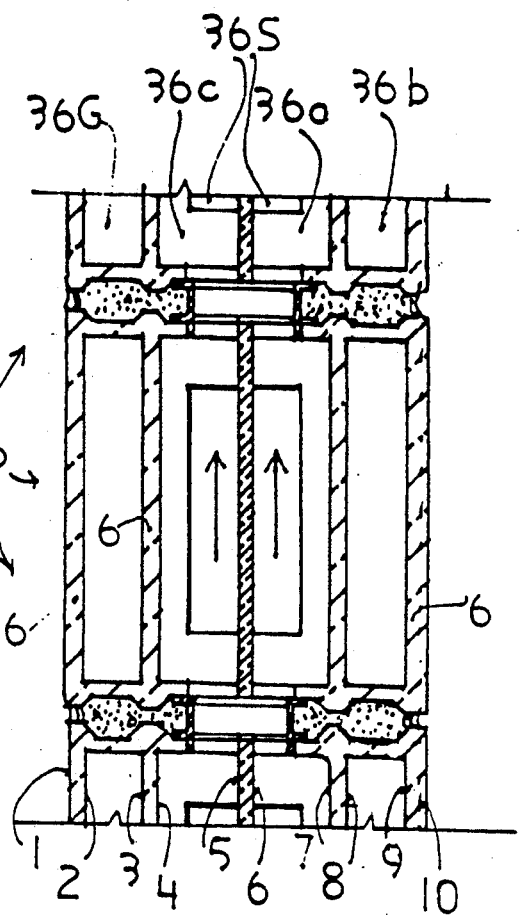

FIG. 36: A vertical section through a multi chamber, parallel flow block in which 3 layers of flow occur behind one still-air cavity 36g. The highest temperature flow is intended to occur in chamber 36a which is bounded by tinted panes 16. The second highest temperature flow occurs in the chamber nearest interior 36b, while the outermost chamber 36c provides the thermal gradient which must decline through the still air chamber to match the outdoor ambient. This collector block is ideal for multi-story flow only if temperatures are kept below 200° F. but it is very difficult to fabricate as a single block. It may be more easily formed by two adjacent block or flat glass walls with similar sequence of flow and boundaries.

Figure 37:
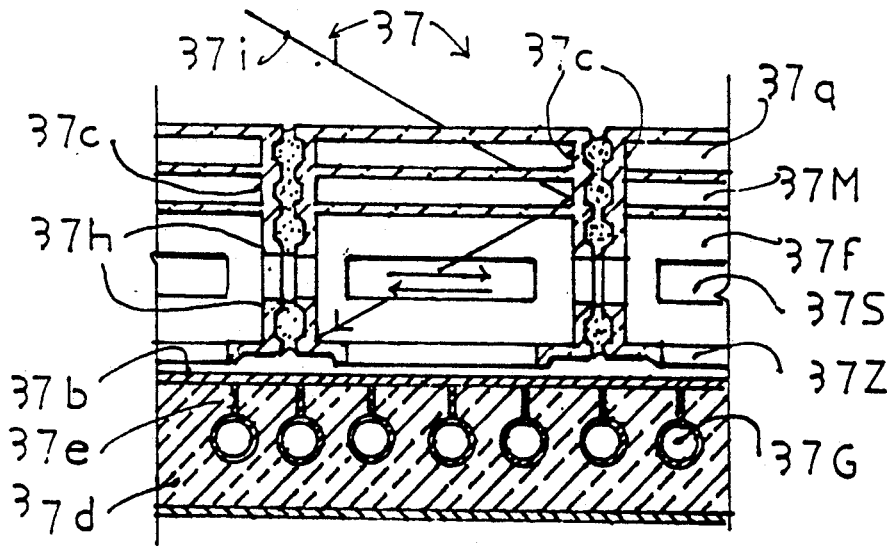

FIG. 37: A plan view of planar manifold air flow through a coverplate glass block in which one or two still air cavities 37a and m are provided on the anterior outer face bounding the airstream flow chamber which is provided with openings in side walls and posterior wall for x, y, z flow. Raised edges (37h) at the flow openings provide mortar restraint to keep air passages free of mortar. This is a highly stable block due to the large area of mortar available. Also the increased specular surface area of the inner cavity walls (37c) makes it highly efficient at re-directing low angle incident light (37i) toward the contiguous absorber, conversion surface (37b). The conversion surface shown in plan view is comprised of a metal sandwich wall filled with rigid foam glass (37d) in which water pipes (37g) are imbedded whose copper walls connect by flanges (37e) to the outer conversion metal surface. Thus in high rise, multistory airstream collection, this compound coverplate glass block forms the outer transparent boundary for the airstream whose excess temperatures are drawn off by the metal water storage wall. Thereby attaining both hot water and hot air from the cumulative multi-story energy incidence. The multi-story airstream would heat excessively if an opaque metallic absorber were used without the water pipe storage system.

Figures 38, 38A:
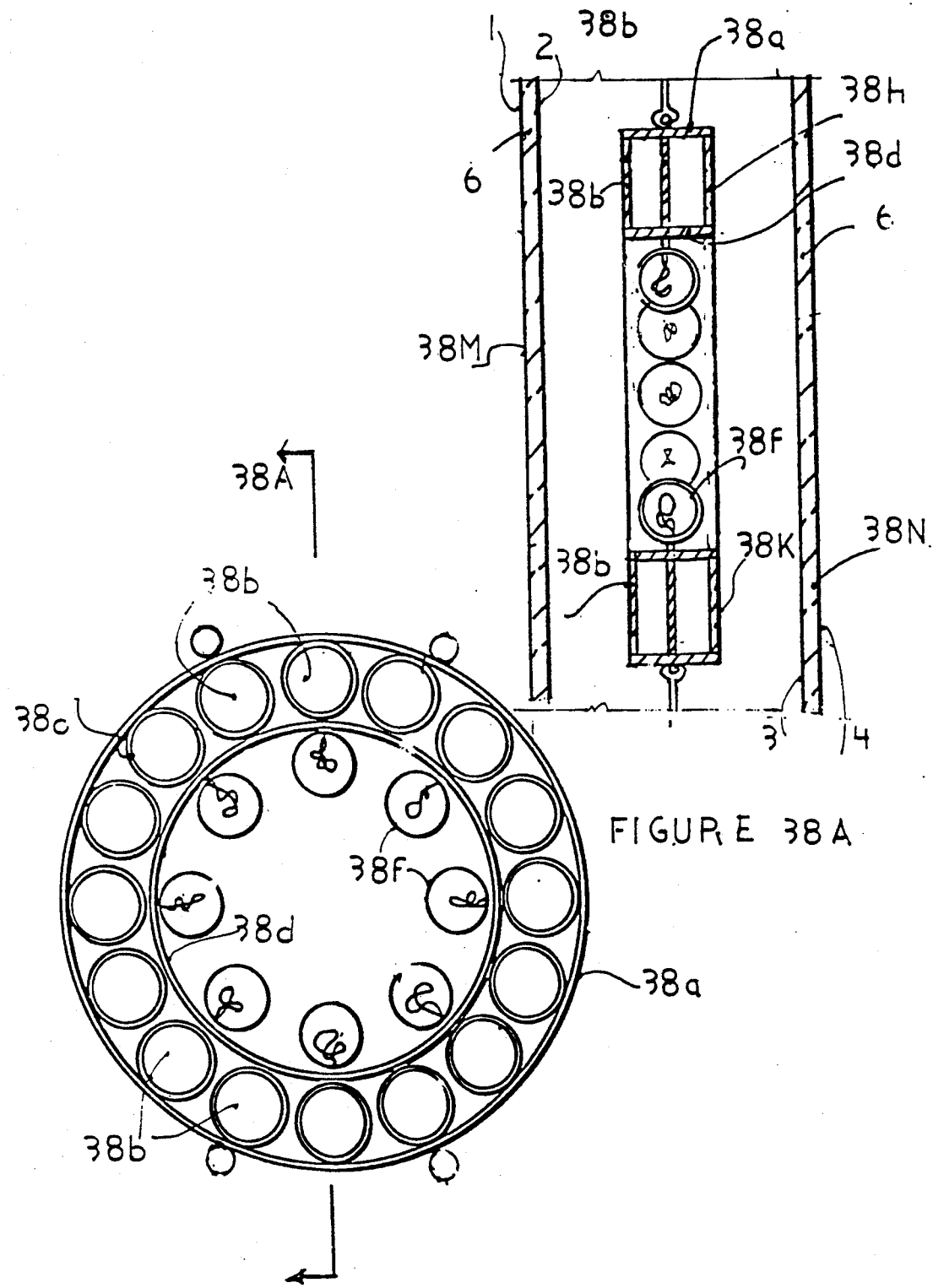
FIGS. 38 and 38a show walls with light bulbs.

FIG. 38: Shows an elevation at close to full scale of a single photovoltaic cell which is designed for placement in hollow glass block wall flow cavities or in spaced intervals in flat glass planar manifold flow to attain a warm air blanket during diffuse daylight or sunlit hours. The circular donut-shaped cell is comprised of 2 concentric conductive metal rings. An outer ring (38a) forms a protective boundary for the fragile silicon inner discs (38b) which comprise the 16 photo chemical light sensitive surfaces, each bounded by a metal conductor (38c) and tangential to the inner metal ring conductor (38d). In the middle air void of the cell, eight mini-light bulbs (38f) project from the innermost concentric ring, which bulbs 38f are caused to illuminate by current generated by light incident on the 16 subcells (38b). A glass boundary (38h) (see FIG. 38A) encases the outer ring of cells (38b) which are fragile, and may enclose the inner void protecting the light bulbs (38k). These photovoltaic cells when placed in transparent flow cavities of glass block or flat glass or masonry covered by glass, are activated by early morning sun or diffuse cloudy day light providing sufficient current to activate the bulbs which in turn emit sufficient heat to warm the cavity in which they are confined, thereby warming the multi-story manifold air prior to operation. When operating temperatures are reached and airstream flow begins the bulbs may continue to shine on intermittent cloudy days. On bright sunny days the mini-lights may turn off by directing current to adjacent batteries which will in turn offer night time current to light the bulbs. The thermal gain on a cloudy day is sufficient to attain a warm still-air thermal blanket bounded by transparent manifold boundaries 38m. The aesthetic effect of the bright mini-bulbs on grey, gloomy diffuse light winter days would be encouraging.

Figure 39:
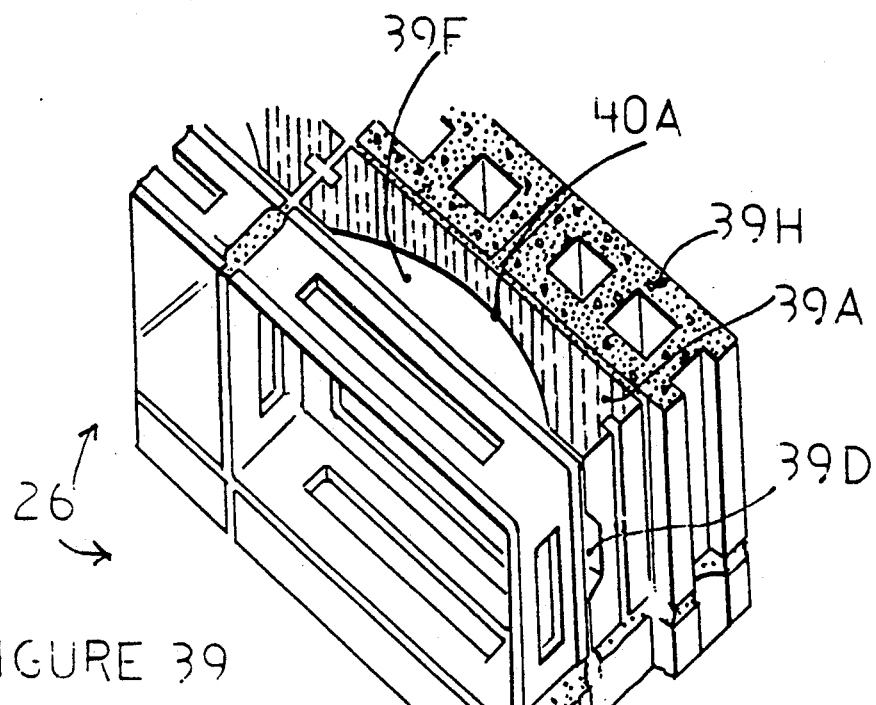
FIG. 39 shows an orthographic projection of a compound collector manifold wall.
Figures 39A, 39B:
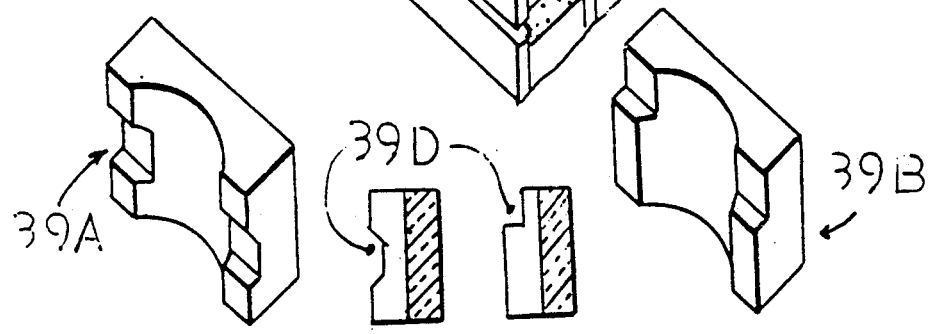

FIG. 39: Shows an orthographic projection of a compound collector manifold wall comprised of glass block coverplate (26) and foam glass cut and contoured into flow block dimensions (39a or 39b), both 26 and 39a are mortared and stacked with reinforcing mesh tied to a typical masonry block structural back-up wall. The anterior outer boundary of flow is provided by glass flow block 26 and the inner boundary of flow is provided by the curved surface of the rigid foam glass block. The curvature 40a forms a vertical duct 39f for air flow and the side notches (39d) provide lateral flow to adjacent blocks in the array. The dark colored foam glass (39a) acts as absorber converting light to heat for convective transfer to the airstream. The same foam glass block (39a or 39b) also provides an insulating value restricting loss from the interior and trapping building heat in the structural masonry block (39h).

Figure 40:
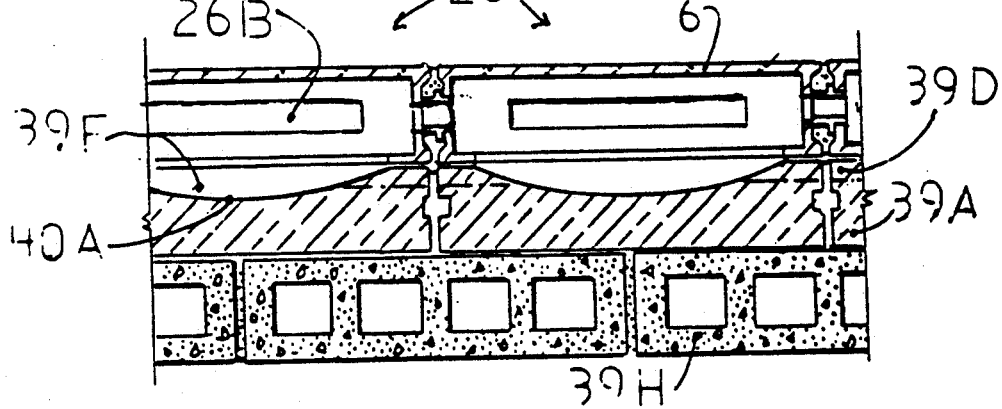
FIG. 40 shows a plan section of a glass block coverplate in another embodiment.

FIG. 40: Shows a plan section of the glass block coverplate (26) forming the outer boundary of flow, with lateral flow openings (25s) for communication with adjacent blocks. Notched flow openings (39d) in the rigid foam block permit parallel lateral flow so that the airstream may pass laterally both through the glass block opening and the foam block openings in two layers of flow. The curvature of the outer facing foam provides a vertical air 39f duct which parallels the vertical air duct provided by the glass block (26) flow chamber. Thus x, y, and z flow is attained between the outer flow chamber (26b) and the inner curved chamber which provides the conversion surface (40a). A multi-story array of such compound configurations provides a vertical planar manifold of any dimension allowing airstream collection and distribution through the structural wall so formed. This collector wall, by virtue of foamglass flow block 39a, 39b provides an absorber which is also an insulator, there by attaining a net gain zero-loss energy wall. Flat glass may also be used to form the outer transparent boundary for flow. When flat glass is used as the coverplate (see FIG. 41v) a punched steel channel frame must be provided to sustain the flat glass, or the floor slab extended for support.

Figure 41:
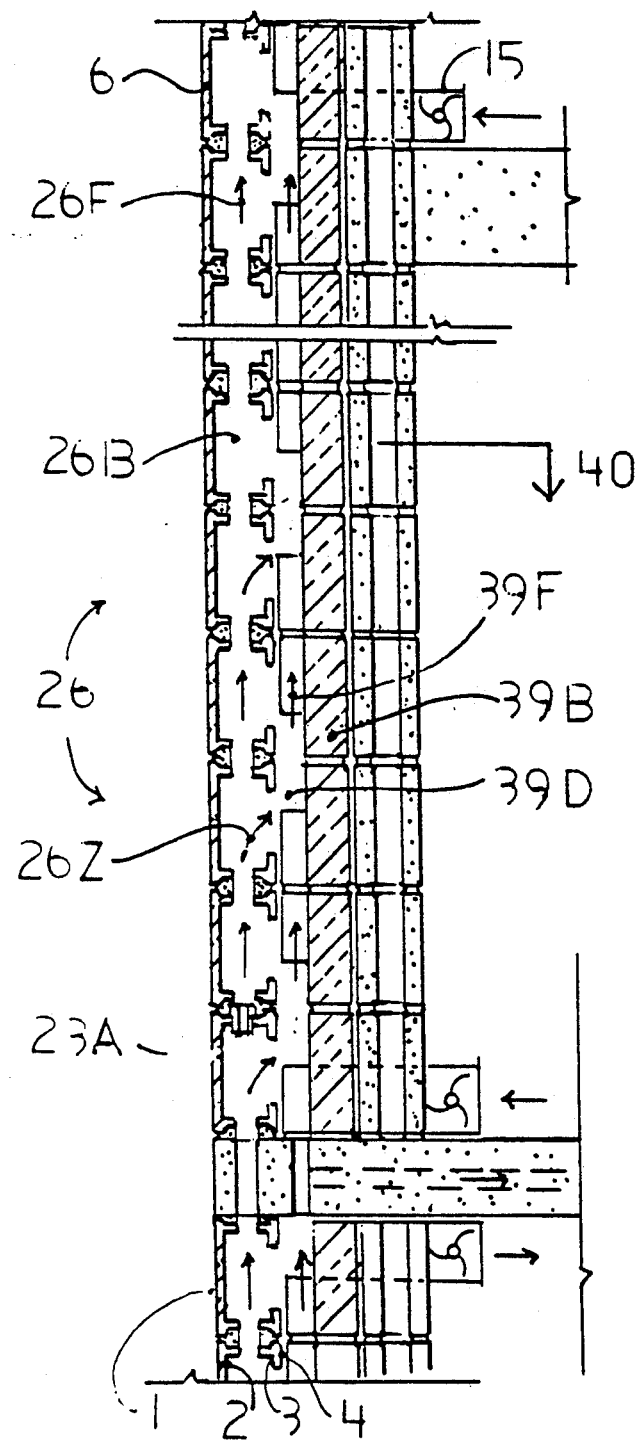
FIG. 41 and 41a show vertical multi-story wall comprising blocks of FIG. 40.

FIG. 41: Shows a multi-story vertical section through the vertical planes of flow of FIG. 40, with glass block coverplate 26 forming the transparent outer boundary of flow and the outer flow chamber 26b with flow through back opening 26a to communicate with inner flow ducts 39f formed by foamglass block 39b. Structural masonry common block 39h stabilizes the vertical wall manifold. Openings in the floor slab (41a) permit continuous flow from story to story, while integration of the floor slab with the wall collector provides structural stability and also the option for air flow through passages in the extruded floor planks of masonry with openings for flow within the concrete plank serving as ducts 41b to the north wall. Fan vents (15a) provide lower entry for building air to collector airstream and fan vent (15b) provides upper exit for air to leave collector airstream to complete thermosiphon loop through interior spaces. This collector system may be used with clear flow block 28 in lateral array 29a as shown in FIG. 12 to continue the planar flow between masonry foam glass collector walls. Since this collector conceivably could overheat as there is no loss through the absorber to the interior, it is necessary (see FIG. 12) to intersperse clear flow blocks 28 or clear flat glass manifolds 20, 13 laterally connecting collector intervals in order to avoid inefficient losses to the exterior due to overheating. Flat tempered glass may be used as the transparent outer boundary for flow.

Figure 41A:
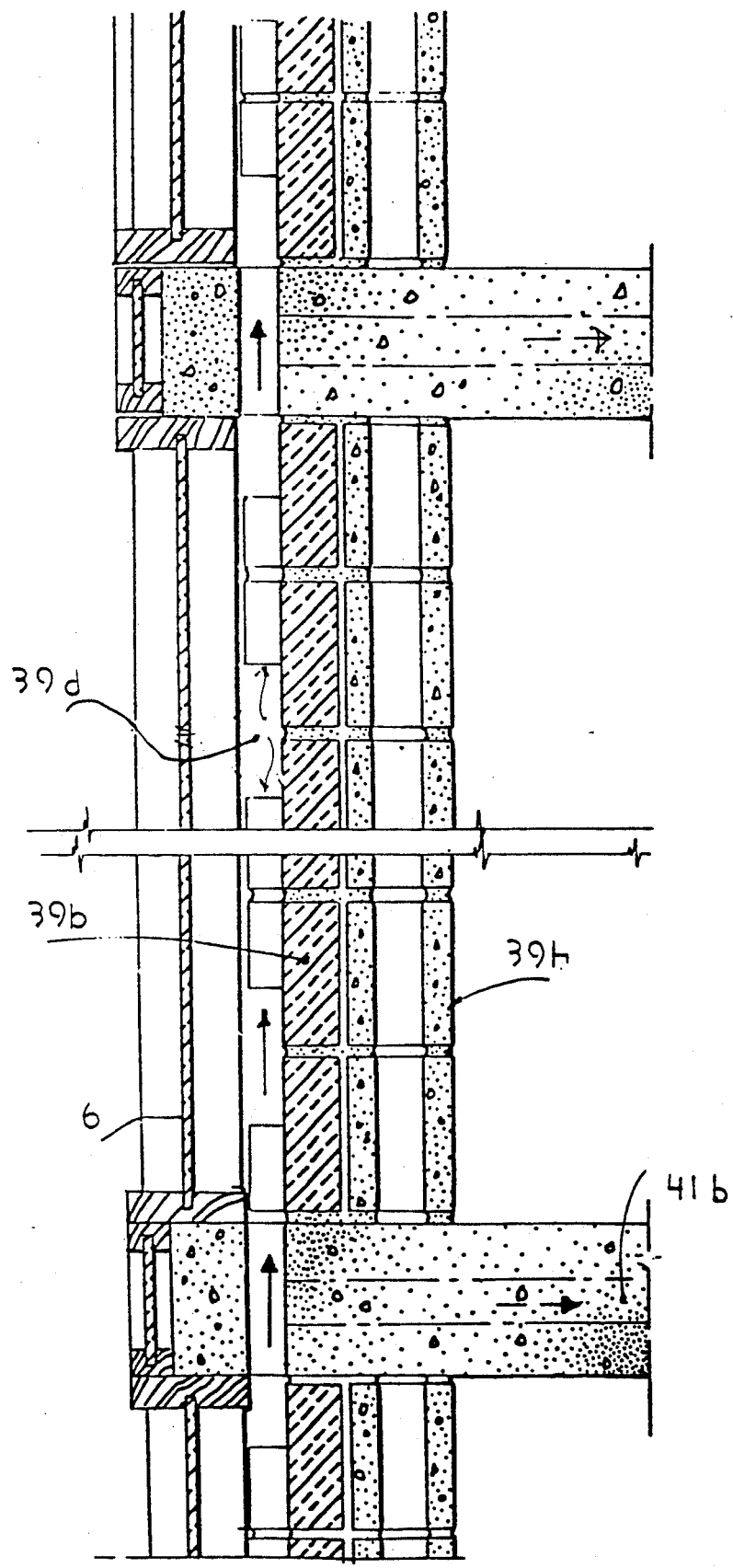

FIG. 41a: Shows a vertical section through the foam glass block wall with flat plate outer boundary of flow.

Figure 42:
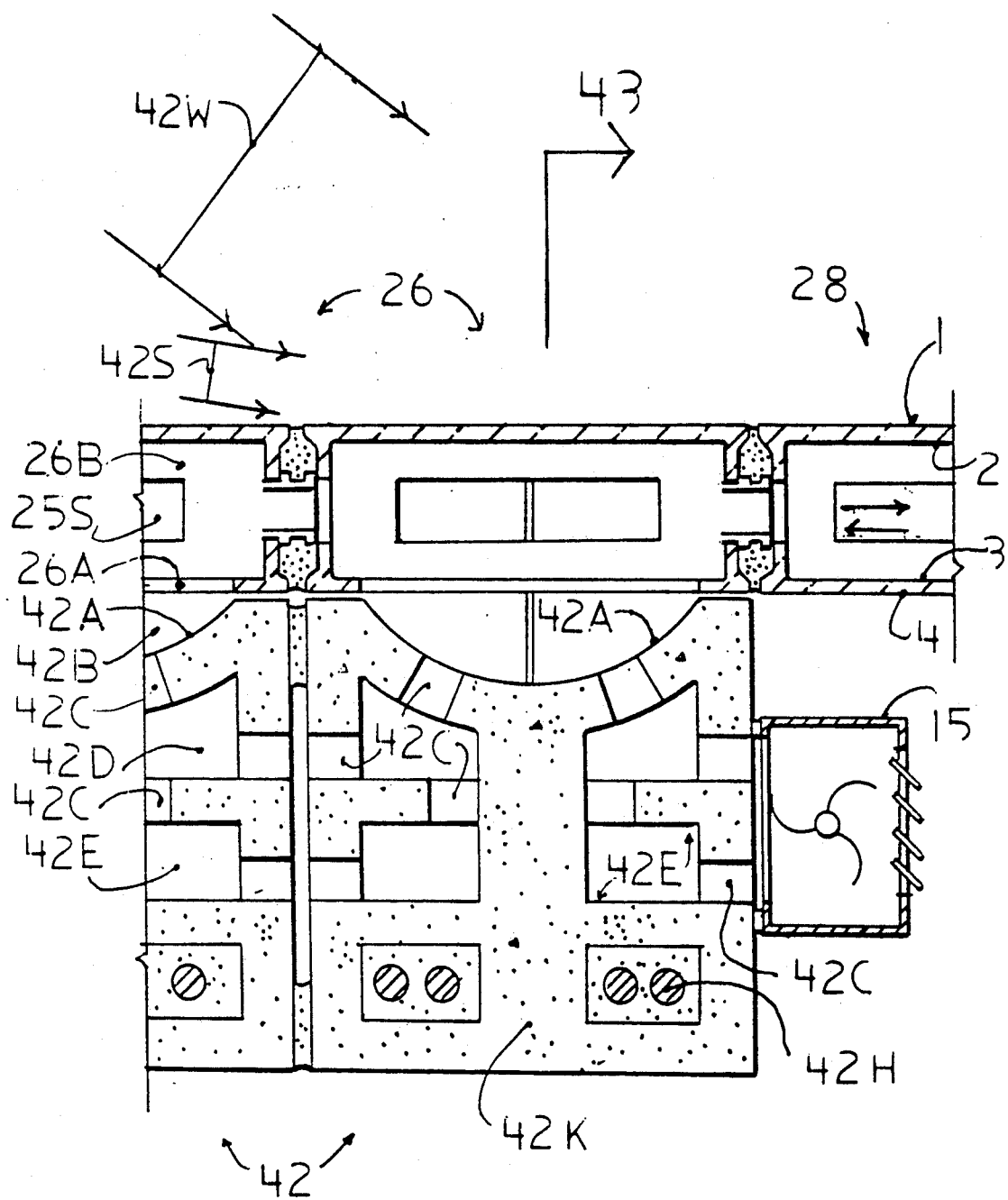
FIG. 42 shows a horizontal plan section through a compound masonry/glass block wall in another embodiment.

FIG. 42: Shows a horizontal plan section through a compound masonry/glass block wall extended surface planar manifold collector. Glass block coverplate 26 forms the outer boundary for airstream flow through the outer flow chamber (26b) which connects through opening 26a for z direction flow into the adjacent masonry flow chambers. The primary masonry conversion surface (42a) is provided by a curvature in the outer facing plane, thus forming a second vertical duct (42b) parallel to the outer glass block flow chamber (26b). This vertical air flow chamber (42b) is directly connected to inner flow chambers by notches (42c) for z direction flow into the inner cooler chambers of flow (42d and 42e). Notches similar to 42c connect all inner chambers for lateral flow. Thus x, y, z flow patterns are provided in which 4 vertical parallel flow chambers 26b, 42b, 42d, and 42e are all interconnected by flow openings or notches 26a, 42c. This parallel intercommunicating flow pulls the warm surface air from 42a inward into the masonry cavities where the warmth is distributed by convective high velocity flow. The multi-story incidence and rise produces potential high temperatures at surface 42a which are alleviated by convective heat transfer to chambers 42d and 42e. The innermost chambers (42h) are reserved for re-inforcing bars for structural loadbearing capacity.

The plane of airstream flow continues from chambers 26b through adjacent clear flow chambers 28b so that a warm airstream is induced through a transparent manifold comprised of clear flow glass block 28 in lateral array 29a or a clear flat glass manifold. Fan unit 15 may remove air from chambers 42d and 42e through notches 42c. The center concrete bearing plane 42k is doubled in width to provide a bearing plane for cantilevered masonry block at each story which project to serve as masonry flow frames for either flat glass or glass block coverplates.

The area shown as masonry concrete (by symbol) is sufficient to retain the loadbearing capacity of the block wall. The notched non-loadbearing passages are easily compensated by the increase in bearing area which is equal to or greater than a standard concrete block. Natural summer shading is provided by mortar shadows shown at 42s at solar azimuth 80°, Jun. 21, 3:00PM. A perfect winter collector "solar window" is shown at 42w for Feb. 21, 3:00PM, 49° azimuth.

Figure 43:
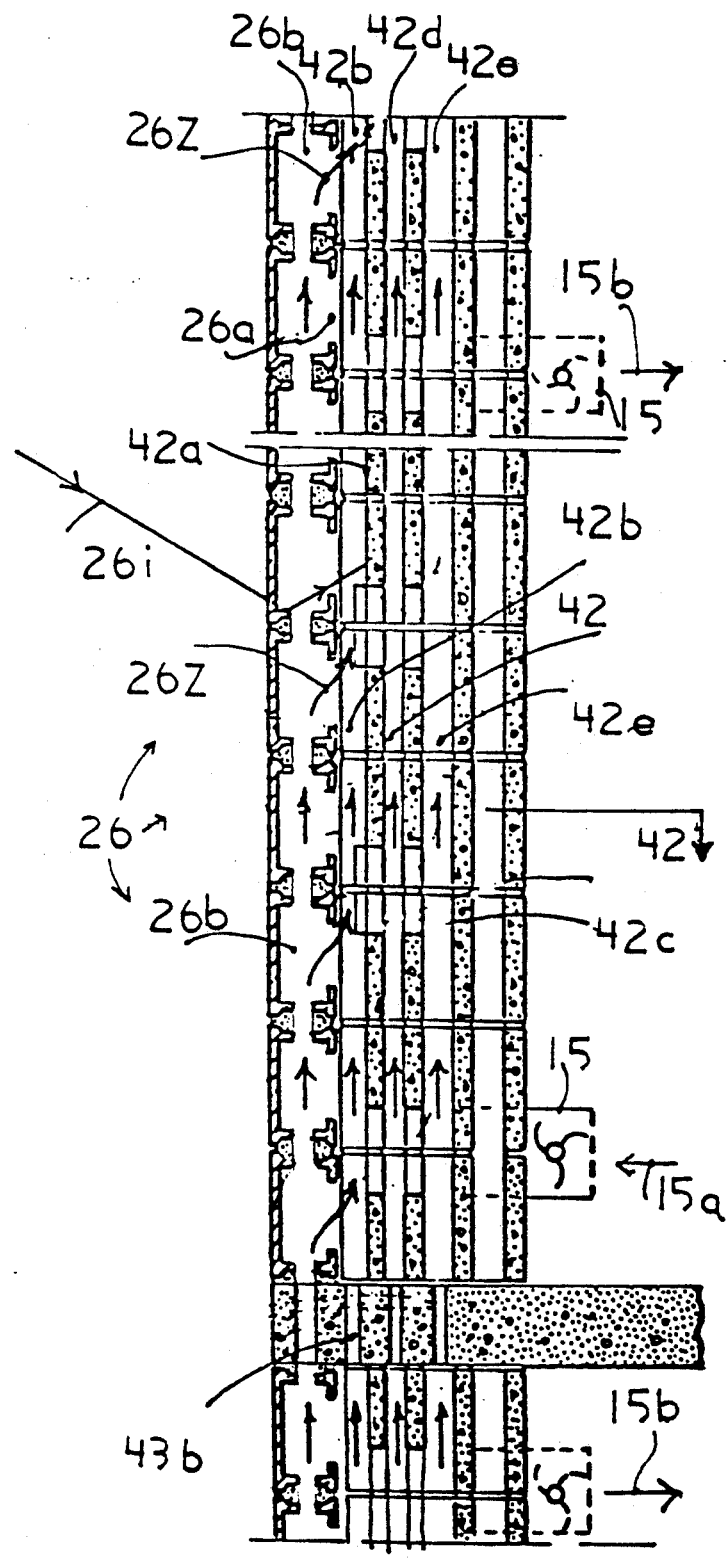
FIG. 43 is a vertical section of FIG. 42.

FIG. 43: Shows a vertical section through a multi-layer flow planar manifold comprised of a multi-story array of configuration 42. The outer transparent boundary of flow is provided by glass block coverplate 26 which also provides the first flow chamber 26b, connected to second flow chamber 42b by opening 26a. Thereafter notches 42c provide passages for lateral flow connecting vertical flow chambers 42d and 42e. Thus a parallel vertical flow pattern of 4 airstreams is formed each of different temperature serving to lessen the temperature of the primary conversion surface 42a. The excessive surface temperatures attainable in multi-story collection are thus avoided as the energy is drawn quickly into the interior secondary convective transfer surfaces which form the boundaries of chambers 42d and 42e. Thus triple the surface area is available for convective heat transfer and triple the air volume is available for heat transport relative to the Trombe. Linear fans 15 are used to push air into the airstream which must be blocked below the entrance of air and also may be used to pull warm air from the airstream which then requires blocking the stream above the exit. Since pressures and temperatures and velocities in the multi-layer planar manifold are extremely complex and varied, the exact rates of flow and rate of exchange with the interior thermal loops require on-site prototype adjustment. The floor slab is shown with openings 43a permitting passage of the airstream from one story to the next. This also provides opportunity for expansion and contraction joints (not shown) as the collector wall will heat and cool each day.

FIG. 44: Shows a plan section of a 3 block compound masonry structural collector wall with a flat glass coverplate 44a. The outermost blocks forming the primary curved absorber surface are comprised of blocks 45 and 45a. Block 45 and 45a have a semi-circular curvature (45d) contouring both front and back vertical faces and quarter circle contours of the same radius taken out of each corner 45e. Block 45a has the same profile and dimensions with the exception that 45a does not extend its bearing area to the extreme dimensions of block 45. This variation in dimension does not affect the loadbearing capacity of the block but does permit passages for the free flow of air around block 45a the "flow block". When block 45 and 45a and 46 are mortared in place, block 46 forms the interior bearing wall flow boundary with the same radius of curvature in its outer face matching that of blocks 45 and 45a, thus a rear vertical duct and air chamber (44d) is formed by juxtaposing 45 and 46. The outermost surface curvature of 45 and 45a form vertical ducts and air chambers 44g. The two vertical air ducts 44d and 44g are connected in the z direction by passages 44c and in the lateral direction by passage 44e. These lateral and z direction passages 44c and 44e are provided by the dimensional partial reduction of block 45a which looks exactly like block 45 and 45 stacks above and below block 45, but which by its dimensionally reduced extremities permits the lateral and transverse flow around its perimeter and between vertical ducts (44d and 44g).

This wall provides a high velocity multi-story collector and planar manifold of x, y, z flow pattern which may have a flat glass outer transparent boundary of flow 44a or a coverplate glass block 26 as the transparent outer flow boundary. Incident light energy is converted to heat on outer surfaces 44b for convective transport from chambers 44g by the high velocity airstream moving freely through all interconnecting passages 44c and 44e to vertical flow chambers 44d. Thus the primary conversion surfaces in direct sunlight cannot overheat because the airstream is constantly drawing the warm air toward the cooler inner chambers of the collector wall.

Masonry mullions 44k are tied by reinforcing mesh to the bearing wall and provide a masonry frame for the flat glass or glass block.

FIG. 45: Shows an orthogonal view of block 45. The concrete masonry symbol on the uppermost surface of the block indicates the bearing area that is to receive mortar for the flow block 45a which stacks above and below block 45. The radius of curvature of both front and back contours of 45 shown at 45d are of such magnitude, that the interval between the centerlines of the two masonry elements forming the curve, matches the 8" modulus of the glass block coverplate 26. As the blocks are coursed, corner radius 45e of each block 45 will form a full half circle with adjacent blocks 45 and 46. Block 45a also conjoins to form the same set of inner and outer ducts 44d and 44g.

FIG. 46: Shows an orthogonal view of block 46 whose frontal curvatures match that of 45 and 45a. This block has openings for re-inforcing bars 46a and a continuous bearing capacity with no notching. The total area available for loading is thus that horizontal surface area of both blocks 45a and 46 which are indicated by the masonry symbol. The total bearing area exceeds or equals that of standard masonry blocks while providing triple the surface area for convective heat transfer and triple the air volume available for heat transport.

FIG. 47: Shows a plan view of blocks 45 and 45a mortared over an existing wall, to form x, y, z flow through openings 44c to internal duct 47a for renovation of existing walls into energy collecting surfaces. An outer transparent boundary of flat glass or glass block 26 forms the exterior boundary of airstream flow. Lateral flow through passages 44e connect ducts 47a to thereby induce air flow through openings 44c.

Figure 48:
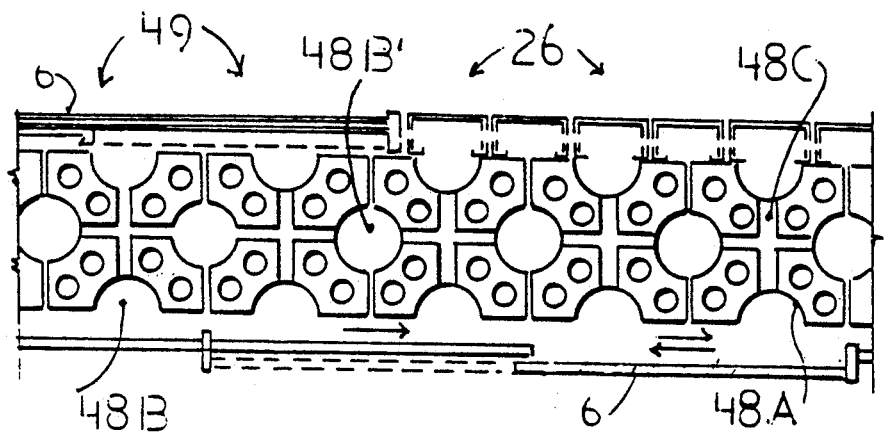

FIG. 48: Shows a plan view of a single masonry block (49) wall, which has a curvature 48a on four opposing vertical faces. Notches of several inches in depth 48c connect opposing curvatures forming lateral and transverse flow passages connecting all vertical air flow chambers (48b). Vertical voids are formed in the solid mass to lighten its weight and offer positioning of rebars 48k. The wall formed by array of block 49 is thus highly versatile in forming internal and external flow ducts 48b and 48c, and may be bounded on the exterior by fixed flat glass, glass block 26 or brick masonry interspersed with transparent flow blocks 26, or flat glass. The interior and exterior surface may be bounded by sliding doors (transparent or opaque) which make possible exit of warm air to the interior or summer cooling of the mass.

Figure 49:
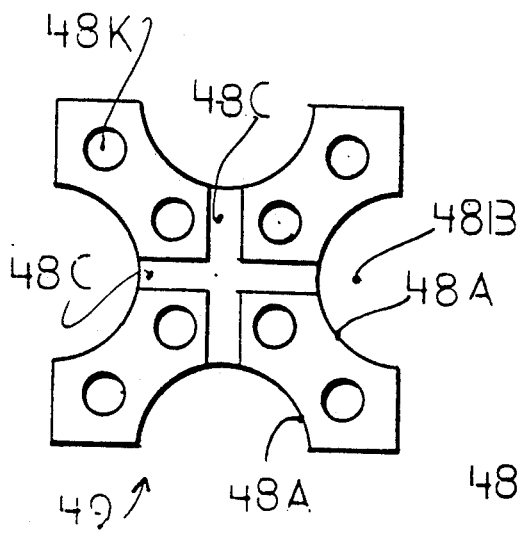
FIG. 49 shows a block in FIG. 48.

FIG. 49: Shows a plan view of block 49 with opposing curvatures 48a and passages 48c crossing through the midlines of the block. The block is approximately 12"d.×8"h.×12"l. and naturally forms ducts in any direction either at corners or intersections. This block system forms a simple single block array with all the advantages of 45 and 45a and 46 but in a single block with x, y, z, flow retaining structural loadbearing capacity.

Figure 49A:
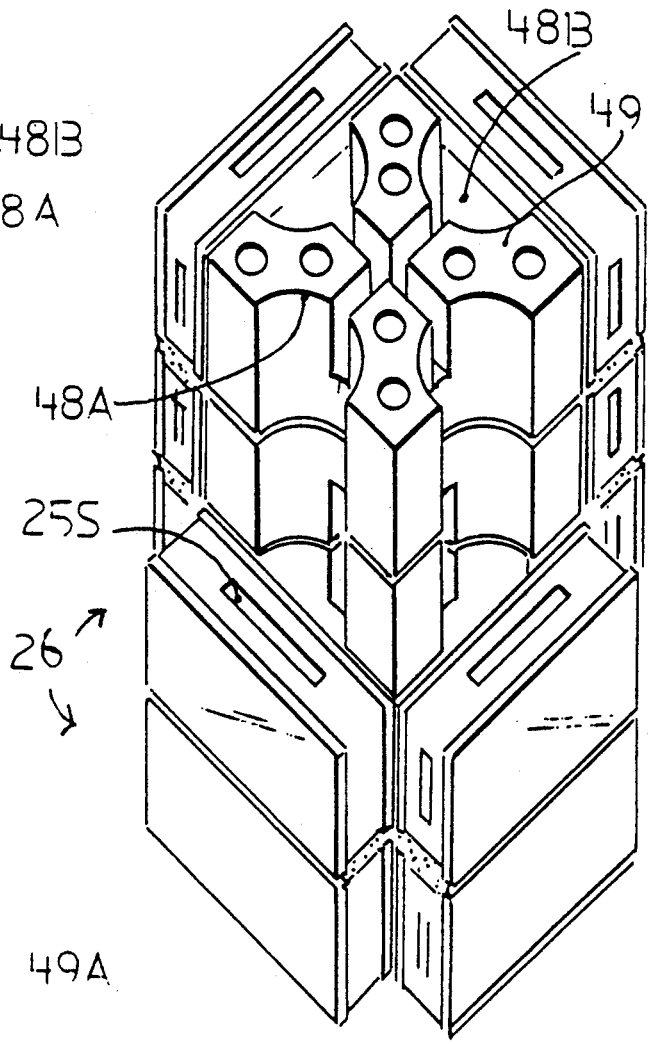
FIG. 49a shows an orthogonal view of the block in FIG. 49.

FIG. 49a: Shows an orthogonal view of block 49 mortared as a single load-bearing column with air flow on 4 opposite side ducts, which interconnect through notches 48c. The masonry serves as absorber and the glass block 26 serves as transparent outer boundary for flow. The multi-story airstream may use this configuration for exposed structural columns or for internal structural vertical riser or return ducts 49a. Flat glass may serve as the transparent outer flow boundary for the column 49a.

FIG. 50: Shows an axonometric view of a block collector array using coverplate glass block 26 as the outer transparent boundary for airstream flow. The masonry flow block 50d has a single outer curvature forming its absorber surface 50e which provides the inner boundary of a single flow chamber 50f which intercommunicates with the glass block flow chamber 26a. Notches for lateral flow 50g permit air passage laterally between masonry blocks, thereby connecting vertical ducts 50f to attain planar manifold flow through the masonry. The glass block 26 and masonry block 50d form a compound wall collector 50 with 2 vertical parallel flow paths connected by x, y, z flow from the coverplate block. This block will overheat if used in an extended rise and is intended for single story or two story collection only. Block 50d is inverted for exit 50h of air from airstream. Extreme boundaries of curve 50e meet exterior at 50w, which aligns dimensionally with mortar intervals for glass block.

FIG. 50a: Shows a vertical section through airstream bounded by the compound array of FIG. 50 with glass block coverplate 26 forming flow chamber 26b which communicates with flow chamber 50f through the open back wall of the glass block 26a. The parallel airstreams through 26b and 50f will intermix laterally through notches 50g according to the shadow patterns cast by the outer mortar joints.

FIG. 51: Shows a plan view of a masonry collector veneer block 51 whose outer curve 51a forms a single duct and whose multiple inner chambers 51b are connected to the outer single duct by notches 51c. Notches 51d provide lateral flow between blocks. A masonry mullion 51e provides support for a flat glass coverplate which spans 3 or more blocks. Wood frames supporting the glass are restrained by the masonry mullion 51e which are tied by reinforcing to the veneer block 51. The surface area available for heat transfer by convection is doubled relative to the Trombe and the air volume available for transport is tripled. This wall need not have open frames as the manifold flow occurs through 51d, behind the glass support system 51e. This is not a structural loadbearing wall.

Figure 52:
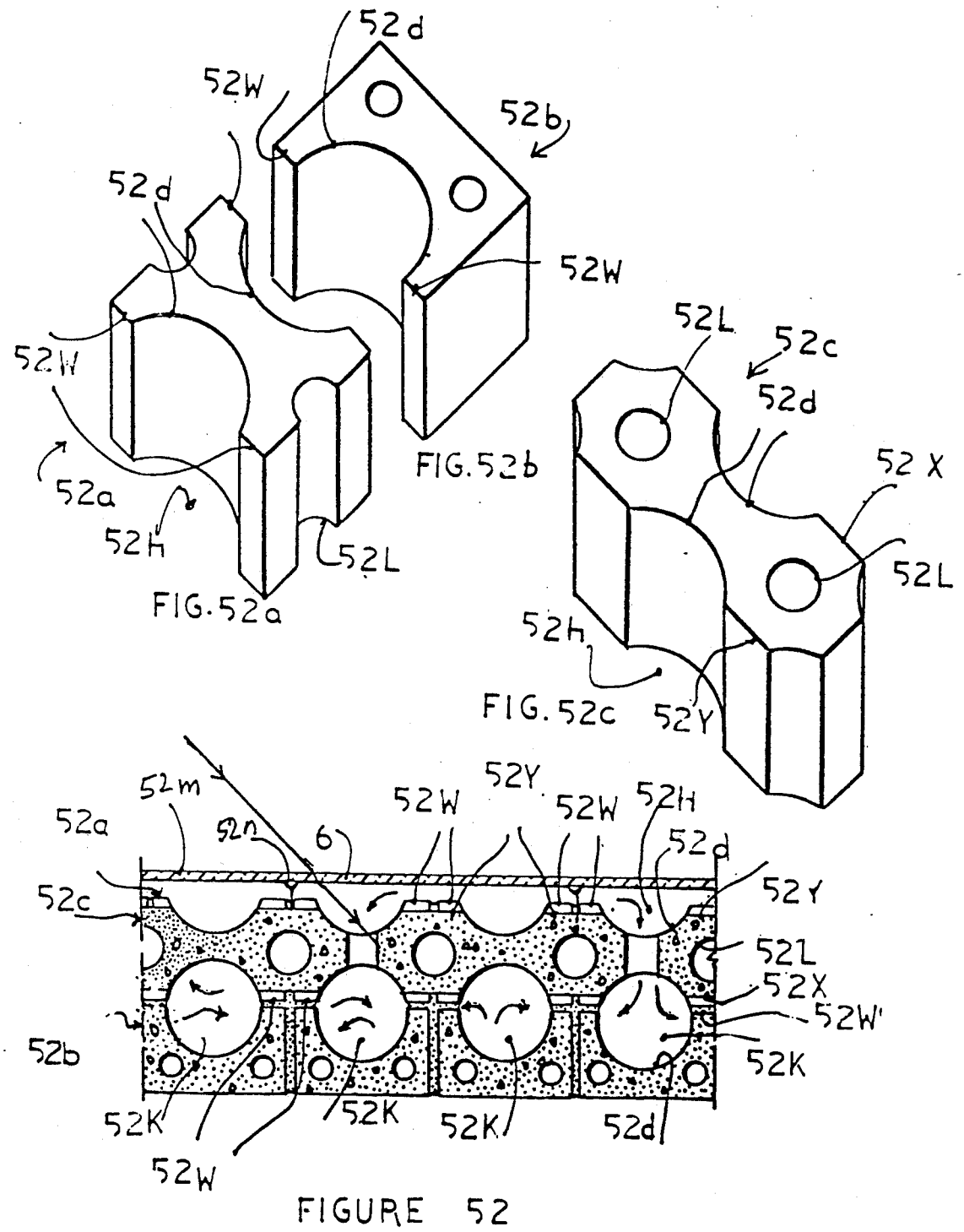
Figure 1:
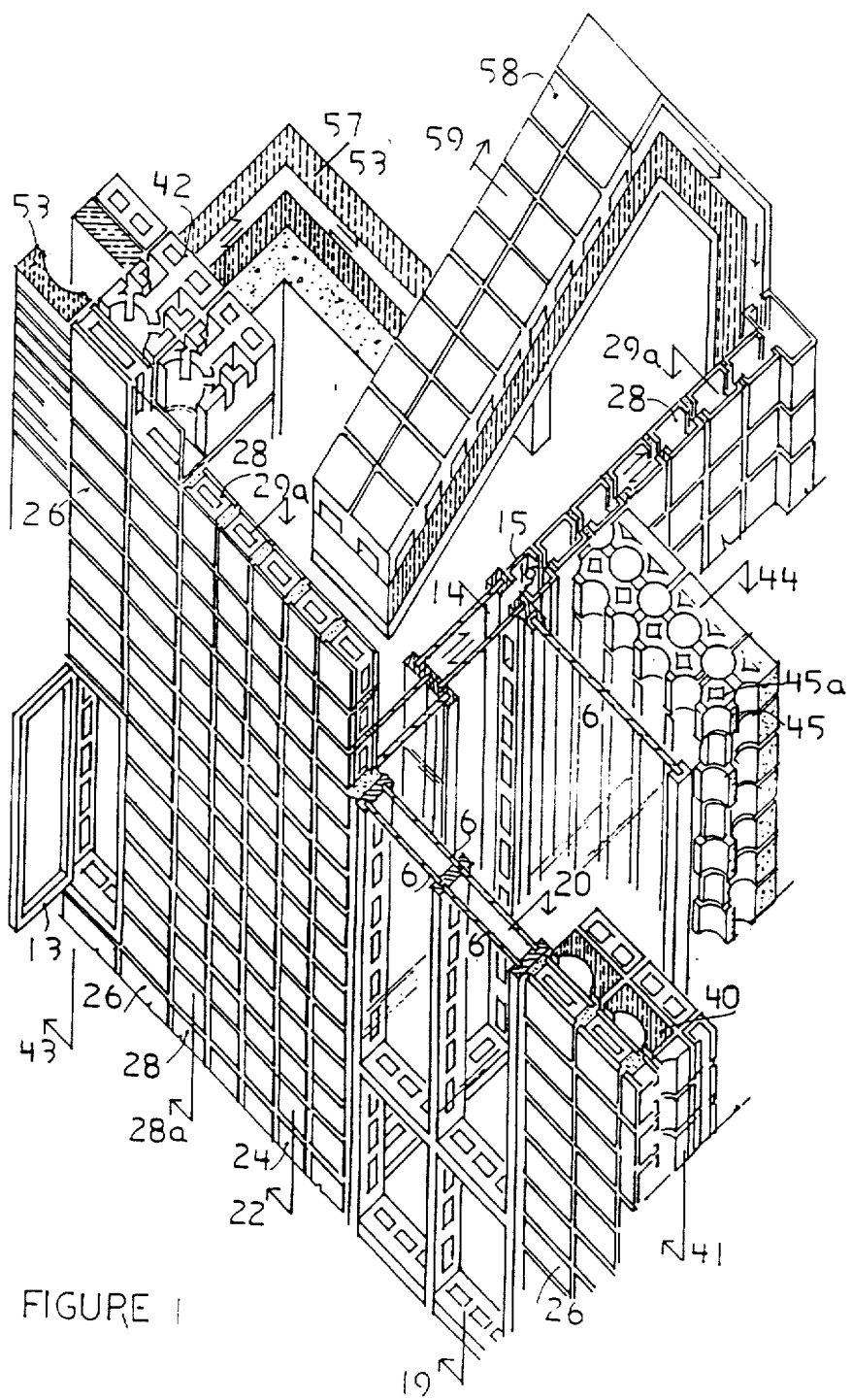

FIG. 52: Shows a plan view of a compound masonry collector wall 52 with 3 block components which form a structural loadbearing wall with a running bond rather than a stack bond. Block 52a has curvature 52d on both its outer and inner vertical surfaces. This curvature 52d matches the outer curvature of block 52b, thus the two blocks form an inner duct 52k and an outer duct 52h. Block 52c forms the running bond by spanning the mortar joints between blocks 52a. A flat glass coverplate 52m may be supported by masonry cantilever flow block frames or by steel angles and clips projecting from the masonry 52n.

Block 52c shares all the same profiles as block 52a except that vertical faces 52x and 52y do not extend to the same outer extreme dimension as block 52a where its vertical surfaces 52w form the largest width of the wall. Thus block 52c becomes the flow block permitting x, y, z flow around its perimeter while providing the structural running bond and bearing area necessary for stability. Passage 52p provides the z direction flow and is formed by the negative dimensioning of block 52c. This array 52 provides a multi-story bearing wall with optimal low temperature operation despite cumulative incidence. As the outer absorber 52d is constantly cooled by air moving inward toward duct 52k and thence upward for remote use or storage.

FIG. 53: Shows a plan view of a cavity wall construction which combines glass block coverplate 26 and brick as the outer boundary of airstream flow. The inner boundary of flow is formed by rigid foam glass 53a serving as absorber and insulator. The airstream cannot overheat in its multi-story rise as lateral flow through shaded cavity between antenion brick and insulation will prevent occurrence of excessive temperatures. Foam glass 53a may be used to line both sides of the cavity and flat glass may replace the glass block 26 as the outer boundary of flow. This bearing wall configuration may be used on any exposure to continue the collection procedure or to cool the planar flow in multi-story rise.

FIG. 54: Shows an axonometric view of a structural brick array contoured for airstream flow in x, y, z directions. The outer transparent boundary of flow is not shown but may be comprised of flat glass, or glass block 26. Block 54a is contoured with semicurvatures 54e on either side of its outer face. On the inner face of 54a the block is notched for x, y, z flow. When block 54a is mortared in courses above 54b, the outer conversion surface is formed with openings 54g for z flow between all blocks 54a. Block 54b provides the structurally continuous member forming a running bond joint. It is also curved to match 54e curve to form the outer duct 54h and notched on its back face to form inner duct 54k.

Block 54c has its outer face curved to form the other half of inner duct 54k thus a brick bearing wall is formed which permits x, y, z flow through its inner and outer surfaces attaining a planar manifold flow pattern through multiple intercommunicating cavities.

FIG. 55: Shows an orthographic projection of the veneer brick components 54a and 54b as they form a running bond. Passage 54g is formed for z direction flow to inner ducts 54k. Lateral flow occurs between vertical ducts 54k through openings 54f provided by notching the back side of block 54a and inverting the block at each course. This same array forms the outer flow chambers for the array 54 or it may form a renovation veneer for an existing wall to convert that wall into a collector wall using a suitable coverplate of flat glass or glass block. The surface area available for convective heat transfer is triple that of a brick Trombe and the air volume available for heat transport is triple due to the voids introduced by 54h and 54k formed by contouring the brick. Structural integrity is sustained by reinforcing meshes and retention of ⅔ of the bearing area shown by masonry symbol in FIG. 57.

FIG. 56: Shows a vertical section through the brick x, y, z flow array with glass block coverplate 26 forming the outer boundary of the airstream, which flows in 3 vertical parallel paths through glass block flow chamber 26b which through opening 26a intercommunicates with brick flow duct 54h which communicates with vertical duct 54k by passages 54g. Lateral flow through notches 54f connect vertical ducts 54k to attain planar manifold flow both over the outer primary conversion surfaces 54e and through the inner surfaces of all chambers which form a single vessel.

FIG. 57: Shows a plan view of the brick array with a flat glass coverplate sustained by a masonry frame 57a which is tied to the bearing wall. Flow behind the frame occurs laterally through notches 54f, which notches connect all ducts 54k. Passages 54g communicate with the outer conversion ducts 54h formed by blocks 54a and 54b. Thus the airstream is free to move from warm outer surfaces 54e to cooler inner surfaces of ducts 54k thereby moving the heat wave through the mass of the wall quickly and forming a high volume, high velocity, warm airstream for collection and distribution.

FIG. 58: Shows a hollow glass block roof tile 58 comprised of a half block with flow opening 58a on each side wall and a hollow chamber 58c for air flow in x and y direction. The flow path available is the same as 27 offering 3 choices of path to air entering the lower portions of an inclined plane rise.

FIG. 59: Shows roof tile 58 secured to a rigid foam glass absorber insulator surface 59d resting on an inclined roof plane of any decking material wood, concrete or steel. The outer flow boundary of transparent glass 58d forms the flow chamber 58c which intercommunicates with all adjacent tiles through openings 58a. Sunlight passing through the transparent flow chambers strikes the rigid foam glass absorber 59d and is converted to heat by its dark cellular surface. The airstream passing through the connecting roof tile chambers 58c through all openings 58a, in all directions forms an inclined planar manifold for airstream collection and distribution. Inlets and outlets for the airstream occur as shown in FIG. 60 envelope flow or at lower inlets and upper outlets into the attic for integration into existing heating system.

FIG. 60: Shows a section through a winter barn using roof tile 58 to attain envelope flow. All walls are comprised of glass block compound wall 40 comprised of glass block coverplate 26 and foam glass block 39b, with the same vertical planar x, y, z flow as FIG. 41. The north wall also has downward flow through a compound wall such as 41 or a cavity block wall 53 lined with rigid foam glass forming the boundaries of the envelope airstream. In the cellar concrete storage blocks 45 and 45a permit a build-up of summer heat during year round collection. The envelope flow is well known, however the building components 40, 41, 59, 58, 53, 45 and 45a are innovative.

REVIEW OF THE FIGURES

From the foregoing, it will be clear that an essential feature of the solar blocks of the present invention comprises a cavity or multiple cavities, formed by a single block or compound blocks, which cavities communicate with the exterior of the block by means of convection through aligning openings in cavity walls, and by means of light transmission through transparent and semitransparent cavity boundary walls. This enables assembly of the blocks, loadbearing or selfsustaining, transparent or opaque, into an array having virtually any height and width, within which array a continuous airflow space of single plane or multi-planar flow, is defined by the compound matrix of inter-connected cavities, which may communicate in, x, y, and z directions as presented by the blocks of which it is comprised. Consequently, the array may be viewed as an extensive semi-transparent and transparent multiple-surface collector, communicating with adjacent multi-cavity convective flow opaque masonry structural collectors, which in total array may have dimensions corresponding to the full width and height of a many-story building. Thus benefiting from the rapid velocity of airflow induced over many warm vertical, lateral and horizontal surfaces of continuous topology and dimension with consequent cumulative energy harvest as warming air rises with increasing temperature and volume, passing through totally transparent direct gain intervals which alternate with conversion intervals, over the total rise. The airstream expands in three or more mutually opposing directions to fill all contiguous cavities which are disposed laterally, vertically and transversely adjacent. The dimension and opacity or transparency of the individual cavities varies according to structural requirements of the wall and the performance temperatures sought for the airstream.

As the airstream rises over the full vertical height, through the total compound mixed array of conversion and non-conversion cavities, the area of transparent elements will exceed the area of conversion elements, since a cumulative conversion surface attains excessive temperature approaching thermal failure, thereby requiring adjacent communicating transparent inner and outer boundaries for the airstream thus attaining a "transparent hot airstream collector wall system", which loses its heat by conductance to both the exterior and interior ambients and whose convective flow is available for direct exchange with the interior or exterior ambient.

In its simplest form, each transparent block may comprise several sidewalls that are joined to one another to define a substantially closed configuration; while the cross sectional configuraiton of the block through the planar flow may therefore be triangular, hexagonal, octagonal, or of other shape, generally the block will be rectangular, and most commonly it will be of square cross-section FIG. 27 through the pattern of planar flow. Blocks of different shapes may be combined in a single array, such as by the use of square blocks interposed among a regular pattern of octagonal pieces. All blocks being opened for airstream flow.

It is, of course, necessary that the sidewalls comprising the transparent blocks be enclosed by some means, (separate, or integrally formed therewith) so as to provide the essential airflow space. This can, however, be accomplished in numerous ways, which have been indicated in connection with the description of the preferred embodiments. While the element that encloses the outer, anterior receptor (i e , forward or upper depending upon orientation), side of the block must be transparent to solar radiation, that is not so in regard to the inner (i.e., rearward or lower) posterior side or sides of the structure. A series of panes, each tinted more intensively will afford the maximum conversion and transfer to the airstream and least loss to exterior. (FIG. 36)

The outside of the block array, whether of opaque masonry block (FIG. 53) or transparent glass block (26) may also be enclosed by one or more, separately-erected panes of glass or other glass-like transparent or translucent material, and this may be accomplished by mounting panes of glass in a suitable supporting structure. As has been indicated in figures above, such outer panes may also be provided by a wall of modified clear coverplate (26) glass blocks erected in front of an array of masonry or foam glass flow blocks of the invention. This configuration avoids loss due to thermal bridging and creates two parallel vertical flow chambers, one through the outer coverplate glass block which communicates with the flow chambers provided by the masonry or foam glass block in the compound wall systems.

In many instances, however, it will be preferable to construct each transparent block with an integrally formed outer pane, so that the outer boundary of the airflow space is inherently established upon assembly of the array of blocks. Moreover, it will often be advantageous to manufacture the blocks with a double-pane configuration on the outward side, to obtain the insulating qualities which are afforded by the resultant still air space, the two panes of course being peripherally sealed to one another to accomplish that result. Indeed, in some instances a triple-pane construction may be employed to provide two parallel still-air compartments in each block, which will further optimize the heat-insulating qualities. It is desirable to provide a thermal break between insulating cavities and flow cavities.

In addition to having one or more still-air spaces, a compound transparent block or a compound flat glass air manifold, produced in accordance with the present invention may be divided into a plurality of flow chambers, by constructing the block or manifold with one or more internal walls or dividers. So as to avoid undue construction of airflow, any such internal divider will generally be a relatively thin, flat panel disposed in a plane parallel to the direction of natural, convective air movement. It may be desirable that there be communication between the transversely adjacent compartments of the block and, while this may be established by external means, it will most desirably result from the provision of passages through the dividing barrier. Indeed, the barrier itself may be provided by independent elements, such as a multiplicity of parallel slats within the cross-section of the block. The presence of an internal divider within the block increases the mass and surface area provided thereby substantially extending the capacity for retention and transfer of thermal energy, in turn significantly increasing the efficiency of heat recovery and distribution. In some cases no lateral connection is desirable so that a series of planes of flow are attained each with a different temperature, thus retaining warmest air in the plane of flow near the interior. In addition to providing lateral communication between the compartments of such a divided block, it is of course also necessary that each compartment be capable of airflow communication with the adjacent blocks of the array, and therefore the sidewalls or frames extending about each compartment will normally have air passages formed therethrough.

In general, the configuration and size of the air passages in the sidewalls of the blocks or air manifolds is not critical, as the primary criteria are the provision of adequate area for free flow of air, while retaining the structural stability of the walls and the block itself. On the other hand, the openings in the sidewalls must not be so large as to unduly weaken the block, which will of course depend upon the total structure of the block (e.g., the presence of reinforcing elements), as well as the application for which it is to be employed. An increase in thickness of the sidewalls around all openings (24t) and extending to the external ribs is proposed to compensate for loss of strength in the block itself. A good balance of air flow and strength will generally be achieved when the openings comprise about 25 percent of each sidewall or 25% of the total area of any mortar element of the block or when openings comprises 35% area relative to exposed face area of the block. As will be appreciated, the double and triple pane compound blocks offer added structural benefits, both because of the reinforcing effect of the panes themselves and also because of the added surface area for joints and mortar that is presented about the periphery of the block. Normally, the transparent blocks will be designed to be at least self-supporting in an array of substantial overall dimensions, albeit that they will not normally be of load-bearing construction, while masonry flow blocks 42, 49, 44, 52 are load-bearing.

In addition to providing partitions for defining parallel flow paths through the transparent block, other features may be provided thereon, or in association therewith, to enhance solar receptivity and/or thermal energy retention capacity. Ordinarily, at least one of the internal surfaces within the block will carry a coating of a energy absorbing substance, or be infused with metallic oxides such as nickel or cobalt. This provides a glowing, warm wall with excess energy lost to the interior ambient.

Clear flow blocks may be interspersed with tinted flow blocks to reduce overheating in multi-story collection, at temperatures below 200° F. thus direct gain is possible during collection and the superheated airstream occurring at upper stories between tempered flat glass is used to maximum advantage for interior gain rather than lost to the exterior.

As shown in FIGS. 22 through 37 portions of the block (such as the posterior half) may be fabricated from a dark tinted glass, such as may be produced by suspending a vitreous colorant of metallic oxides such as lead, zinc, cobalt and ferrous irons in the glass melt. The heat absorber surface will normally be one that is contiguous to the airflow space, since that will ensure that heat transfer to the air occurs with optimal efficiency. In any event, the coated or tinted surface should be one that will be so disposed in the array that the maximum proportion of available radiation will impinge either directly or indirectly by reflection from sidewalls 24i thereupon. For this reason, the coating will generally be provided upon one of the transparent panes that is adjacent to the airflow space, and generally that which is on the interior side of the array or in a median location with transparent panes on the exterior location. A coated absorber may be a dark ground glass frit fused at 1200° F. to the outer face or inner face of the air flow chambers, the color of the material being effective to convert the 0.3 to 0.8 micron wavelengths energy of the solar radiation to usable heat energy.

The transparent blocks may also incorporate a so-called "heat mirror" coating, by facing one or more of the interior surfaces with a heat reflective material, and this may be done so as to cover all of the inside surfaces if so desired. Thus heat lost from interior is trapped in collection space. While the provision of a heat mirror may produce extraordinarily high temperature in certain instances, if appropriate provisions are made for withdrawal of the heat, and to ensure the safety and integrity of the structure, any adverse effects that might be produced by the intensity of the heat developed can be minimized, so that the net effect of the structure is beneficial and may provide a net gain of energy or a thermal insulation hot-air barrier. The interior surfaces of the glass blocks may also be coated with a one-way light mirror substance which reflects random light trapped internally in each cavity, attaining conversion of wavelength by absorption, through attenuation. Such an array would be opaque in outer appearance (FIG. 32).

In some instances, it may be desirable to incorporate structural members into the block which are especially designed for the absorption and retention of solar radiation and thermal energy. Thus, boxes, pans, suspended concentric ring structures and the like, made of a heat-conductive metal such as copper, may be placed within the transparent block to increase its thermal capacity. Generally, any such member would be placed in position for contact with the air passing through the block, so as to provide maximum heat transfer efficiency but not in contact with the glass. Another heat storage possibility, a eutetic salt, or similar substance capable of undergoing a change of state in which relatively large quantities of thermal energy are absorbed and liberated, can be situated within the block, such as by suspending bags of the material therewithin. Such storage devices are suitable for interior partitions connected to the collector wall. In such a case, the material would generally be placed within a flow space of the block, which must be accessible for replacement of salts. The interior flow-partitions of glass block remove warm air from the external collector walls of any material for distribution for remote use.

Insofar as the structure of the array itself is concerned, its dimensions may be very great or relatively small, and the configurational varieties are virtually endless. Generally, the array will have a minimum size which will substantially span the height and width of a room, but smaller configurations, may be desirable as the glass flow block may be mixed with other collector flow manifolds. On the other hand, and as has been indicated above, the wall comprising the array may be many stories high, such as in a high-rise office building with appropriate expansion intervals and structural restraints. While the array has, in some instances, been referred to herein as being of generally planar configuration, it should be appreciated that the array need not extend only in a flat plane, but may in fact have a curvilinear cross section, or indeed may be of a compound shape. A single block cannot function alone. A minimum independent array dimension of $4' \times 8'$ is prerequisite for collection to occur and flow to be effective.

It should also be understood that, as used in the present specification with respect to the directions of airflow, sidewall extension, etc., the term "vertical" is to be broadly construed to encompass orientations that are not only perpendicular to horizontal, but which may also be upwardly inclined, such as in the case of a roof tile array 59 comprised of blocks of the present invention. For this reason, the phrase "generally vertical" is employed in many instances in the specification and claims.

As has also been indicated hereinbefore, the primary function of arrays embodying the invention may be for heat storage rather than collection, or they may serve both functions. Moreover, they may be employed in any of numerous applications, for which the array may either be internal or external to the living space, load-bearing or non-bearing, and free-standing or supported. The glass block, with back open, serves as a coverplate and as a renovation system, converting existing exterior walls to energy producing surfaces. In the latter regard, the array may be associated with a preexisting substructure, such as a vertical wall or a roof sheathed with metal or some other non-flammable receptor surface. In such applications, the blocks used will normally have an open side placed adjacent to the underlying structure, which can then function as the solar energy collector surface, and supplemental frames, skeletons, and the like may be provided to facilitate construction of the array and to afford added support.

Standard block-laying and framing details will be employed to build the array. The blocks may be "cemented" to one another by utilizing any appropriate material for that purpose, which may take the form of mortar, thermally tolerant grout, silicone sealant materials, and the like, depending upon the nature of the array and the conditions to which it will be subjected. In some instances, reinforcing structure, such as wire mesh, will be employed, and appropriate tying elements will be incorporated to integrate the array internally and/or with a supporting structure, in appropriate instances.

As pointed out above, the structures produced in accordance with the present invention need not be comprised of blocks of a single design, and indeed members of different appearance, size, construction and function may be mixed in producing the ultimate array. In fact, all of the blocks used in the array of the invention need not have the features herein described, it being desirable, for example to combine the blocks of the invention with regular glass blocks or with other components of the building system to achieve specific aesthetic or thermal effects. Most generally conversion blocks will comprise a smaller percentage of total area of the collector array than clear flow blocks in order to keep the temperature of air flow below 200° F.

Provision must, of course, be made for admitting air into the flow space within the array and for withdrawing it therefrom, which may simply take the form of vents near the bottom and top of the structure, respectively. When the array comprises a wall of a multi-story structure, it will generally be desirable to include inlet and outlet vents for each story, not only to ensure uniform distribution of the heated air throughout the building, but also to avoid overheating of the total array, as might occur if the mass of air were permitted to become heated throughout the full expanse of the wall. Also clear flow blocks may be interspersed to prevent overheating and provide direct gain. The vents may be spaced laterally, as well as vertically, throughout the array at suitable locations. Also windows and sliding doors with open frames may continue the plane of flow between inner and outer panes and may be opened to admit warm air to interior. The outer window or door may be opened to vent the array.

Although not necessary in all instances, it will be appreciated that forced air circulation into or from the airflow space will often be advantageous, so as to maximize the flow rate and thereby achieve optimal energy recovery. One or more fans or blowers may be utilized to supplement the natural convection currents that are set up as a result of temperature differentials, to hasten the flow of air and thereby increase the number of air changes through the array per unit of time; optimally, the air will flow at a minimum rate of at least two to seven cubic feet per minute in exchange with the internal air of the building to be heated. A fresh air supply (50° F.) must be provided to the system for exchange with interior moist air consumption according to code requirements. The location of the fans, as well as of the vents, will be dictated by the thermal characteristics that are to be afforded in any particular structure, and by the need for establishing secondary thermal loops in the case of a multi-story structure. Smoke detectors will be necessary to close vents to prevent smoke spread through array according to fire codes.

As will be appreciated by those skilled in the art, optimal energy recovery would normally result from the maintenance of relatively low temperatures within the array 90° F., so as to minimize thermal losses, and from the provision of a volume of air that is large enough, and that flows at a suitable rate, to efficiently absorb the heat energy available within the blocks. Ideally, operation will occur in lower stories at a temperature of about 90° F., although temperatures on the order of 140° to 300° F. may be accommodated in some instances at higher stories in the rise through transparent or conversion elements which will lose both to the interior ambient and to the exterior according to the t between the airstream and both ambients. In any event, the temperature attained will depend upon numerous factors, such as the construction of the individual blocks, and dimensions and configuration of the array, its disposition and attitude, the time of day, the season of the year, etc.

Finally, although the continuous nature of the airflow space throughout the arrays of the invention desirably avoids the need for elaborate air distribution systems, and manifolds, still it will be necessary to provide means to ensure entry and exit of the air into and from the airflow space, and to ensure adequate closure of all vents during night-time still-air conditions or night-time envelope flow. Depending upon the pattern of airflow involved, this may require specifically configured blocks, such as when the air flow space is divided into plural layers. While any need for ducting that might otherwise exist is obviated in the array of the invention, under certain circumstances it may be desirable to provide an interior wall flow system, so as to deliver the heated air via internal hollow partitions of glass flow block to a location remote from the array; i.e., to the northerly side of the living space when the collector wall is located southerly for maximum solar energy collection. The blocks themselves, masonry or glass, comprise those ducts in the form of continuing the flow through interior partitions or ceilings for remote use, or to attain envelope flow.

Thus, it can be seen that present invention provides a novel solar array comprised of hollow transparent blocks, which may combine with opaque structural masonry collector flow blocks or flat glass flow manifolds, which efficiently collects solar radiation and transfers thermal energy to air passing through the array, for effective distribution to internal living spaces. The array permits the substantially unimpeded flow and expansion of heated air, and involves a minimum amount of unnatural movement and directional changes, thereby avoiding stagnation of the air and frictional and kinetic energy losses. The maximum proportion of the solar radiation collected will be recovered as usable heat, by avoiding overheating; or when high temperature is attained, the thermal gradient will lose to two opposing ambients with benefit to the interior by transparency of the interior boundary of flow. The array desirably integrates heat absorption, and airstream collection, distribution and return functions, into a single unit, and it is adapted for use in a wide variety of applications. The invention, in addition, provides a novel glass flow building block, also a masonry flow block or brick and a foam glass flow block all being easily handled, and of relatively simple and inexpensive construction, which blocks in array of like blocks or compound mixed array, can be utilized with great versatility to produce structures of virtually any practical dimension, which structures are not only highly efficient in collecting solar radiation and distributing thermal energy, but are also integral in forming the exterior skin of the building. The collector and the external boundary of the building are formed by the same elements, which combine to produce both structure, transmissivity, direct gain and net thermal gain.

Cooling requirements of the system are provided by masonry mortar joints at 8" vertical and lateral intervals which provide total summer shading of absorber surfaces; and by reverse flow, using external cavities for summer exhaust to the exterior, and internal cavities for winter collection and distribution to the interior. Also masonry flow blocks 49 on the north walls in envelope flow may provide a cooling of the envelope airstream in the summer operation.

DESCRIPTION OF PREFERRED EMBODIMENTS

Glass Block Array

It has now been found that certain of the foregoing and related objects of the invention are readily attained in a solar collector array comprised of a multiplicity of substantially hollow blocks, which are fabricated from a transparent structural material and are disposed laterally and generally vertically adjacent to one another in a substantially planar configuration. The blocks cooperatively define a plurality of passages and cavities for free air flow; which passages extend both laterally and also generally vertically between adjacent blocks, to thereby define substantially continuous, generally planar air flow space that is substantially coextensive with the array. At least one integral or separate pane of material that is substantially transparent to solar radiation is disposed to one anterior side of the blocks to cooperatively define the air flow space through the array, and means contiguous to the air flow space is provided for absorbing and converting radiating solar energy. As a result, air flowing through the air flow cavities and passages can pass over the surface of the contiguous means, to absorb thermal energy therefrom for distribution to a remote location.

In the preferred embodiments of the array, each of the glass blocks will be of generally rectangular cross-section, and comprised of four sidewalls that extend generally vertically and laterally in the array, each of the sidewalls having at least one aperture communicating through mortar restricting devices with a corresponding aperture of the contiguous sidewalls of the blocks that are adjacent thereto; most desirably, the blocks will be fabricated from a glass, glass-like, or tempered glass material. Depending upon its intended use, each block may have a pane of the transparent material integrally formed therewith and closing the "one" anterior receptor side thereof, and it may desirably also have an additional integrally formed pane of the transparent material closing the "other" posterior side which may be tinted for conversion or clear for transmission. In many instances, it may be especially desirable to provide an integrally formed pane in a plane parallel to, and spaced from, the plane of said first-mentioned anterior pane, with the panes being peripherally sealed to provide an insulating, still-air space therebetween. A third pane may also be integrally formed to be in a plane parallel to, and spaced from, the planes of the first- and second-mentioned panes, with the panes again being peripherally sealed to provide two insulating, still-air spaces therebetween, with air flow through conversion cavities near habitable space.

Each of the blocks may also have one or more inner vertical walls dividing it into two or more flow cavities, in which case the array will have a plurality of transversely extending passages interconnecting transversely adjacent chambers. The vertical wall may have at least one transverse passage formed therethrough to interconnect its chambers, and such blocks will desirably have a plurality of vertically and laterally extending passages formed therein, for multi-layer air flow, to provide independent communication to each of the chambers thereof. Furthermore, each of the blocks may have a second inner vertical wall which cooperates with the first-mentioned inner wall to divide the block into three or more such flow chambers, with the array again having a plurality of transversely extending passages interconnecting transversely adjacent flow chambers.

Separate means may also be employed to provide the pane of transparent material, which will nevertheless be substantially sealed separate from the array of blocks to prevent thermal bridging to cooperatively provide a still-air or air flow space. In one embodiment, such means may comprise at least one pane of glass that is supported in an appropriate manner to the "one" receptor side of, and directly adjacent, the array, the blocks of which the array is comprised optionally having all (e.g. six) or more sides with openings for maximum air flow therethrough. This block may be body tinted entirely for conversion. Alternatively, the array may include a wall of glass blocks providing the panes of transparent material, the blocks being assembled as a separate wall to the "one" receptor side of the first-mentioned blocks, with each separate block of beneficially sealed, double-pane construction.

To prevent the mortar or other material used to cement the blocks from entering the passages thereof, and to maximize the strength and stability of the array, each of the blocks and block openings will advantageously be formed with raised, transversely spaced, external marginal portions extending peripherally thereabout. Also plugs, (e.g. mortar restraining devices) which stop air flow are necessary at entry and exit blocks to restrain the airstream so that air may enter or exit the planar duct in multi-story collection. The edge portions defining the passages therethrough may also desirably be raised or separate connecting sleeves, plugs and collars of ceramic, glass, metal, or the like, may be inserted in the flow openings to retain mortar and to provide intercommunication. Generally, the openings in each side of the block will not comprise more than about 25 percent of the total area of the side, to ensure adequate strength and mortar contact surface. Also the thickness of the mortar-sustaining side walls will be increased to compensate for losses in strength caused by introduction of openings. The coefficient of expansion of the rings or other devices should match that of the block.

In accordance with especially preferred embodiments, some of the blocks from which the array is built will have a pane of transparent material integrally formed therewith on the conversion side, upon which or infused within, is provided a solar energy absorbing and radiating conversion substance to furnish the "contiguous means" of the array; this substance may be a fused ground frit of dark ceramic glass on either face of the pane defining the air flow chamber with flow behind the opaque surface, or infused metallic oxides may tint the absorber panes for heat conversion, these warm panes to be closest to habitable interior space. Certain of the blocks may have contained therein a thermal energy absorbing and radiating member, that at least in part provides the contiguous means, which member may be a metal structure, (e.g. concentric copper rings suspended as heat conversion means) or a substance that undergoes a physical state change upon heating above a given temperature level; in the latter instance, the substance will liberate the absorbed energy, including that associated with the change of state, upon cooling to a temperature below the given level. Other electrical devices may be provided in cavities for photo-chemical energy conversion e.g. battery independent photovoltaic or wired devices for electrical warm-up. The array will additionally include means providing an entrance and an exit for passage of air into and from the airflow space, and usually the entrance and exit means will comprise linear fan vents to ambient, living-space air through exit and entry filters.

Certain other preferred objects of the invention (e.g. the renovation/veneer block and the exit/entry block) are readily attained by the provision of a substantially hollow block that is open on its back surface plus four side openings as well, fabricated from a transparent glass, glass-like material, and comprised of at least four generally rectilinear sidewalls joined to one another in a closed configuration. Each of the sidewalls of the block has at least one aperture formed therein and the posterior pane may be opened by diamond-cutting blocks after fabrication, or the opening formed during pressing or assembly procedures, and each block is adapted for assembly with other similar blocks in a generally planar array, with the corresponding apertures aligned and communicating with one another. The blocks are therefore adapted to define a plurality of passages for free air flow, which intercommunicate with contiguous air flow passages of supplemental building materials, thereby providing a generally planar air flow space that is substantially coextensive with such a composite array in which it is employed. These blocks may be placed over existing or new masonry or metal walls in which masonry or metal act as the contiguous conversion means. Rigid foam glass (black) may be used as the contiguous means for heat conversion.

In one embodiment, a pane of transparent material will be integrally formed with the sidewalls to close one of its anterior panes. It is especially desirable that the block have a second pane integrally formed and lying in a plane parallel to and spaced from the plane of that which closes the first side of the block, the first-mentioned and second panes being imperforate and peripherally sealed to provide an insulating, still-air space therebetween. The block may, in addition, have one or more of the specific features hereinbefore set forth and hereinafter described in greater detail. Low angle incident light, striking the specular sidewalls of the glass cavity will be reflected toward the contiguous absorber surface creating a double overlapping incidence of energy on the absorber.

The array of any dimension provides the thermal performance characteristic of the block of which it is composed. Mixing clear-flow blocks with collector-flow blocks or clear flow block with conversion flat glass manifolds is an appropriate device for temperature control and direct gain.

Since the multi-cavity block is difficult to manufacture, the preferred block (24) is the single-cavity flow with a tinted absorber posterior conversion pane and a clear anterior receptor pane with 40% transmission of visible light through the posterior body-tinted or coated pane into interior ambient Air flow at 1 fps will harvest incident energy with excess energy lost to the interior ambient. Thus, this block should out-perform other existing non-focal collector wall systems.

The other preferred block (26) is the entirely transparent single-flow cavity with back pane removed for use as: a veneer/renovation block; or as the coverplate block for the composite masonry and foam glass flow blocks array; or as the exit/entry block.

The other preferred block (28) is the single cavity entirely transparent flow block, with openings on four sides and a transparent anterior and posterior pane. This block continues the plane of flow between conversion blocks and permits both vision and direct gain through the flowing warm airstream.

The other preferred block (33) has one still-air chamber for insulation and two flow chambers separated by a tinted conversion pane for front and back flow of transport medium.

The other preferred block (31) has a single flow cavity divided by a tinted conversion median pane forming two flow chambers. The outer anterior flow cavity (6a) contains the airstream for summer cooling purposes exhausting warm air to the exterior with a still air status in the posterior innermost chamber (6b). In winter, the anterior flow chambers are inoperative forming a still-air insulating chamber, while the air stream becomes active in the posterior innermost chamber, providing collective flow behind the tinted conversion pane for convective distribution of warm air to the interior ambient.

Masonry Blocks and Block Arrays

The invention proposes a solar collector structural array communicating with the forementioned glass block array, comprised of a multiplicity of multi-cavity hollow single blocks (42) fabricated from a structural concrete masonry material and disposed laterally and generally vertically adjacent to one another in a substantially planar configuration, said blocks cooperatively defining a plurality of passages for free flow of air in x, y, and z directions through openings in all side walls of all cavities, thereby linking the internal flow chambers with external flow chambers which align with those of adjacent similar blocks, outer passages and inner cavity passages extend laterally, vertically and in z direction between adjacent blocks, to thereby define a substantially continuous multi-planar airflow that is coextensive with said array, the outer or anterior receptor face of each block bears a concave curvature 42a of the primary surface where conversion is to occur, this loadbearing vertical plane, when curved, does not lose its structural capability and forms a negative air void 42b suitable for forming a vertical duct, this anterior curvature communicates with inner flow cavities by means of notching 42c of the primary plane and of all internal cavity walls. An anterior outer single pane of glass is provided by glass block 26 or a flat glass cover plate to bound the outermost flow chamber 26b which communicates with all inner chambers 42b, 42d, and 42e, whose masonry boundaries are loadbearing while also providing secondary convective heat transfer surfaces, the converted energy being transported by one cubic foot of air at 1 f.p.s. per s.f. exposed array over an internal surface area that is more than triple the ordinary flat plate conversion surface. The inner cavities of the block thus provide high velocity multi-story "chimney" flow which rapidly removes excess temperatures from primary conversion surface 42a, thereby attaining a thermal gradient through the collector that considerably reduces heat loss to the exterior.

All concrete arrays 42, 44, 52, 48 communicate with adjacent clear flow glass block array 29b comprised of (block 28) which link bearing piers for continuous flow of the airstream (FIG. 12). Generally the masonry flow blocks are comprised of 50% void and 50% mass for structural purposes. The notches which connect chamber are no more than a few inches wide and deep. Each block is inverted when mortared in place to attain a larger notch opening for flow without loss of strength in the bearing planes, this single block requires stack bonding and re-bars in its innermost voids. It is easily handled and mortared in place with re-inforcing meshes tying it to the outer transparent glass flow block coverplate 26.

The invention further proposes a solar collector structural array 44 comprised of a multiplicity of three compound structural masonry blocks (45) (45a) (46) which are contoured in a concave curvature on the outer vertical absorber face and on the opposing inner vertical face, to form parallel vertical ducts when mortared adjoining a third posterior block 46 which also is contoured on its outer face by a concave curve of the vertical plane, the blocks are disposed laterally and vertically adjacent to one another to form a substantially double planar configuration, said combination of blocks cooperatively defining a plurality of passages for free flow of air in x, y, and z directions through openings provided by the diminution of the flow block 45a which at its extreme dimensions is less than block 45, 45a thereby retaining the continuous vertical bearing planes and forming a boundary for the vertical ducts while permitting lateral, vertical and transverse flow around the flow block 45a, thus forming three parallel communicating planes of vertical flow, bounded on the posterior by block 46 and on the anterior receptor face by a single pane of flat glass (6) held by masonry or coverplate glass block 26, whose flow cavity 26b provides the third outermost convective plane of flow, all passages, formed by matching all corresponding concave curvatures, extend laterally, vertically and in the z direction between adjacent blocks to thereby define a substantially continuous multi-planar air flow that is co-extensive with said array and may be many stories in height, and may communicate by convection through clear flow block 28 placed in array linking structural masonry collector walls, thereby attaining direct gain through block 28 and the warm airstream flowing through its continuous flow cavities 28a. Structural array 44 with coverplate block 26 is reinforced by steel rebars in still air cavities 46a and 45r but provides a stack bond mortar relationship only.

Thus the invention also proposes a structural masonry array (52) which provides a running bond mortar relationship attained by using a shorter dimension for the basic anterior and posterior block, with matching concave curvatures on opposing vertical faces of all blocks, with the running bond block extended in dimension to overlap the mortar joint on either side boundary of the anterior blocks 52a. Block 52a and 52b together define an outer and inner vertical duct with no communication between the two. The addition of block 52c, the flow block forms not only the running bond, but also provides x, y, z flow as the extreme faces of 52c (52y and 52x) do not align with the extreme faces of 52a at 52w, also block 52c is dimensioned to leave a flow space separating it from other blocks 52 adjoining it laterally, thus by alternately coursing flow blocks 52c with matrix blocks 52a and 52b, the x, y, z air flow pattern of the invention is attained in a structural loadbearing wall which is a high velocity multi-story collector.

The invention proposes also a further masonry collector wall (array 48), comprised of block 49, which block also forms a structural convective column. Block 49 is a single structural masonry block, square in plan, whose four outer vertical surfaces are contoured by a concave curve on each opposing face, these contoured voids form vertical ducts 48b which intercommunicate with each other by virtue of intersecting notches 48c which connect the air flow of all ducts simultaneously, an outer anterior flow boundary of transparent glass single pane (6) attached by clips to the faces of outer boundary of 49, or glass block 26 may form the outer flow boundary. Block 49 when forming a single stacked column with rebars in 48k may act as a return cool air duct or as a collector column communicating with the other flow components of the system. Block 49 when used in array 48 forms a versatile wall with ducts on all faces, internally at 48b and externally 48a, thus when array 48 is bounded by flat glass with sliding doors, the doors may be used open for cooling purposes on north walls in the summer or for warming collector purposes in the winter on south walls.

All masonry flow blocks, by virtue of the high ratio of void to mass, and the consequent large volume of air available for free movement from warm to cool locuses, permit the attachment of transparent anterior planes, relatively close to the masonry surface, thereby obviating the need for cumbersome secondary open framing for coverplate glazing.

A further single masonry veneer block (non-load-bearing) is proposed in array 50 formed by block (51) whose anterior concave curvature communicates directly with inner cavities 51b, and also communicates with adjacent blocks by notch 51d. This single duct flow is prone to overheating and should not be used in large expanse without introduction of clear transparent flow manifolds in communication with the masonry conversion surfaces. The use of coverplate block 26 as the outer boundary of flow for array 50 provides another vertical and lateral flow chamber with shadows from mortar joints providing complete summer shading at 8" vertical and lateral intervals.

The invention further proposes the innovative use of Foamglas in several instances, both as an absorber of light converting it to heat and simultaneously as an insulator as shown in FIGS. 39 through 42 and FIGS. 53, 59 and 60. A particularly easy to construct wall is provided by Foamglas block 39b, 39a when combined with glass block coverplate 26 or flat glass FIG. 41v as the outer boundary for planar x, y, z manifold flow. The Foamglas is cut into masonry dimensions of lesser height than width or length and is contoured on its anterior receptor face with a concave curvature, forming a vertical duct, 39f, the outer extremities of the curved block are then notched for lateral flow 39d. The block is easily mortared in place adjoining and tied to a conventional masonry wall. The outer boundary of flow through chamber 26b communicates with the x, y, flow patterns of the Foamglas block through the z direction opening in the back of the glass block. The mortar intervals provide summer shade for the absorber surface and also during collection provide a temperature differential which encourages the natural motion and velocity of the hot air thermosiphon.

As will be seen in 53, Foamglas is used to line a flow cavity of a typical hollow cavity brick wall in which an outer boundary of transparent glass is introduced to admit solar radiation to impinge upon the Foamglas. Over a multistory cumulative incidence on the absorber, excessive temperatures are modulated by convective flow over the absorber through adjacent shadowed cavities, the Foamglas is acting as insulator for the internal air mass of the building which may circulate through the perimeter cavity, for fresh warm air exchanges as often as seven times per hour.

As shown in FIG. 59 and 60 Foamglas is used as absorber/insulator beneath a glass block roof tile whose structure is identical to ½ typical glass flow block 28, which half block rests on the inclined plane of a roof sheathed in Foamglas. The air flow over the absorber roof plane continues the flow from wall collectors and attains envelope flow over the entire perimeter of the building or over selected portions.

Photovoltaic single cells are located as accessory thermal devices in selected transparent communicating cavities, glass block or flat glass manifolds, between boundaries of airstream flow for warming purposes.

(FIG. 38) The photovoltaic single cells according to this invention, are comprised of two concentric metal rings, the outermost interval between rings contains an even number of tangent metal conductor rings each touching the adjacent ring on either of its sides and the outermost and innermost boundary of the containing two major concentric rings; the tangential rings house silicon cells encased on inner and outer boundaries by a continuous glass plane extending from and including the outer metal ring to the inner metal ring; this enclosed series of small cells are tangential to all bounding elements with the exception of the glass enclosure which seals and protects the metal and silicon from abrasion and degradation; extending into the innermost void bounded by the innermost concentric metal conductor ring, are miniature light bulbs which are activated by diffuse light only and deactivated by intense sunlight, as during intervals of direct sunlight the cells are designed to store converted energy; the function of the cell in the proposed structural solar system array, is to provide thermal benefit to the still airstream contributing to attainment of operating temperature 90° F., thus early morning light or diffuse cloudy day light activates the bulbs which provide a visually cheerful thermal addition to the temperature of the planar manifold airstream in its no-flow still-air status. Once operating temperature is reached and air flow begins, the lights will be activated by cloudy day shadow sequences or deactivated by maximum airstream temperature.

I claim:

1. A compound matrix for solar collection comprising a plurality of hollow blocks which are at least partially transparent, each block having first and second walls with respect to solar radiation, said first and second walls being connected to one another by sidewalls to define an internal chamber, each block comprises first and second half bodies with respect to solar radiation and are mirror images, said sidewalls having apertures wherein each internal chamber of a block is in communication with the internal chamber of adjacent blocks, said apertures connected to adjacent apertures by (ring means, adjacent sidewalls attached by structural bonding means, said ring) means and chambers arranged to define a plurality of continuous intersecting passages extending the length and breadth of said matrix, and means for circulating a fluid through said matrix.

2. The compound matrix of claim 1 wherein at least one of said half bodies are transparent.

3. The compound matrix of claim 1, wherein each of said half bodies are selectively translucent or transparent.

4. The compound matrix of claim 3, wherein metallic particles for absorbing solar radiation are dispersed in said translucent half bodies.

5. The compound matrix of claim 3, wherein metallic particles for absorbing solar radiation are deposited on the exterior surface of said second walls.

6. The compound matrix of claim 3 wherein the internal surfaces of said walls are selectively provided with a light-transmitting heat-reflecting coating of metal oxides.

7. The compound matrix of claim 3, wherein internal surfaces of said sidewalls are selectively mirrored.

8. The compound matrix of claim 7, wherein each facing sidewalls are mirrored.

9. The compound matrix of claim 1, wherein said structural bonding means consists of a cementitious mortar.

10. The compound matrix of claim 1, wherein said ring means comprises an annular device with a raised restraining edge for seating in one aperture and abutting an adjacent aperture.

11. The compound matrix of claim 1, wherein said ring means comprises a raised peripheral edge extending from each aperture and connected to a peripheral edge of an adjacent aperture.

12. The compound matrix of claim 1, wherein said ring means is wider than longer.

13. The compound matrix of claim 1, wherein said matrix is mostly glass.

14. The compound matrix of claim 13 wherein ceramic frits are deposed on the said second half body at high temperatures to provide an opaque coating for conversion means.

15. The compound matrix of claim 13 comprising said first half-bodies only.

16. The compound matrix of claim 13 having an accessory conversion device placed in selected chambers.

17. The compound matrix of claim 13 having a thermal non-conductor structural material disposed between the said first and second half bodies of said matrix.

18. The compound matrix of claim 1, wherein photovoltaic devices are disposed in said matrix for converting solar radiation into electricity.

19. The compound matrix of claim 18, wherein said photovoltaic devices are connected to light bulbs.

20. The compound matrix of claim 1 wherein the said second wall of each said block has an opening therein forming at least one passage therethrough.

21. The compound matrix of claim 20 wherein the said block having said opening in the second wall is placed in communicating relation with an adjacent wall.

22. The compound matrix of claim 1 wherein each said block has a median wall placed between the said first and second walls of said first and second half-bodies with respect to radiation, said median wall having means for absorbing solar radiation.

23. The compound matrix of claim 20 or 22 wherein the said first wall with respect to radiation consists of at least two panes of transparent structural material spaced and sealed apart.

24. The compound matrix of claim 22 wherein the said first and second walls of said first and second half-bodies each consist of two panes of transparent structural material spaced and sealed apart.

25. The compound matrix of claim 1 wherein the thermal mass of the said matrix is provided by the thermal properties of the materials of fabrication of said matrix and the volume of fluid heat transfer medium is provided by all chambers and passages.

* * * * *

UNITED STATES PATENT AND TRADEMARK OFFICE
CERTIFICATE OF CORRECTION

PATENT NO. : 5,217,000
DATED : June 8, 1993
INVENTOR(S) : Pierce-Bjorklund

It is certified that error appears in the above-indentified patent and that said Letters Patent is hereby corrected as shown below:

In the Drawing, delete the drawing sheets, consisting of Figures 1-60, and substitute therefor the Drawing Sheets, consisting of Figures 1-60.

Title page, item [75] Inventor's address should read
--7 Eagle Head, Manchester, Mass. 01944--.

Signed and Sealed this

Nineteenth Day of September, 1995

Attest:

BRUCE LEHMAN

Attesting Officer

Commissioner of Patents and Trademarks

United States Patent [19]
Pierce-Bjorklund

[11] Patent Number: 5,217,000
[45] Date of Patent: Jun. 8, 1993

[54] COMPOUND SOLAR COLLECTOR BUILDING CONSTRUCTION

[76] Inventor: Patricia Pierce-Bjorklund, 7 Eagle Head, Manchester, Mass. 01944.

[21] Appl. No.: 159,328
[22] Filed: Feb. 23, 1988
[51] Int. Cl.$^5$ ............................................. E04D 13/18
[52] U.S. Cl. .................................. 126/621; 52/206; 52/505; 52/302.4; 359/598
[58] Field of Search ............ 52/171, 172, 218, 219, 52/303, 306, 307, 308, 503, 504, 505, 607; 350/262, 265

[56] References Cited

U.S. PATENT DOCUMENTS

| | | | |
|---|---|---|---|
| 687,106 | 11/1901 | Anderson | 52/505 X |
| 818,551 | 4/1906 | Peterson | 52/505 |
| 836,017 | 11/1906 | Douglass | 52/505 X |
| 1,381,625 | 6/1921 | Finch | 52/607 X |
| 2,174,875 | 10/1939 | Freeman | |
| 2,294,776 | 9/1942 | Freeman | |
| 2,534,580 | 12/1950 | Edwards | 52/307 |
| 3,866,285 | 2/1975 | Clark | |
| 3,995,434 | 12/1976 | Izato et al. | 52/607 X |
| 3,996,918 | 12/1976 | Quick | |
| 4,051,832 | 10/1977 | Steizer | |
| 4,069,809 | 1/1978 | Strand | 126/449 |
| 4,073,283 | 2/1978 | Lof | |
| 4,074,704 | 2/1978 | Gellent | 126/440 |
| 4,076,013 | 2/1978 | Bette | |
| 4,148,296 | 4/1979 | Parlato | |
| 4,173,969 | 11/1979 | Scholl | |
| 4,379,449 | 4/1983 | Wiggens et al. | |

FOREIGN PATENT DOCUMENTS

| | | | |
|---|---|---|---|
| 850901 | 9/1970 | Canada | 52/505 |
| 2711442 | 9/1978 | Fed. Rep. of Germany | |
| 2749347 | 5/1979 | Fed. Rep. of Germany | |
| 49298 | 2/1939 | France | 52/607 |
| 905471 | 12/1945 | France | |
| 933711 | 4/1948 | France | 52/607 |
| 971712 | 1/1951 | France | 52/607 |
| 1470375 | 1/1967 | France | |
| 2468855 | 8/1981 | France | |
| 534500 | of 1922 | Switzerland | 52/505 |
| 124292 | 2/1928 | Switzerland | 52/505 |
| 155356 | 6/1932 | Switzerland | 52/505 |
| 282801 | 4/1952 | Switzerland | 52/505 |
| 591662 | 9/1977 | Switzerland | |
| 3613 | of 1913 | United Kingdom | 52/607 |

OTHER PUBLICATIONS

*The Engineering of Blast Furnace Stoves* An Analysis of Fundamentals and a Description of Freyn—Design Stoves, May 27, 1949.
The Hartford Courant, L. A. Chung, Title: Talcott Science Center Refines Trombe Wall, Aug. 23, 1981.
Pittsburg Corning Corporation Brochure No. GB-164 50M 9/81 Progressive Architecture Magazine Apr. 1983.

*Primary Examiner*—Noah P. Kamen

[57] ABSTRACT

A compound construction matrix harvests energy incident on all peripheries of a building by providing compound components having anterior and posterior portions with respect to radiation, the anterior portions being generally transparent and the posterior portions being selectively translucent, transparent or opaque, the compound components being arranged in communicating relation to form walls and roofs having multiple internal cavities and passages between cavities which permit light and air to flow freely within the matrix, allowing light incident form any angle to be reflected from cavity sidewalls toward posterior portions to form overlapping incidence on translucent conversion surfaces and to pass through tinted conversion means for direct gain, and allowing air in each cavity to expand freely in any direction from sunlit to shaded portions and through apertures toward shaded portions of adjacent cavities, to thereby form a dynamic airstream passing over translucent conversion surfaces and non-transparent conversion surfaces, seeking equilibrium surface temperatures throughout the matrix and removing energy developed in each cavity, the temperature of the air stream being modified by the thermal properties of the material of fabrication of the matrix and coatings and devices placed in matrix cavities, all cavities forming a single vessel, chambered manifold extending about the periphery of a building and performing all functions of a solar collector e.g. retention, conversion and distribution of incident energy while also providing the structural walls and light transmissive skin of the building.

25 Claims, 24 Drawing Sheets

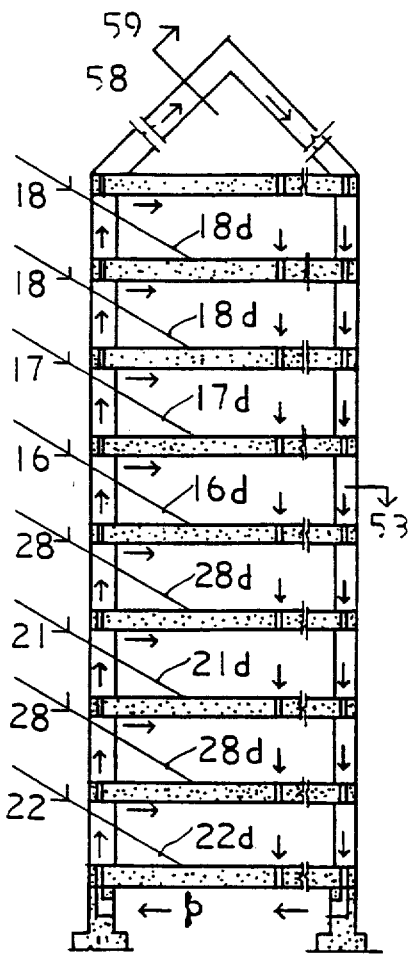
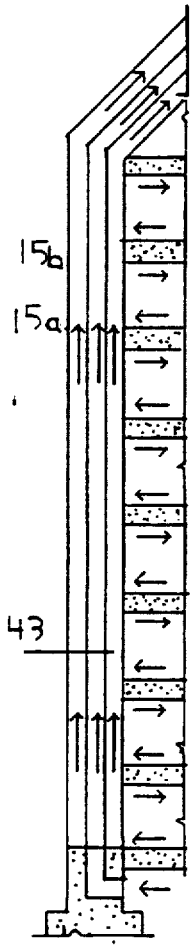
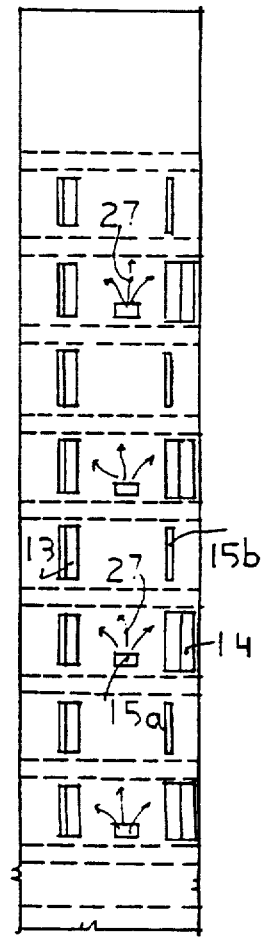
FIGURE 2     FIG. 3     FIG. 4
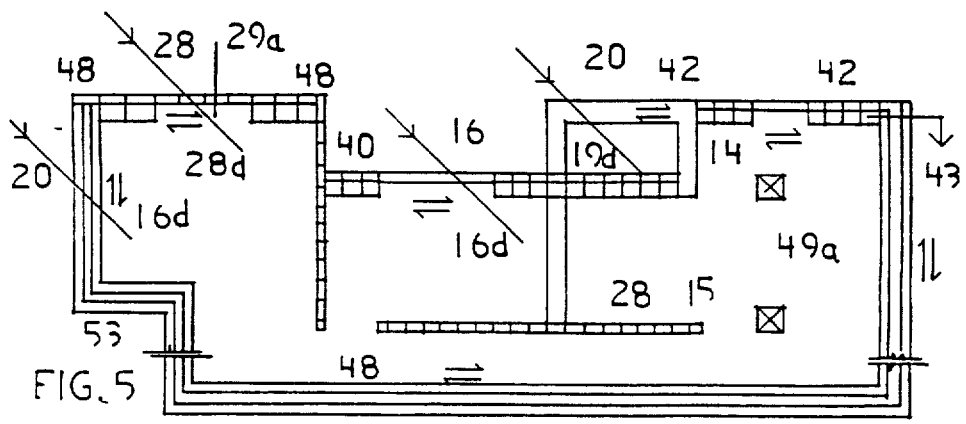
FIG. 5

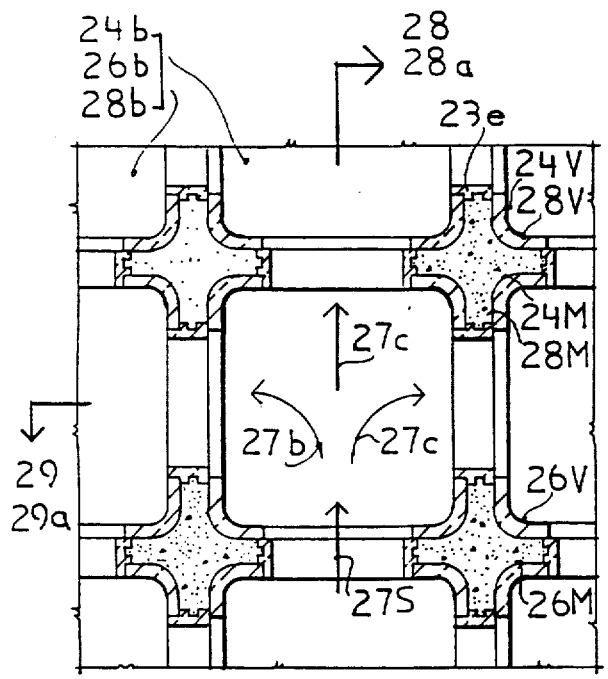
FIGURE 27
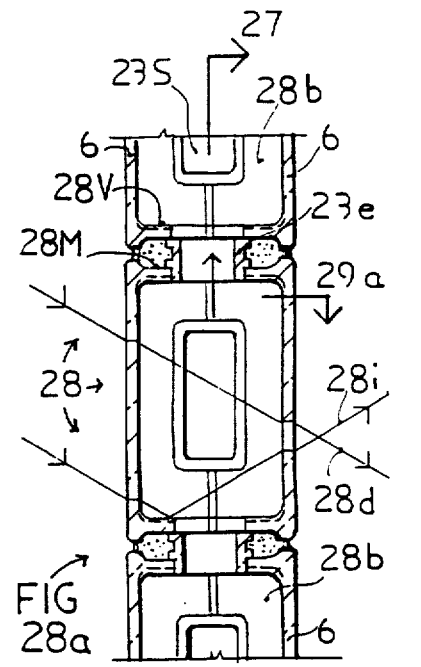
FIG 28a
FIGURE 28
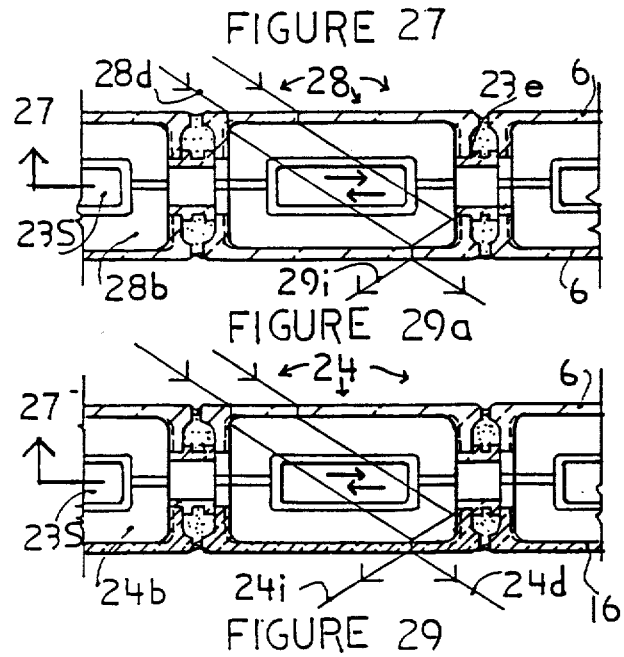
FIGURE 29a
FIGURE 29
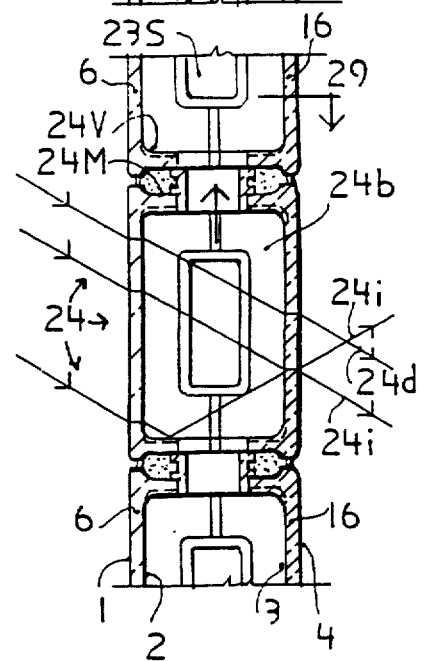

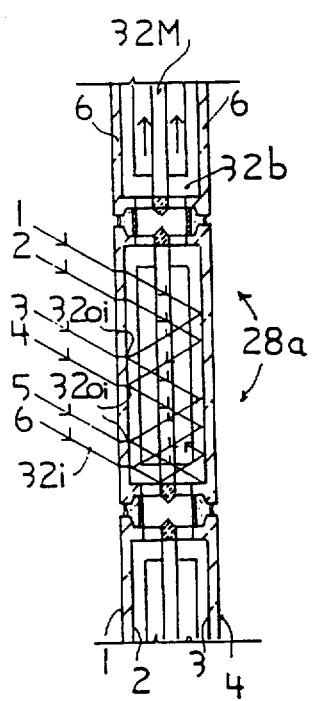
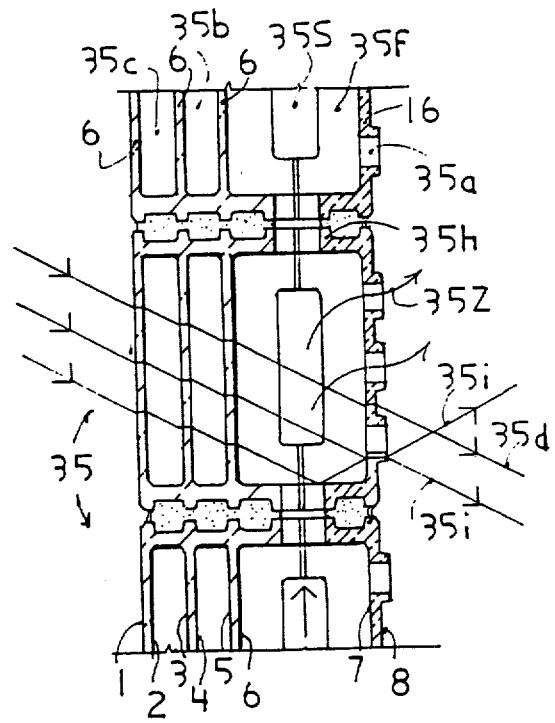
FIGURE 32
FIGURE 35
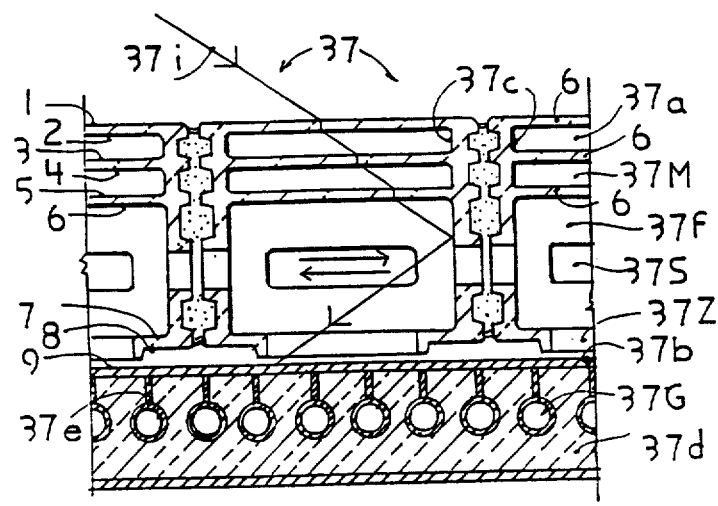
FIGURE 37

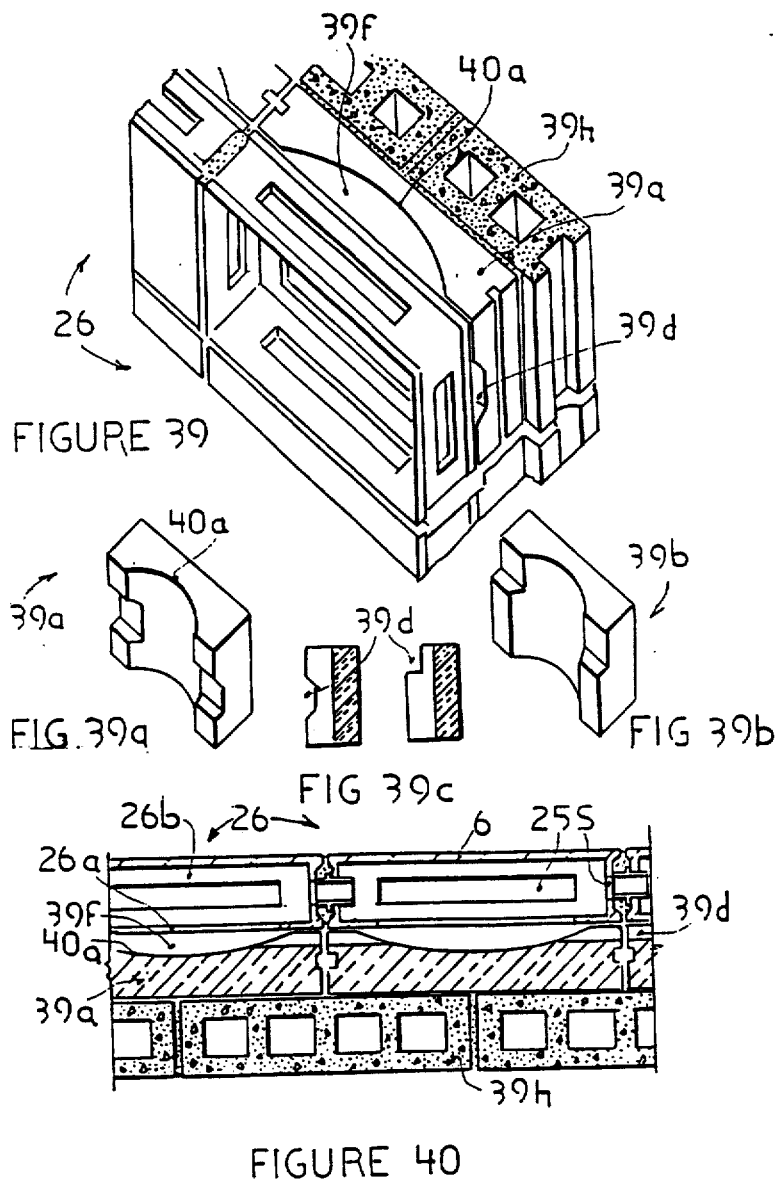

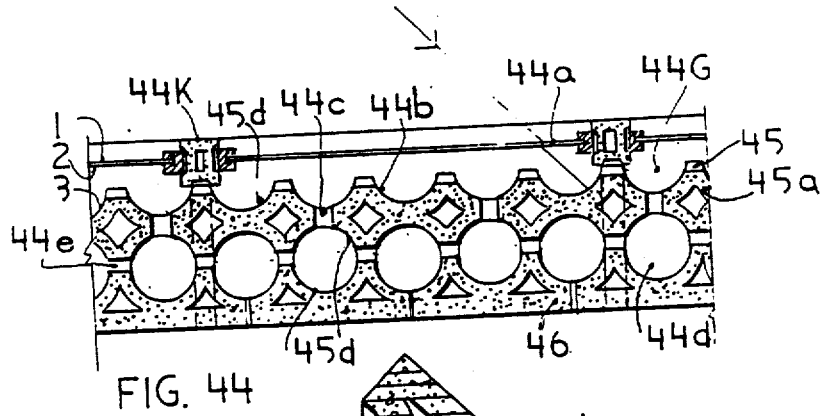
FIG. 44
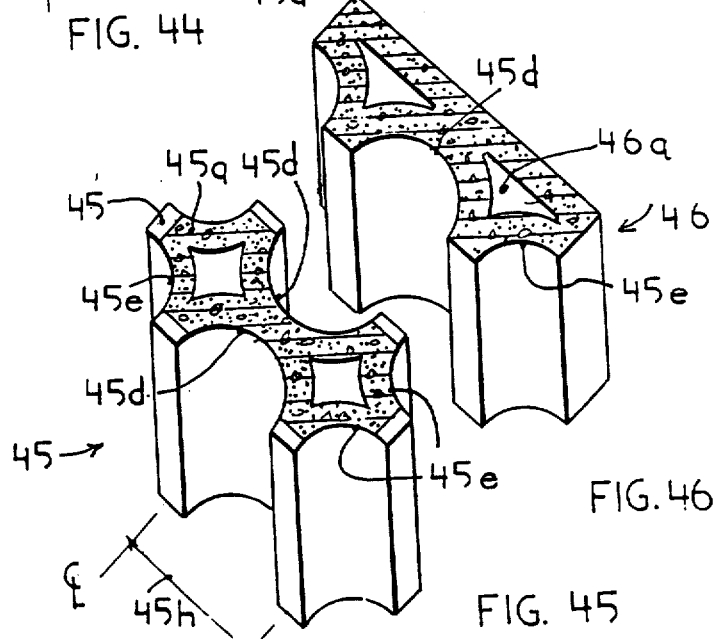
FIG. 46
FIG. 45
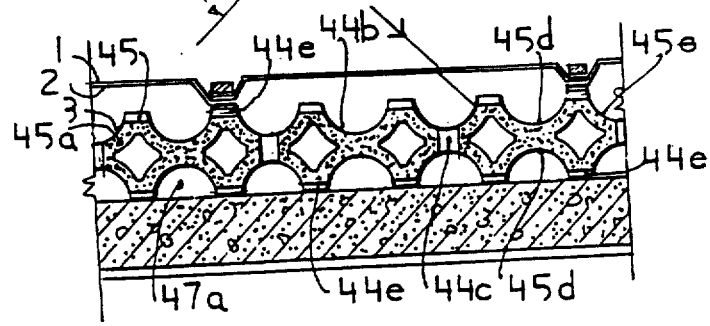
FIGURE 47

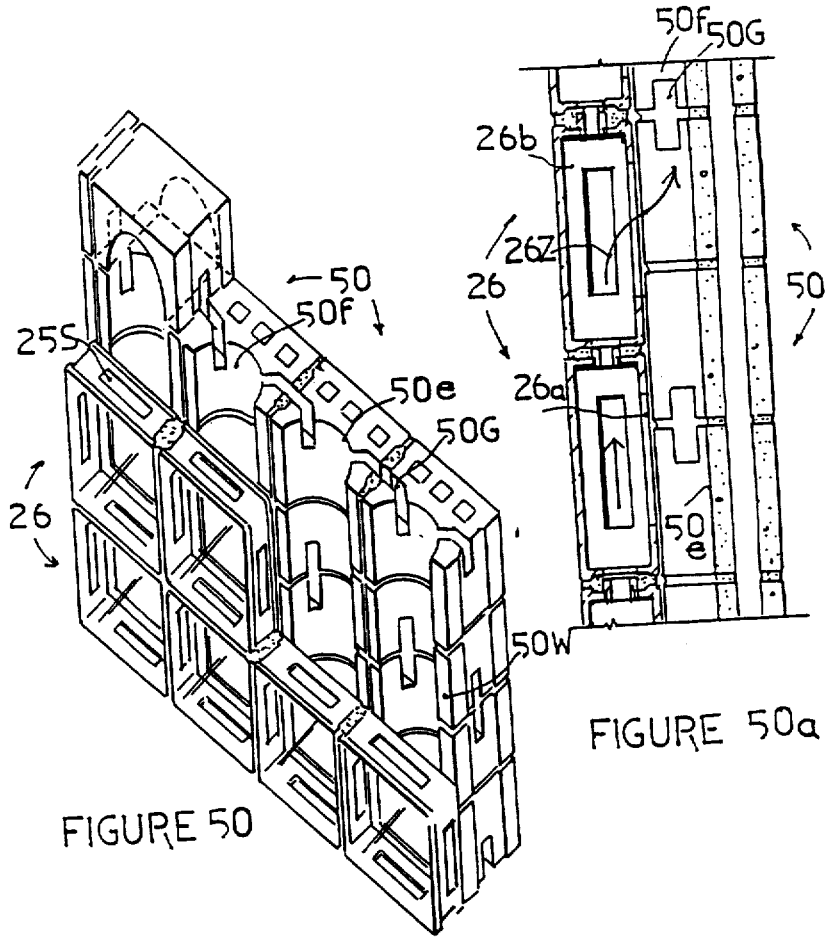
FIGURE 50
FIGURE 50a
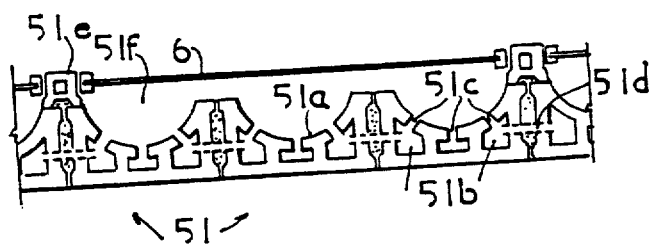
FIGURE 51

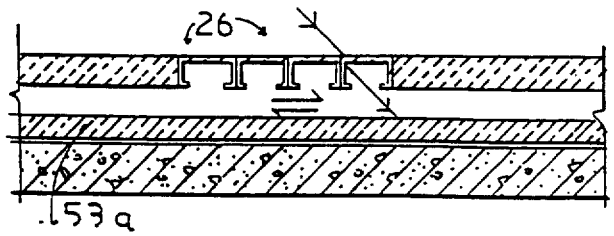
FIGURE 53
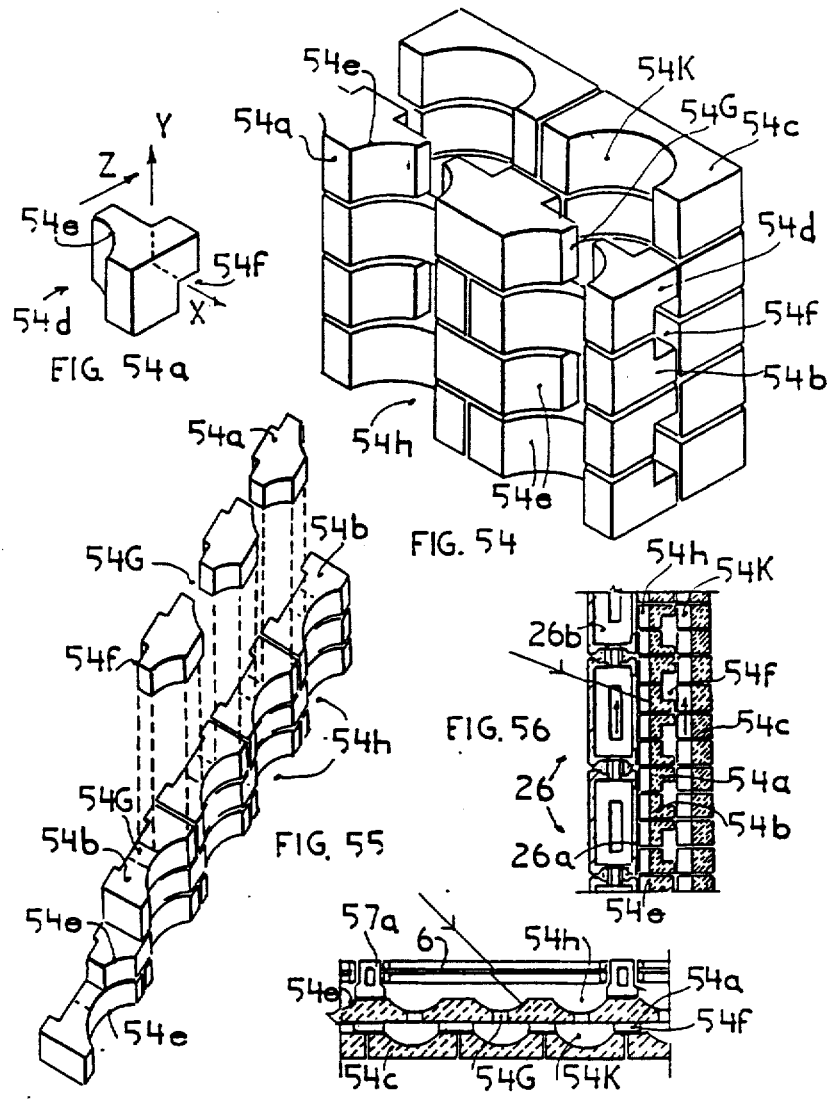
FIG. 54a
FIG. 54
FIG. 55
FIG. 56
FIG. 57

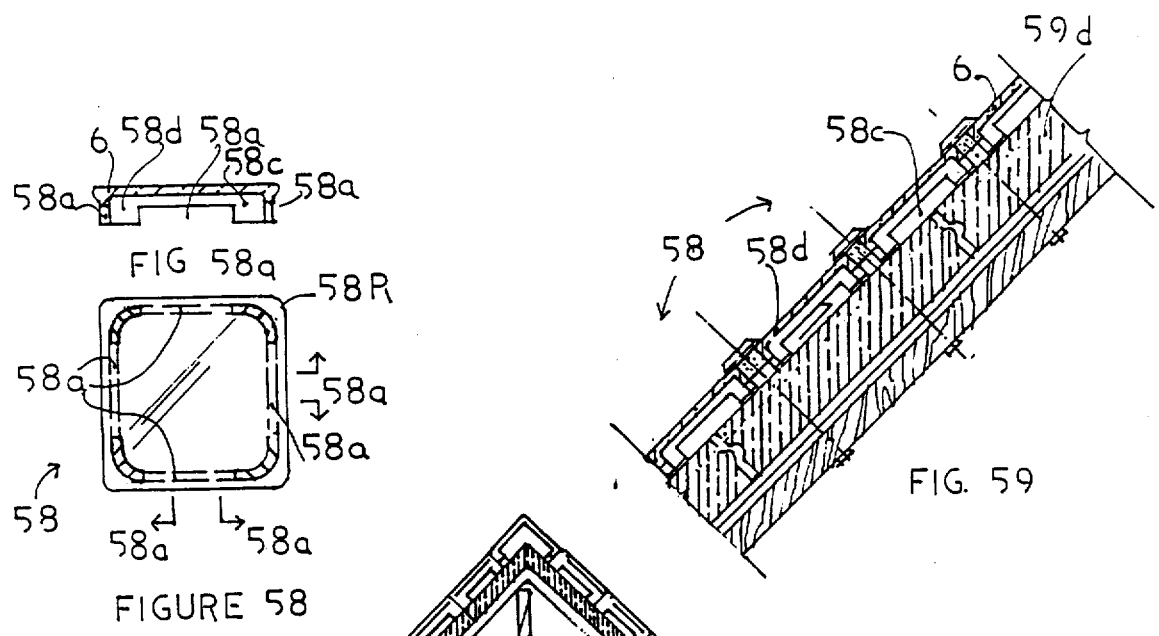
FIG 58a
FIGURE 58
FIG. 59
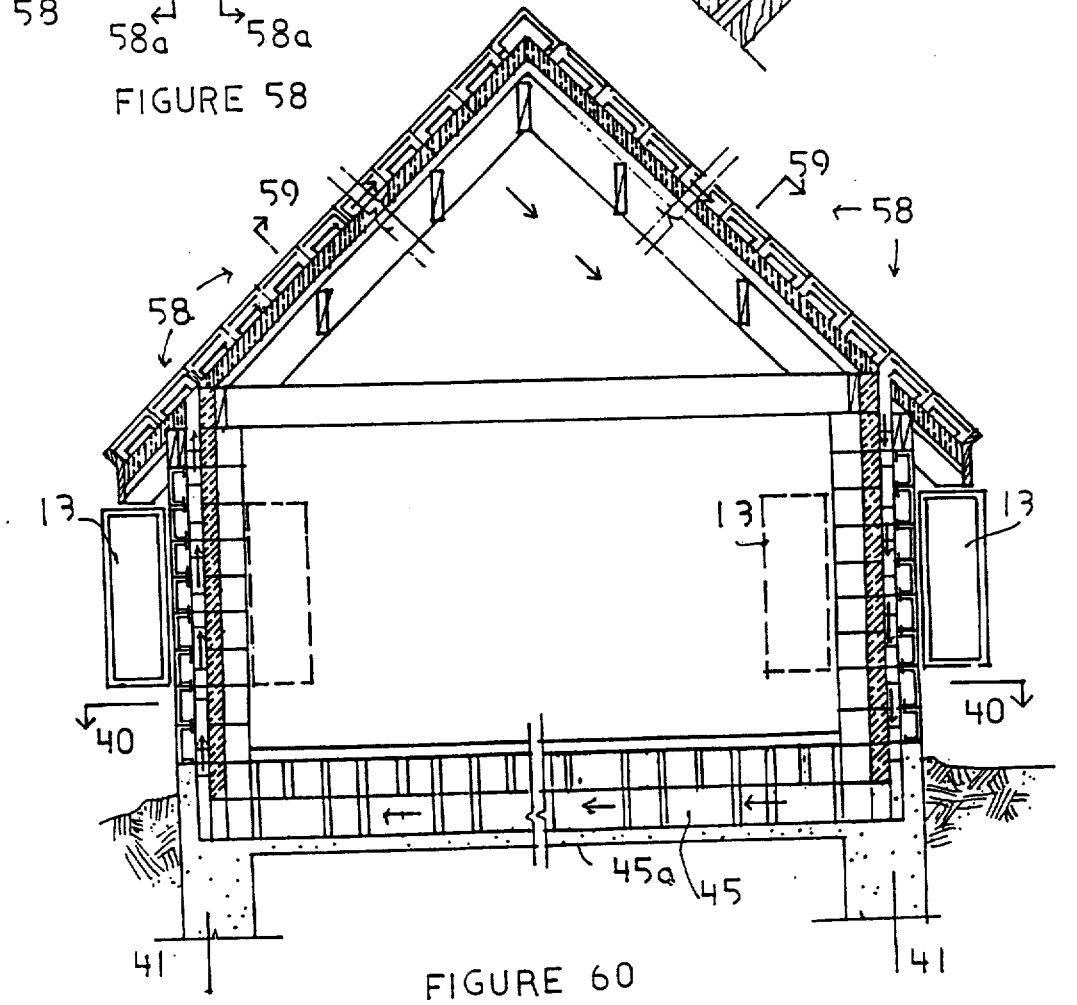
FIGURE 60